US012640311B2

(12) United States Patent
Na et al.

(10) Patent No.: US 12,640,311 B2
(45) Date of Patent: May 26, 2026

(54) MULTILAYER ELECTRONIC COMPONENT

(71) Applicant: SAMSUNG ELECTRO-MECHANICS CO., LTD., Suwon-si (KR)

(72) Inventors: Jae Young Na, Suwon-si (KR); Jin Hyung Lim, Suwon-si (KR); Sung Soo Kim, Suwon-si (KR); Seung Hun Han, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 89 days.

(21) Appl. No.: 17/895,414

(22) Filed: Aug. 25, 2022

(65) Prior Publication Data

US 2023/0215640 A1     Jul. 6, 2023

(30) Foreign Application Priority Data

Dec. 31, 2021     (KR) ........................ 10-2021-0193641

(51) Int. Cl.
*H01G 4/30* (2006.01)
*H01G 4/224* (2006.01)
(Continued)

(52) U.S. Cl.
CPC .............. *H01G 4/30* (2013.01); *H01G 4/224* (2013.01); *H01G 4/2325* (2013.01); *H01G 2/065* (2013.01)

(58) Field of Classification Search
None
See application file for complete search history.

(56) References Cited

U.S. PATENT DOCUMENTS

2008/0297977 A1* 12/2008 Togashi ................. H01G 4/232
                                                                    361/306.3
2010/0157506 A1*  6/2010 Togashi ................... H01G 4/30
                                                                    361/303
(Continued)

FOREIGN PATENT DOCUMENTS

JP         2016-178219 A    10/2016
KR    10-2014-0091440 A     7/2014
(Continued)

OTHER PUBLICATIONS

Korean Office Action dated Aug. 18, 2025 issued in Korean Patent Application No. 10-2024-0185037 (with English translation).

*Primary Examiner* — Eric W Thomas
(74) *Attorney, Agent, or Firm* — Morgan Lewis & Bockius LLP

(57) ABSTRACT

A multilayer electronic component includes: a body including a dielectric layer and first and second internal electrodes, and including first to sixth surfaces; a first external electrode including a first connection portion on the third surface, a first band portion extending from the first connection portion onto the first surface, and a third band portion extending from the first connection portion onto the second surface; a second external electrode including a second connection portion on the fourth surface, a second band portion extending from the second connection portion onto the first surface, and a fourth band portion extending from the second connection portion onto the second surface; an insulating layer including oxide including aluminum (Al), disposed on the first and second connection portions, and covering the second surface and the third and fourth band portions; and first and second plating layers respectively disposed on the first and second band portions.

35 Claims, 21 Drawing Sheets

1000

(51) Int. Cl.
    *H01G 4/232* (2006.01)
    *H01G 2/06* (2006.01)

(56) References Cited

U.S. PATENT DOCUMENTS

| | | | | |
|---|---|---|---|---|
| 2012/0313489 A1* | 12/2012 | Shirakawa | ............. | H01G 4/012 336/200 |
| 2013/0063862 A1* | 3/2013 | Kim | ......................... | H01G 4/30 156/182 |
| 2013/0141838 A1* | 6/2013 | Fukuda | ................... | H01B 3/12 29/25.42 |
| 2014/0116766 A1* | 5/2014 | Jeon | ..................... | H05K 3/3442 361/321.2 |
| 2014/0198427 A1 | 7/2014 | Kamobe et al. | | |
| 2015/0084481 A1* | 3/2015 | Mori | ..................... | H01G 4/252 29/829 |
| 2015/0084487 A1* | 3/2015 | Mori | ..................... | H01G 4/248 336/200 |
| 2015/0223340 A1 | 8/2015 | Jung et al. | | |
| 2016/0276104 A1 | 9/2016 | Nishisaka et al. | | |
| 2017/0154731 A1* | 6/2017 | Tahara | ................... | H01G 4/232 |
| 2017/0278634 A1 | 9/2017 | Kato | | |
| 2018/0075970 A1* | 3/2018 | Sato | ......................... | H01G 4/12 |
| 2019/0096583 A1 | 3/2019 | Sasaki | | |
| 2019/0326058 A1* | 10/2019 | Lee | ........................ | H01G 4/232 |
| 2020/0066444 A1* | 2/2020 | Yang | ..................... | H01G 4/232 |
| 2020/0161051 A1 | 5/2020 | Tanaka et al. | | |
| 2021/0074482 A1* | 3/2021 | Kokawa | ................ | H01G 4/248 |
| 2021/0272753 A1* | 9/2021 | Chikuma | .............. | H01G 4/224 |
| 2022/0301779 A1* | 9/2022 | Take | ................... | H01G 4/2325 |

FOREIGN PATENT DOCUMENTS

| | | |
|---|---|---|
| KR | 10-2015-0091677 A | 8/2015 |
| KR | 10-2016-0064260 A | 6/2016 |
| KR | 10-2017-0113108 A | 10/2017 |
| KR | 10-2019-0035521 A | 4/2019 |
| KR | 10-2020-0049659 A | 5/2020 |

* cited by examiner

1000

FIRST
DIRECTION

SECOND
DIRECTION

THIRD
DIRECTION

110

FIRST
DIRECTION

SECOND
DIRECTION

THIRD
DIRECTION

1100

FIRST
DIRECTION

SECOND
DIRECTION

THIRD
DIRECTION

1001

FIRST
DIRECTION

SECOND
DIRECTION

THIRD
DIRECTION

1001

FIRST
DIRECTION

SECOND
DIRECTION

II-II'

1003

FIRST
DIRECTION

SECOND
DIRECTION

THIRD
DIRECTION

1003

FIRST
DIRECTION

SECOND
DIRECTION

IV–IV'

1005

151-5

VI'

VI

FIRST
DIRECTION

SECOND
DIRECTION

THIRD
DIRECTION 142-5

110

141-5

1005

151-5 110 111 112 121 122

E2

131-5 { 131a-5
131b-5

H2

H1

E1

FIRST
DIRECTION

SECOND
DIRECTION 141-5 113 142-5

132a-5
132-5
132b-5

VI-VI'

1007

VII-VII'

2000

FIRST DIRECTION
SECOND DIRECTION
THIRD DIRECTION

FIRST DIRECTION
SECOND DIRECTION
THIRD DIRECTION

2006

FIRST
DIRECTION

SECOND
DIRECTION

THIRD
DIRECTION

2006

FIRST
DIRECTION

SECOND
DIRECTION

XI-XI'

FIRST
DIRECTION

SECOND
DIRECTION

XII-XII'

FIRST
DIRECTION

SECOND
DIRECTION

THIRD
DIRECTION

XIV–XIV'

MULTILAYER ELECTRONIC COMPONENT

CROSS-REFERENCE TO RELATED APPLICATION(S)

This application claims benefit of priority to Korean Patent Application No. 10-2021-0193641 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, may be a chip-type condenser which is mounted on a printed circuit board of any of various electronic products, such as an imaging device such as a liquid crystal display (LCD) or a plasma display panel (PDP), a computer, a smartphone or a mobile phone, to serve to charge or discharge electricity therein or therefrom.

The MLCC may be used as a component of any of various electronic apparatuses because the MLCC is small, has high capacity, and is easily mounted. There has been increasing demand for the MLCC to have a smaller size and higher capacitance as each of various electronic devices such as a computer and a mobile device has a smaller size and higher output.

In addition, in recent years, the MCLL has also been required to have high reliability to be used for a vehicle or an infotainment system in accordance with an increased interest in an electrical component for a vehicle in a related field.

In order to have the smaller size and higher capacitance, it may be necessary for the MLCC to have the increased number of stacks by including internal electrodes and dielectric layers made thinner, and to have increased effective volume fractions required to implement the capacitance by allowing a portion unrelated to capacitance formation to have a minimum volume.

In addition, it may be necessary to minimize a space in which the MLCC is mounted in order to mount as many components as possible in a limited area of a board.

In addition, the MLCC having the smaller size and the higher capacitance may have a margin made thinner, and thus be vulnerable to penetration of external moisture or penetration of a plating solution, thus having lower reliability. Accordingly, required is a need for a method for protecting the MLCC from the penetration of external moisture or the penetration of a plating solution.

SUMMARY

An aspect of the present disclosure may provide a multilayer electronic component having improved capacitance per unit volume.

Another aspect of the present disclosure may provide a multilayer electronic component having higher reliability.

Another aspect of the present disclosure may provide a multilayer electronic component which may be mounted in a minimal space.

However, the present disclosure is not limited to the description above, and may be more readily understood in the description of exemplary embodiments of the present disclosure.

According to an aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion onto a portion of the first surface, and a third band portion extending from the first connection portion onto a portion of the second surface; a second external electrode including a second connection portion disposed on the fourth surface, a second band portion extending from the second connection portion onto a portion of the first surface, and a fourth band portion extending from the second connection portion onto a portion of the second surface; an insulating layer disposed on the first and second connection portions, and covering the second surface and the third and fourth band portions; a first plating layer disposed on the first band portion; and a second plating layer disposed on the second band portion. The insulating layer may include oxide including aluminum (Al).

According to another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface and a first band portion extending from the first connection portion onto a portion of the first surface; a second external electrode including a second connection portion disposed on the fourth surface and a second band portion extending from the second connection portion onto a portion of the first surface; an insulating layer disposed on the second surface, and extended to the first and second connection portions; a first plating layer disposed on the first band portion; and a second plating layer disposed on the second band portion. The insulating layer may include an oxide including aluminum (Al).

According to yet another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion onto a portion of the first surface, and a first corner portion extending from the first connection portion onto a corner connecting the second and third surfaces to each other; a second external electrode including a second connection portion disposed on the fourth surface, a second band portion extending from the second connection portion onto a portion of the first surface, and a second corner portion extending from the second connection portion onto a corner connecting the second and fourth surfaces to each other; an insulating layer disposed on the first and second connection portions, and covering the second surface and the first and second corner portions; a first plating layer disposed on the first band portion; and a second plating layer disposed on the second band portion. B3≤G1 and B4≤G2 in which B3 indicates an average size of the first corner portion in the second direction, measured from the extension line of the third surface to an end of the first corner portion, B4 indicates an average size of the second corner portion in the second direction, measured from the extension line of the fourth surface to an end of the second corner portion, G1 indicates the average size of the region in the second direction, where the third surface and the second internal electrode are spaced apart from each other, and G2 indicates the average size of the region in the second direction, where the fourth surface and the first internal electrode are spaced apart from each other. The insulating layer may include an oxide including aluminum (Al).

According to still another aspect of the present disclosure, a multilayer electronic component may include: a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection electrode disposed on the third surface, and a first band electrode disposed on the first surface and connected to the first connection electrode; a second external electrode including a second connection electrode disposed on the fourth surface, and a second band electrode disposed on the first surface and connected to the second connection electrode; a first insulating layer disposed on the first connection electrode; a second insulating layer disposed on the second connection electrode; a first plating layer disposed on the first band electrode; and a second plating layer disposed on the second band electrode. The first and second insulating layers each may include an oxide including aluminum (Al).

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
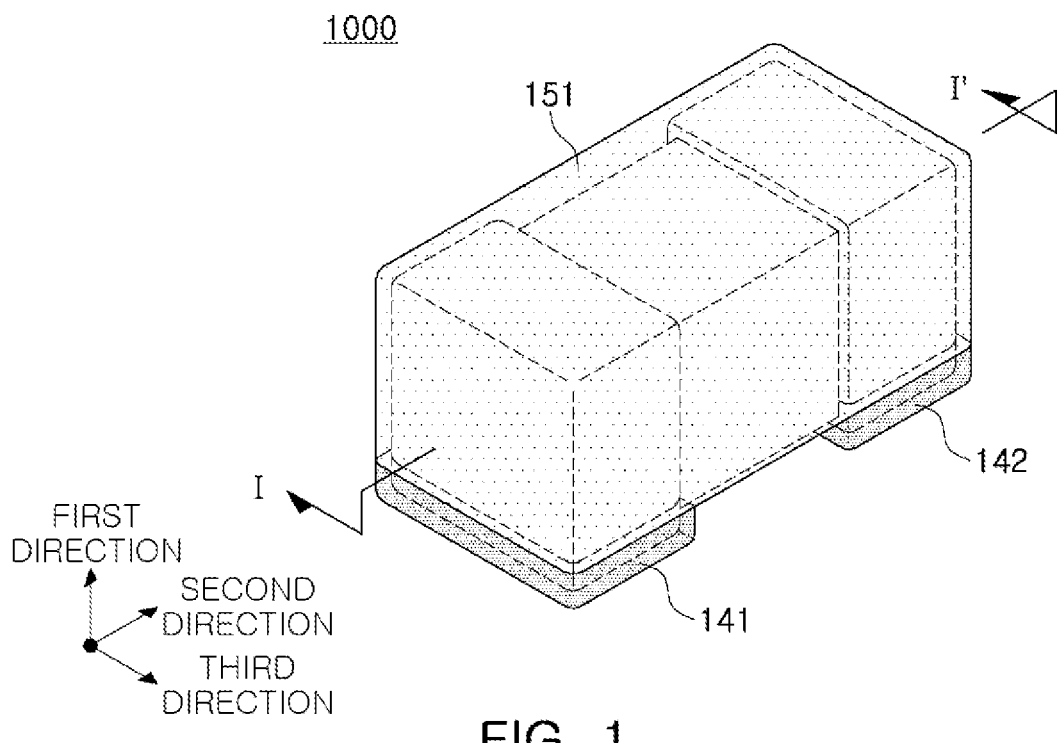
FIG. 1 is a perspective view schematically illustrating a multilayer electronic component according to an exemplary embodiment of the present disclosure.

Hereinafter, exemplary embodiments of the present disclosure will now be described in detail with reference to the accompanying drawings.

The term "an exemplary embodiment" used herein does not refer to the same exemplary embodiment, and is provided to emphasize a particular feature different from that of another exemplary embodiment. However, exemplary embodiments provided herein may be implemented by being combined in whole or in part one with one another. For example, one element described in a particular exemplary embodiment may be understood as a description related to another exemplary embodiment even if it is not described in another exemplary embodiment, unless an opposite or contradictory description is provided therein.

In the drawings, a first direction may indicate a thickness (T) direction, a second direction may indicate a length (L) direction, and a third direction may indicate a width (W) direction.

Figure 2:
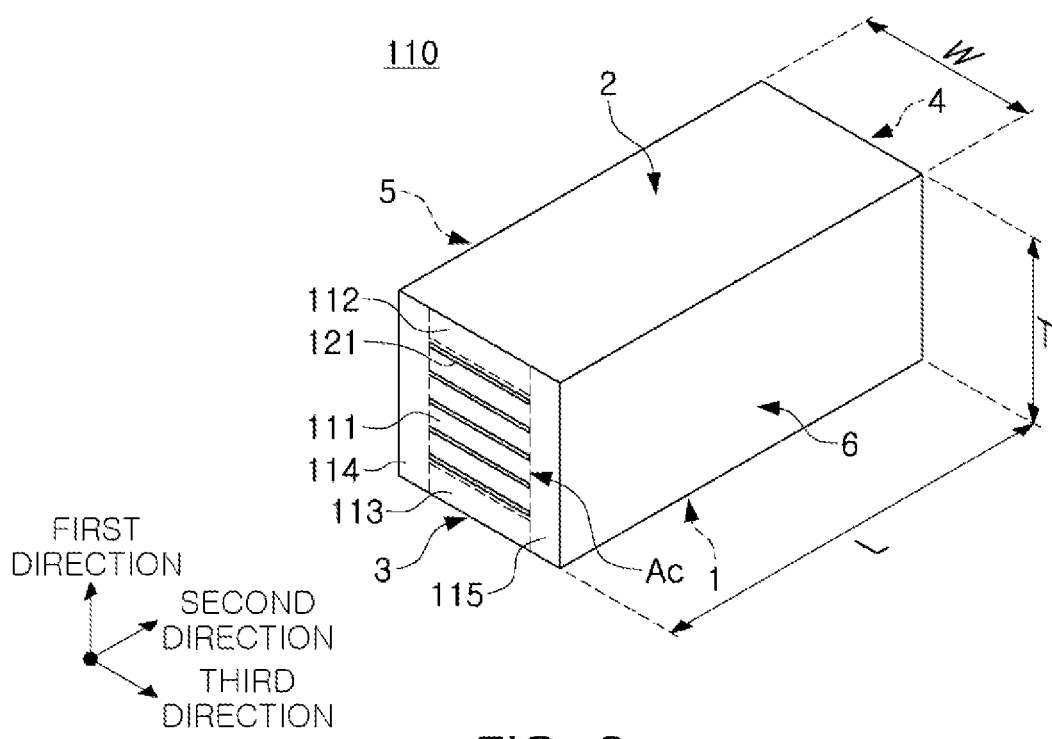
FIG. 2 is a perspective view schematically illustrating a body of the multilayer electronic component of FIG. 1.
Figure 3:
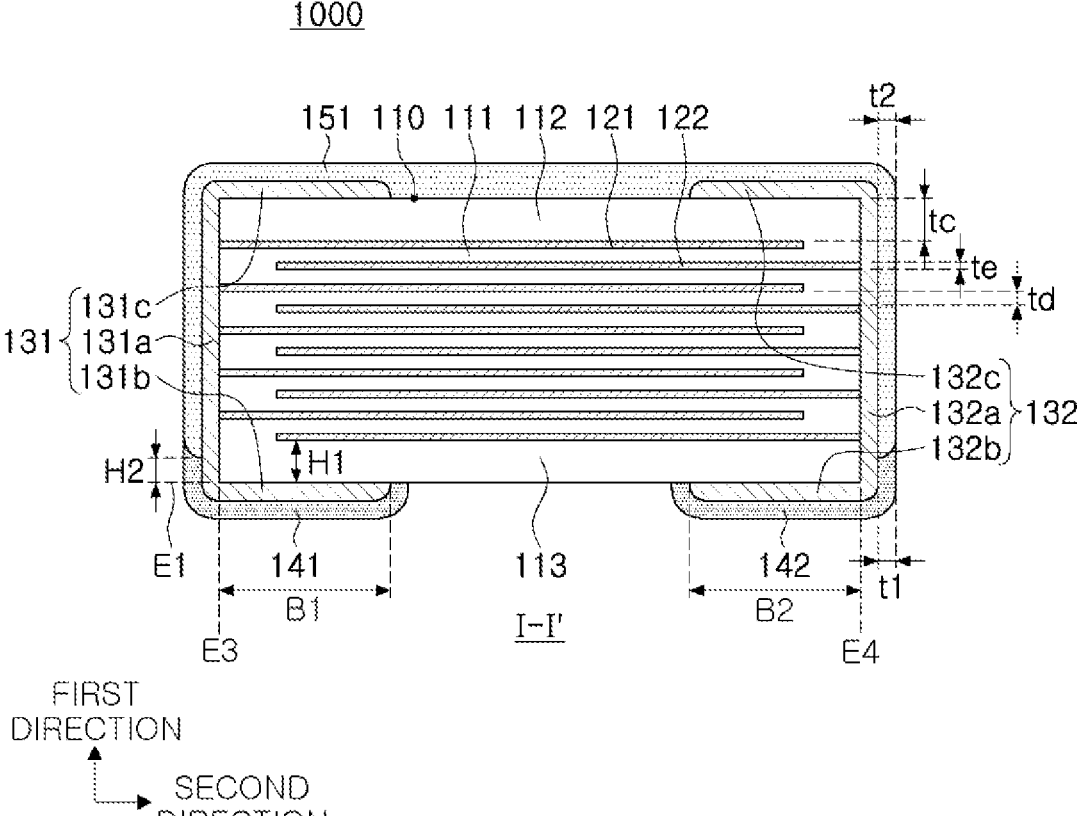
FIG. 3 is a cross-sectional view taken along line I-I' of FIG. 1.
Figure 4:
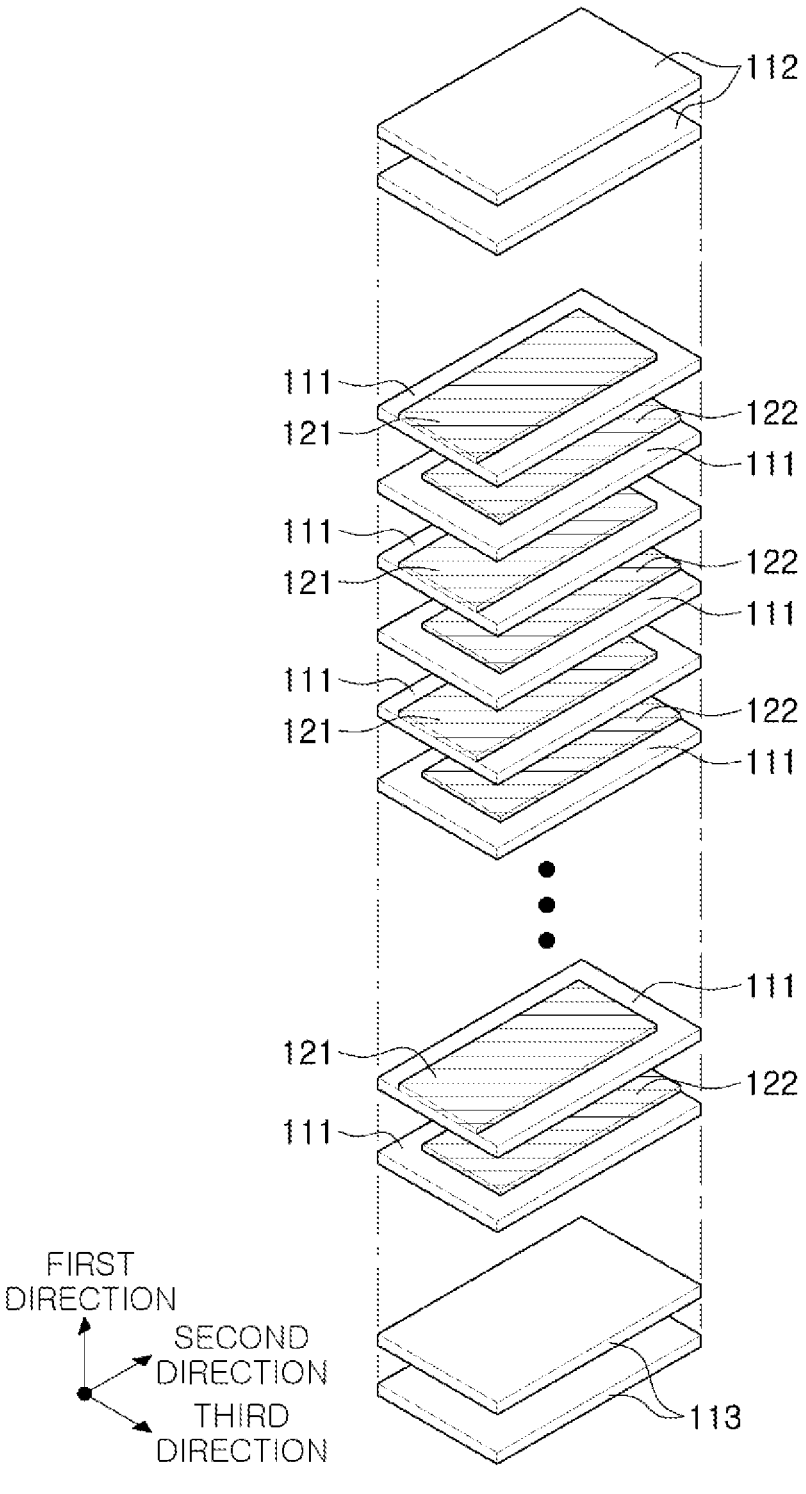
FIG. 4 is an exploded perspective view schematically illustrating an exploded body of FIG. 2.
Figure 5:
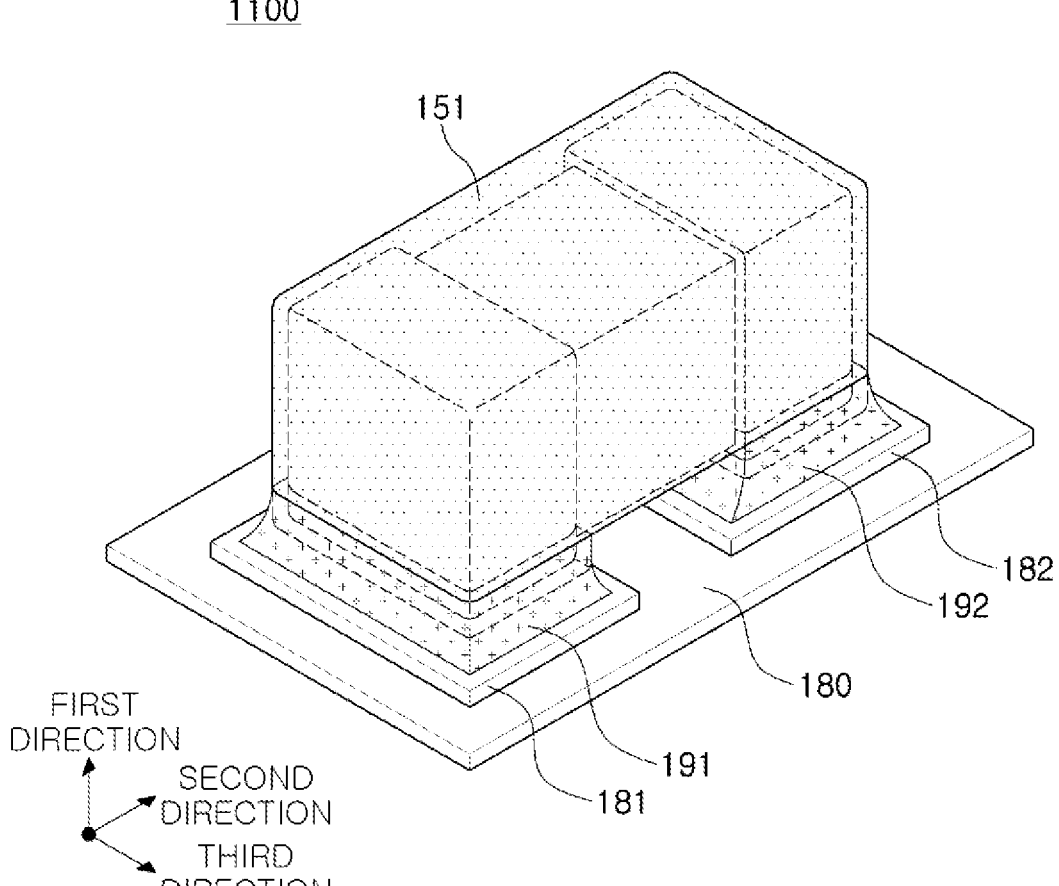
FIG. 5 is a perspective view schematically illustrating a board on which the multilayer electronic component of FIG. 1 is mounted.

FIG. 1 is a perspective view schematically illustrating a multilayer electronic component according to an exemplary embodiment of the present disclosure; FIG. 2 is a perspective view schematically illustrating a body of the multilayer electronic component of FIG. 1; FIG. 3 is a cross-sectional view taken along line I-I' of FIG. 1; FIG. 4 is an exploded perspective view schematically illustrating an exploded body of FIG. 2; and FIG. 5 is a perspective view schematically illustrating a board on which the multilayer electronic component of FIG. 1 is mounted.

Hereinafter, a multilayer electronic component 1000 according to an exemplary embodiment of the present disclosure is described with reference to FIGS. 1 through 5.

The multilayer electronic component 1000 according to an exemplary embodiment of the present disclosure may include: a body 110 including a dielectric layer 111 and first and second internal electrodes 121 and 122 alternately disposed while having the dielectric layer 111 interposed therebetween, and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction; a first external electrode 131 including a first connection portion 131a disposed on the third surface 3, a first band portion 131b extending from the first connection portion 131a onto a portion of the first surface 1, and a third band portion 131c extending from the first connection portion 131a onto a portion of the second surface 2; a second external electrode 132 including a second connection portion 132a disposed on the fourth surface 4, a second band portion 132b extending from the second connection portion 132a onto a portion of the first surface 1, and a fourth band portion 132c extending from the second connection portion 132a onto a portion of the second surface 2; an insulating layer 151 disposed on the first and second connection portions 131a and 132a, and covering the second surface 2 and the third and fourth band portions 131c and 132c; a first plating layer 141 disposed on the first band portion 131b;

and a second plating layer 142 disposed on the second band portion 132b. The insulating layer 151 may include an oxide including aluminum (Al).

The body 110 may include the dielectric layer 111 and the internal electrodes 121 and 122, which are alternately stacked on each other.

The body 110 is not limited to a particular shape, and may have a hexahedral shape or a shape similar to the hexahedral shape, as illustrated in the drawings. The body 110 may not have the hexahedral shape having perfectly straight lines due to contraction of ceramic powder particles included in the body 110 in a sintering process, the body 110 may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

In an exemplary embodiment, the body 110 may have a 1-3 corner connecting the first and third surfaces 1 and 3 to each other, a 1-4 corner connecting the first and fourth surfaces 1 and 4 to each other, a 2-3 corner connecting the second and third surfaces 2 and 3 to each other, and a 2-4 corner connecting the second surface 2 and the fourth surface 4 to each other. The 1-3 corner and the 2-3 corner may be contracted toward a center of the body in the first direction as being closer to the third surface 3, and the 1-4 corner and the 2-4 corner may be contracted toward the center of the body in the first direction as being closer to the fourth surface 4.

Margin regions in which none of the internal electrodes 121 and 122 is disposed may overlap each other on the dielectric layer 111, and a step difference may thus occur due to thicknesses of the internal electrodes 121 and 122. Accordingly, the corners connecting the first surface and the third to sixth surfaces to each other and/or the corners connecting the second surface and the third to the fifth surfaces to each other may be contracted toward the center of the body 110 in the first direction, based on the first surface or the second surface. Alternatively, due to a contraction phenomenon in the sintering process of the body, the corners connecting the first surface 1 and the third to sixth surfaces 3, 4, 5 and 6 to each other and/or the corners connecting the second surface 2 and the third to the sixth surfaces 3, 4, 5 and 6 to each other may be contracted toward the center of the body 110 in the first direction, based on the first surface or the second surface. Alternatively, a separate process may be performed to round the corners connecting respective surfaces of the body 110 to each other in order to prevent a chipping defect or the like, and the corners connecting the first and third to sixth surfaces to each other and/or the corners connecting the second surface and the third to sixth surfaces to each other may thus each have a round shape.

The corners may include the 1-3 corner connecting the first surface 1 and the third surface 3 to each other, the 1-4 corner connecting the first surface 1 and the fourth surface 4 to each other, the 2-3 corner connecting the second surface 2 and the third surface 3 to each other, and the 2-4 corner connecting the second surface 2 and the fourth surface 4 to each other. In addition, the corners may include a 1-5 corner connecting the first surface 1 and the fifth surface 5 to each other, a 1-6 corner connecting the first surface 1 and the sixth surface 6 to each other, a 2-5 corner connecting the second surface 2 and the fifth surface 5 to each other, and a 2-6 corner connecting the second surface 2 and the sixth surface 6 to each other. The first to sixth surfaces 1 to 6 of the body 110 may generally be flat surfaces, and non-flat regions may be the corners. Hereinafter, an extension line of each surface may indicate a line extended based on a flat portion of each surface.

Here, a region of the external electrode 131 or 132, disposed on the corner of the body 110 may be a corner portion, a region thereof disposed on the third or fourth surface of the body 110 may be the connection portion, and a region thereof disposed on the first or second surface of the body 110 may be the band portion.

Meanwhile, in order to suppress the step difference caused by the internal electrodes 121 and 122, the internal electrodes may be stacked on each other and then cut to be exposed to the fifth and sixth surfaces 5 and 6 of the body, and one dielectric layer or two or more dielectric layers may be stacked on both sides of a capacitance formation portion Ac in the third direction (i.e., the width direction) to form margin portions 114 and 115. In this case, the corner connecting the first surface 1 and the fifth or sixth surface 5 or 6 to each other and the corner connecting the second surface 2 and the fifth or sixth surface 5 or 6 to each other may not be contracted.

The plurality of dielectric layers 111 included in the body 110 may be in a sintered state, and adjacent dielectric layers 111 may be integrated with each other so that boundaries therebetween are not readily apparent without using a scanning electron microscope (SEM).

According to an exemplary embodiment of the present disclosure, a raw material of the dielectric layer 111 is not particularly limited as long as sufficient capacitance is obtained from the raw material. For example, the dielectric layer may use a material such as a barium titanate-based material, a lead composite perovskite-based material or a strontium titanate-based material. The barium titanate-based material may include barium titanate (BaTiO$_3$)-based ceramic powder particles, and the ceramic powder particles may be, for example, BaTiO$_3$ or (Ba$_{1-x}$Ca$_x$)TiO$_3$ (0<x<1), Ba(Ti$_{1-y}$Ca$_y$)O$_3$ (0<y<1), (Ba$_{1-x}$Ca$_x$)(Ti$_{1-y}$Zr$_y$)O$_3$ (0<x<1, 0<y<1) or Ba(Ti$_{1-y}$Zr$_y$)O$_3$ (0<y<1), in which calcium (Ca), zirconium (Zr) or the like is partially dissolved in BaTiO$_3$.

In addition, the raw material of the dielectric layer 111 may be prepared by adding various ceramic additives, organic solvents, binders, dispersing agents and the like, to the powder particles such as the barium titanate (BaTiO$_3$) powder particles, based on an object of the present disclosure.

Meanwhile, an average thickness td of the dielectric layer 111 may not need to be particularly limited.

However, the multilayer electronic component may generally have lower reliability when the dielectric layer has a small thickness of less than 0.6 μm, in particular, when the dielectric layer has a thickness of 0.35 μm or less.

The multilayer electronic component according to an exemplary embodiment of the present disclosure may include the insulating layer disposed on the connection portion of the external electrode, and the plating layer disposed on the band portion of the external electrode to prevent penetration of external moisture, penetration of a plating solution or the like, thereby having higher reliability and thus ensuring excellent reliability even when the dielectric layer 111 has the average thickness of 0.35 μm or less.

Therefore, when the dielectric layer 111 has the average thickness of 0.35 μm or less, the multilayer electronic component according to the present disclosure may reveal more significantly improved reliability.

The average thickness td of the dielectric layer 111 may indicate an average thickness of the dielectric layer 111 disposed between the first and second internal electrodes 121 and 122.

The average thickness of the dielectric layer 111 may be measured by scanning an image of a cross section of the body 110 in a length-thickness (L-T) direction by using the scanning electron microscope (SEM) with a magnification of 10,000. In more detail, an average value of the dielectric layer may be measured by measuring a thickness of one dielectric layer at thirty equally spaced points in the length direction in the scanned image. The thirty equally spaced points may be designated in the capacitance formation portion Ac. In addition, it is possible to obtain an average thickness of the dielectric layer further generalized when the average thickness of ten or more dielectric layers is measured.

The body 110 may further include the capacitance formation portion Ac disposed in the body 110, and forming capacitance of the capacitor by including the first and second internal electrodes 121 and 122 disposed to oppose each other while having the dielectric layer 111 interposed therebetween, and include cover portions 112 and 113 disposed on the upper and lower surfaces of the capacitance formation portion Ac in the first direction.

In addition, the capacitance formation portion Ac may be a portion contributing to forming the capacitance of the capacitor, and formed by repeatedly stacking the plurality of first and second internal electrodes 121 and 122 on each other while having the dielectric layer 111 interposed therebetween.

The cover portions 112 and 113 may include the upper cover portion 112 disposed on the upper surface of the capacitance formation portion Ac in the first direction and the lower cover portion 113 disposed on the lower surface of the capacitance formation portion Ac in the first direction.

The upper cover portion 112 and the lower cover portion 113 may be formed by stacking one dielectric layer or two or more dielectric layers on the upper and lower surfaces of the capacitance formation portion Ac in the thickness direction, respectively, and may basically serve to prevent damage to the internal electrodes, caused by physical or chemical stress.

The upper and lower cover portions 112 and 113 may include no internal electrode and may include the same material as the dielectric layer 111.

That is, the upper and lower cover portions 112 and 113 may include a ceramic material such as a barium titanate (BaTiO$_3$)-based ceramic material.

Meanwhile, an average thickness of the cover portion 112 or 113 may not need to be particularly limited. However, 15 μm or less may be an average thickness tc of the cover portion 112 or 113 in order for the multilayer electronic component to more easily have a smaller size and higher capacitance. In addition, the multilayer electronic component according to an exemplary embodiment of the present disclosure may include the insulating layer disposed on the connection portion of the external electrode, and the plating layer disposed on the band portion of the external electrode to prevent the penetration of the external moisture, the penetration of the plating solution or the like, thereby having the higher reliability and thus ensuring the excellent reliability even when the cover portion 112 or 113 has an average thickness of 15 μm or less.

The average thickness tc of the cover portion 112 or 113 may indicate its size in the first direction, and may have a value obtained by averaging the sizes of the cover portions 112 and 113 in the first direction, measured at five equally spaced points on upper and lower surfaces of the capacitance formation portion Ac.

In addition, the margin portions 114 and 115 may each be disposed on a side surface of the capacitance formation portion Ac.

The margin portions 114 and 115 may be the first margin portion 114 disposed on the fifth surface 5 of the body 110 and the second margin portion 115 disposed on the sixth surface 6 of the body 110. That is, the margin portion 114 or 115 may be disposed on an end surface of the body 110 in the width direction.

As illustrated in FIG. 3, the margin portions 114 and 115 may each indicate a region between either end of the first and second internal electrodes 121 and 122 and a boundary surface of the body 110, based on a cross section of the body 110 cut in a width-thickness (W-T) direction.

The margin portions 114 and 115 may basically serve to prevent the damage to the internal electrode, caused by the physical or chemical stress.

The margin portions 114 and 115 may be formed by forming the internal electrode by applying a conductive paste on a ceramic green sheet except a portion thereof in which the margin portion is to be positioned.

Alternatively, in order to suppress the step difference occurring due to the internal electrode 121 or 122, the margin portion 114 or 115 may be formed by stacking the internal electrodes on each other, then cutting the internal electrodes to be exposed to the fifth and sixth surfaces 5 and 6 of the body, and then stacking one dielectric layer or two or more dielectric layers on both the sides of the capacitance formation portion Ac in the third direction (i.e., the width direction).

Meanwhile, a width of the margin portion 114 or 115 may not need to be particularly limited. However, 15 μm or less may be the average width of the margin portion 114 or 115 in order for the multilayer electronic component to more easily have the smaller size and the higher capacitance. In addition, the multilayer electronic component according to an exemplary embodiment of the present disclosure may include the insulating layer disposed on the connection portion of the external electrode, and the plating layer disposed on the band portion of the external electrode to prevent the penetration of the external moisture, the penetration of the plating solution or the like, thereby having the higher reliability and thus ensuring the excellent reliability even when the margin portion 114 or 115 has an average width of 15 μm or less.

The average width of the margin portion 114 or 115 may indicate its size in the third direction, and may have a value obtained by averaging the sizes of the margin portions 114 and 115 in the third direction, measured at five equally spaced points on the side of the capacitance formation portion Ac.

The internal electrodes 121 and 122 may be alternately stacked on each other while having the dielectric layer 111 interposed therebetween.

The internal electrodes 121 and 122 may be the first internal electrode 121 and the second internal electrode 122. The first and second internal electrodes 121 and 122 may be alternately disposed to oppose each other while having the dielectric layer 111, included in the body 110, interposed therebetween, and may respectively be exposed to the third and fourth surfaces 3 and 4 of the body 110.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body to be connected to the first internal electrode 121, and the second external electrode 132 may be disposed on the fourth surface 4 of the body to be connected to the second internal electrode 122.

That is, the first internal electrode 121 may not be connected to the second external electrode 132 and connected to the first external electrode 131, and the second internal electrode 122 may not be connected to the first external electrode 131 and connected to the second external electrode 132. Accordingly, the first internal electrode 121 may be spaced apart from the fourth surface 4 by a predetermined distance, and the second internal electrode 122 may be spaced apart from the third surface 3 by the predetermined distance.

Here, the first and second internal electrodes 121 and 122 may be electrically separated from each other by the dielectric layer 111 interposed therebetween.

The body 110 may be formed by alternately stacking a ceramic green sheet on which the first internal electrode 121 is printed and a ceramic green sheet on which the second internal electrode 122 is printed on each other and then sintering the same.

The material for forming the internal electrodes 121 and 122 is not particularly limited, and may be a material having excellent electrical conductivity. For example, the internal electrode 121 or 122 may include at least one of nickel (Ni), copper (Cu), palladium (Pd), silver (Ag), gold (Au), platinum (Pt), tin (Sn), tungsten (W), titanium (Ti) and alloys thereof.

In addition, the internal electrodes 121 and 122 may be formed by printing, on the ceramic green sheet, a conductive paste for internal electrodes including at least one of nickel (Ni), copper (Cu), palladium (Pd), silver (Ag), gold (Au), platinum (Pt), tin (Sn), tungsten (W), titanium (Ti) and alloys thereof. A method of printing the conductive paste for the internal electrodes may be a screen printing method, the gravure printing method or the like, and the present disclosure is not limited thereto.

Meanwhile, an average thickness to of the internal electrode 121 or 122 may not need to be particularly limited.

However, the multilayer electronic component may generally have lower reliability when the internal electrode has a small thickness of less than 0.6 μm, in particular, when the internal electrode has a thickness of 0.35 μm or less.

The multilayer electronic component according to an exemplary embodiment of the present disclosure may include the insulating layer disposed on the connection portion of the external electrode, and the plating layer disposed on the band portion of the external electrode to prevent the penetration of the external moisture, the penetration of the plating solution or the like, thereby having the higher reliability and thus ensuring the excellent reliability even when the internal electrode 121 or 122 has the average thickness of 0.35 μm or less.

Therefore, when the internal electrode 121 or 122 has the average thickness of 0.35 μm or less, the multilayer electronic component according to the present disclosure may have the more remarkably improved reliability, and may thus more easily have the smaller size and the higher capacitance.

The average thickness to of the internal electrode 121 or 122 may indicate the average thickness of the internal electrode 121 or 122.

The average thickness of the internal electrode 121 or 122 may be measured by scanning an image of the cross section of the body 110 in the length-thickness (L-T) direction by using the scanning electron microscope (SEM) with a magnification of 10,000. In more detail, the average value of the internal electrode may be measured by measuring a thickness of one internal electrode at thirty equally spaced points in the length direction in the scanned image. The thirty equally spaced points may be designated in the capacitance formation portion Ac. In addition, it is possible to obtain an average thickness of the internal electrode further generalized when the average thickness of ten or more internal electrodes is measured.

The external electrodes 131 and 132 may respectively be disposed on the third surface 3 and fourth surface 4 of the body 110. The external electrodes 131 and 132 may be the first and second external electrodes 131 and 132 respectively disposed on the third and fourth surfaces 3 and 4 of the body 110, and respectively connected to the first and second internal electrodes 121 and 122.

The external electrodes 131 and 132 may be the first external electrode 131 including the first connection portion 131a disposed on the third surface 3 and the first band portion 131b extending from the first connection portion 131a onto a portion of the first surface 1, and the second external electrode 132 including the second connection portion 132a disposed on the fourth surface 4 and the second band portion 132b extending from the second connection portion 132a onto a portion of the first surface 1. The first connection portion 131a may be connected to the first internal electrode 121 on the third surface 3, and the second connection portion 132a may be connected to the second internal electrode 122 on the fourth surface 4.

In addition, the first external electrode 131 may include the third band portion 131c extended from the first connection portion 131a to a portion of the second surface 2, and the second external electrode 132 may include the fourth band portion 132c extended from the second connection portion 132a to a portion of the second surface 2. Further, the first external electrode 131 may include a first side band portion extended from the first connection portion 131a to portions of the fifth and sixth surfaces 5 and 6, and the second external electrode 132 may include a second side band portion extended from the second connection portion 132a to portions of the fifth and sixth surfaces 5 and 6.

The first or second external electrode 131 or 132 may not be disposed on the second surface 2 or may not be disposed on the fifth or sixth surface 5 or 6. As the first or second external electrode 131 or 132 is not disposed on the second surface 2, the first or second external electrode 131 or 132 may be disposed below the extension line of the second surface 2 of the body 110. In addition, the first or second connection portion 131a or 132a may be spaced apart from the fifth and sixth surfaces 5 and 6, and the first or second connection portion 131a or 132a may be spaced apart from the second surface 2. In addition, the first or second band portion 131b or 132b may also be spaced apart from the fifth and sixth surfaces 5 and 6.

Meanwhile, the drawings illustrate that the insulating layer is disposed on the third or fourth band portion 131c or 132c when the first or second external electrode 131 or 132 includes the third or fourth band portion 131c or 132c. However, the present disclosure is not limited thereto, and the plating layer may be disposed on the third or fourth band portion 131c or 132c for the multilayer electronic component to be more easily mounted on the board. In addition, the first and second external electrodes 131 and 132 may respectively include the third and fourth band portions 131c and 132c, and may not include the side band portions. In this case, the first and second connection portions 131a and 132a, and the first to fourth band portions 131b, 132b, 131c and 132c may be spaced apart from the fifth and sixth surfaces 5 and 6.

This exemplary embodiment describes that the multilayer electronic component 1000 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity such as metal, may use a specific material determined in consideration of an electrical characteristic, structural stability or the like, and may have a multilayer structure.

The external electrode 131 or 132 may be a fired electrode including conductive metal and glass, or a resin-based electrode including the conductive metal and resin.

In addition, the external electrode 131 or 132 may be made by sequentially forming the fired electrode and the resin-based electrode on the body. In addition, the external electrode 131 or 132 may be formed by transferring a sheet including the conductive metal to the body or by transferring the sheet including the conductive metal to the fired electrode.

The conductive metal included in the external electrode 131 or 132 may use the material having excellent electrical conductivity, and is not particularly limited. For example, the conductive metal may be at least one of copper (Cu), nickel (Ni), palladium (Pd), silver (Ag), tin (Sn), chromium (Cr) and alloys thereof. The external electrode 131 or 132 may include at least one of nickel (Ni) and an alloy of nickel (Ni), thereby further improving its connectivity with the internal electrode 121 or 122 including nickel (Ni).

The insulating layer 151 may be disposed on the first and second connection portions 131a and 132a.

The first or second connection portion 131a or 132a may be a portion connected to the internal electrode 121 or 122, and thus be a pathway for the penetration of the plating solution in a plating process or the penetration of the moisture when the multilayer electronic component is actually used. In the present disclosure, the insulating layer 151 may be disposed on the connection portions 131a and 132a, thereby preventing the penetration of the external moisture or the penetration of the plating solution.

The insulating layer 151 may be in contact with the first and second plating layers 141 and 142. Here, the insulating layer 151 may be in contact with the first and second plating layers 141 and 142 to partially cover ends thereof, or the first and second plating layers 141 and 142 may be in contact with the insulating layer 151 to partially cover an end thereof.

The insulating layer 151 may be disposed on the first and second connection portions 131a and 132a, and may cover the second surface 2 and the third and fourth band portions 131c and 132c. Here, the insulating layer 151 may cover a region of the second surface 2, where the third and fourth band portions 131c and 132c are not disposed, and the third and fourth band portions 131c and 132c. Accordingly, the insulating layer 151 may cover a region where an end of the third or fourth band portion 131c or 132c and the body 110 are in contact with each other to prevent the pathway for the penetration of the moisture, thereby further improving moisture resistance reliability of the multilayer electronic component.

The insulating layer 151 may be disposed on the second surface and extended to the first and second connection portions 131*a* and 132*a*. In addition, the insulating layer 151 may cover the entire second surface 2 when none of the external electrodes 131 and 132 is disposed on the second surface 2. Meanwhile, the insulating layer 151 may not be necessarily disposed on the second surface 2, the insulating layer 151 may not be disposed on the partial or entire second surface 2, and the insulating layer 151 may be separated into two layers and disposed on each of the first and second connection portions 131*a* and 132*a*. The insulating layer 151 may be disposed below the extension line of the second surface 2 when not disposed on the entire second surface 2. In addition, even when not disposed on the second surface 2, the insulating layer 151 may be disposed on the first and second connection portions 131*a* and 132*a* extended to the fifth and sixth surfaces 5 and 6 to be one insulating layer.

Further, the insulating layer 151 may cover the first and second side band portions and the partial fifth and sixth surfaces 5 and 6. Here, portions of the fifth and sixth surfaces 5 and 6, which are not covered by the insulating layer 151, may be externally exposed.

In addition, the insulating layer 151 may cover the first and second side band portions and the entire fifth and sixth surfaces 5 and 6. In this case, none of the fifth and sixth surfaces may be externally exposed to improve moisture resistance reliability, and none of the connection portions 131*a* and 132*a* may be directly and externally exposed to improve the reliability of the multilayer electronic component 1000. In more detail, the insulating layer 151 may cover both the first and second side band portions, and cover all regions of the fifth and sixth surfaces 5 and 6 except for regions where the first and second side band portions are formed.

The insulating layer 151 may serve to prevent the plating layers 141 and 142 from being formed on the external electrodes 131 and 132 on which the insulating layer 151 is disposed, and improve a sealing characteristic to minimize the penetration of the external moisture, plating solution or the like.

The insulating layer 151 may include the oxide including aluminum (Al).

Conventionally, the insulating layer may generally use a glass-based material. However, due to a characteristic of the glass-based material, the insulating layer may be severely aggregated when fired, thus making it difficult to have a uniform film, and heat required during its firing process may also cause stress in the body, thereby causing cracking or delamination of the insulating layer. In addition, when using the insulating layer including the glass-based material, used is a method of firing the insulating layer including the glass-based material after firing the external electrode. However, the metal material of the external electrode may be diffused into the internal electrode and cause radial cracking of the insulating layer during its firing process. Further, the glass-based material may be generally brittle and thus be broken even by a small impact.

The present disclosure suggests the insulating layer using the oxide including aluminum (Al) instead of the glass-based material to solve such a problem of the glass-based insulating layer. The oxide including aluminum (Al) may not only have an insulating characteristic, but also have superior impact resistance compared to the glass-based material.

In addition, when made using the oxide including aluminum (Al), the insulating layer 151 may have a more uniform and dense film than when using the glass-based material, thereby effectively improving moisture resistance reliability.

In addition, when made using the oxide including aluminum (Al), the insulating layer 151 may have more effectively improved hardness, strength, abrasion resistance and moisture resistance reliability than when using another inorganic material, and have excellent corrosion resistance to an acid solution such as the plating solution.

A method of forming the insulating layer 151 may not need to be particularly limited.

For example, the external electrodes 131 and 132 may be formed on the body 110 and the insulating layer 151 made of the oxide including aluminum (Al) may then be formed using an atomic layer deposition (ALD) method. That is, the insulating layer 151 may be formed by the atomic layer deposition method, the insulating layer 151 may thus be more easily made dense and uniform, and a thickness of the insulating layer 151 may also be easily adjusted. In addition, the atomic layer deposition method may be performed in a temperature range of about 60° C. to about 200° C., is not limited thereto, and may use any of a sol-gel coating method, a powder coating method and the like as long as the insulating layer 151 is made dense and uniform.

A type of the oxide including aluminum (Al), included in the insulating layer 151, is not particularly limited, and may be, for example, aluminum oxide ($Al_2O_3$).

The oxide including aluminum (Al) such as aluminum oxide ($Al_2O_3$) may have higher physical, chemical, mechanical and thermal stability than a general metal or a ceramic material.

Meanwhile, when the insulating layer 151 including aluminum oxide ($Al_2O_3$) is formed by a firing method, abnormal grain growth may occur when the insulating layer 151 is contracted depending on purity of aluminum oxide ($Al_2O_3$), a dispersion degree of the powder particles, and a type of the binder. Therefore, according to an exemplary embodiment, the insulating layer 151 of the present disclosure, including the oxide including aluminum (Al), may be formed by the atomic layer deposition method, thereby fundamentally preventing the above problem, i.e., the abnormal grain growth of the oxide including aluminum (Al).

In addition, when the insulating layer 151 is formed by the firing method rather than the atomic layer deposition method, the insulating layer 151 including aluminum (Al) may further include an oxide including magnesium (Mg), and thus have a dense and uniform microstructure.

Therefore, the insulating layer 151 in an exemplary embodiment may have improved strength and uniformity by further including the oxide including magnesium (Mg), to allow the multilayer electronic component 1000 to have the improved moisture resistance reliability and acid resistance to the plating solution, and to further suppress cracking from occurring and being propagated.

In the insulating layer 151 in an exemplary embodiment, 0.95 or more may be the number of moles of an aluminum (Al) element relative to a total number of moles of elements other than oxygen. That is, the insulating layer 151 may be substantially made of the oxide including aluminum (Al) except for elements detected as impurities. Here, the oxide including aluminum (Al) may be aluminum oxide ($Al_2O_3$). Accordingly, it is possible to further suppress cracking occurring due to a thermal contraction, radial cracking occurring due to a metal diffusion or the like, and to further improve moisture resistance reliability, the corrosion resistance to the plating solution or the like.

Here, the components of the insulating layer 151 may be calculated from an image observed using a scanning electron microscope-energy dispersive X-ray spectroscopy (SEM-EDS). In detail, it is possible to measure the number of moles of each element included in the insulating layer in a central region among regions where the insulating layer is divided into five equal portions in the thickness direction by using the EDS after polishing the multilayer electronic component to a central position in the width direction (i.e. third direction) to expose its cross section (i.e. L-T cross section) cut in the length and thickness direction, and to calculate the number of moles of aluminum (Al) atoms relative to the total number of moles of the elements other than the oxygen atoms.

In an exemplary embodiment, the insulating layer 151 may be in direct contact with the first and second external electrodes 131 and 132, and the first and second external electrodes 131 and 132 may each include the conductive metal and resin. Accordingly, none of the plating layers 141 and 142 may be disposed in a region where the insulating layer 151 is disposed on an outer surface of the first or second external electrode 131 or 132, thereby effectively suppressing erosion of the external electrode by the plating solution.

Here, the first plating layer 141 may cover the end of the insulating layer 151, disposed on the first external electrode 131, and the second plating layer 142 may cover the end of the insulating layer 151, disposed on the second external electrode 132. It is possible to first form the insulating layer 151 before forming the plating layer 141 or 142 on the external electrode 131 or 132, thereby more reliably suppressing the penetration of the plating solution in a process of forming the plating layer. As the insulating layer is formed before the plating layer, the plating layer 141 or 142 may cover the end of the insulating layer 151.

When having an average thickness t2 of less than 50 nm, the insulating layer 151 may not fully suppress cracking occurring due to the thermal contraction, radial cracking occurring due to the metal diffusion or the like and may not sufficiently improve moisture resistance reliability.

When having the average thickness t2 of less than 600 nm, the insulating layer 151 may be damaged by the plating solution.

Therefore, in an exemplary embodiment, the insulating layer 151 having an average thickness t2 of 50 nm or more may fully suppress radial cracking occurring or the like and sufficiently improve moisture resistance reliability. The insulating layer 151 having an average thickness of 600 nm or more may secure excellent corrosion resistance to the plating solution, and the insulating layer 151 having an average thickness of 800 nm or more may secure remarkable corrosion resistance to the plating solution.

An upper limit of the average thickness t2 of the insulating layer 151 is not particularly limited. However, when the insulating layer has the average thickness t2 greater than 1000 nm, it may cause an excessive cost consumed in the process and be difficult to have the multilayer electronic component made smaller.

Therefore, the insulating layer 151 may have the average thickness t2 of 1000 nm or less.

Here, the average thickness t2 of the insulating layer 151 may have a value obtained by averaging thickness values of the insulating layer measured at two points spaced apart from each other by 5 μm and two points spaced apart from each other by 10 μm, based on central points of the first and second connection portions 131a and 132a in the first direction.

Table 1 below shows evaluation of moisture resistance reliability based on the average thickness of the insulating layer 151 including aluminum oxide ($Al_2O_3$), formed using the atomic layer deposition method.

In detail, aluminum oxide ($Al_2O_3$) is coated on a polyimide (PI) film for each test number by using an atomic layer deposition method to have a different average thickness, and its moisture permeation is then measured at a relative humidity of 100% and a temperature of 37.8° C.

The evaluation of moisture resistance reliability is made to the insulating layer including aluminum oxide ($Al_2O_3$) formed on the PI Film, and the same evaluation may also be applied to the insulating layer 151 of the multilayer electronic component according to an inventive example of the present disclosure.

TABLE 1

| Test no. | Average thickness (nm) of insulating layer including $Al_2O_3$ | Moisture permeation (mg/[$m^2 \cdot$ day]) |
|---|---|---|
| 1* | 20 | 836 |
| 2 | 50 | 0 |
| 3 | 100 | 0 |

*Comparative example

Test No. 1 is a case in which the insulating layer 151 including aluminum oxide ($Al_2O_3$) has the average thickness of less than 50 nm, and thus insufficiently suppresses the moisture permeation.

Test Nos. 2 and 3 are cases in which the insulating layer 151 including aluminum oxide ($Al_2O_3$) has the average thickness of 50 nm or more and moisture permeation of zero (0) mg/$m^2$ day, and thus remarkably suppresses the moisture permeation.

Therefore, the insulating layer 151 of the multilayer electronic component 1000 according to an exemplary embodiment may have the average thickness t2 of 50 nm or more, thereby preventing the moisture permeation and thus securing the excellent moisture resistance reliability.

Table 2 below shows evaluation of the corrosion resistance to the plating solution, based on the average thickness of the insulating layer 151 including aluminum oxide ($Al_2O_3$), formed using the atomic layer deposition method.

In detail, aluminum oxide ($Al_2O_3$) is coated on the entire surfaces of the body and external electrode by using the atomic layer deposition method, and ** plating is then performed. Then, when a cross section of the body in the width-thickness direction is observed using an optical microscope, a case in which the insulating layer is damaged and the damaged portion is plated is evaluated as NG, and a case in which there is no damage to the insulating layer and no plating layer is formed is evaluated as OK, and each number is then specified.

The evaluation of the corrosion resistance is conducted by preparing 20 samples for each test number having a different thickness, and aluminum oxide ($Al_2O_3$) is coated on the entire surfaces of the body and external electrode and then evaluated. However, the same evaluation may also be applied to the insulating layer 151 of the multilayer electronic component according to various inventive examples of the present disclosure.

TABLE 2

| Test no. | Average thickness (nm) of insulating layer | Evaluation of corrosion resistance to plating solution (Number of NG/Total number) |
|---|---|---|
| 1* | 400 | 16/20 |
| 2 | 600 | 1/20 |
| 3 | 800 | 0/20 |
| 4 | 1000 | 0/20 |

*Comparative example

Test No. 1 is a case in which the insulating layer has an average thickness of 400 nm, and thus has insufficient corrosion resistance to the plating solution.

Test No. 2 is a case in which the insulating layer has an average thickness of 600 nm, and thus has excellent corrosion resistance to the plating solution.

Test Nos. 3 and 4 are cases in which the insulating layer has an average thickness of 800 nm, and thus has remarkable corrosion resistance to the plating solution.

Therefore, the insulating layer 151 of the multilayer electronic component 1000 according to an exemplary embodiment may have the average thickness t2 of 600 nm or more, thereby securing the excellent corrosion resistance to the plating solution. The insulating layer 151 having the average thickness t2 of 800 nm or more may secure the remarkable corrosion resistance to the plating solution.

The first and second plating layers 141 and 142 may respectively be disposed on the first and second band portions 131b and 132b. The plating layers 141 and 142 may allow the multilayer electronic component to be more easily mounted on the board, be disposed on the band portions 131b and 132b to minimize a space in which the multilayer electronic component is mounted, and minimize the penetration of the plating solution to the internal electrode, thereby improving the reliability of the multilayer electronic component. One end of the first and second plating layer 141 or 142 may be in contact with the first surface, and the other end thereof may be in contact with the insulating layer 151.

The plating layer 141 or 142 is not limited to a particular type, may include at least one of copper (Cu), nickel (Ni), tin (Sn), silver (Ag), gold (Au), palladium (Pd) and alloys thereof, or may include the plurality of layers.

As a more specific example of the plating layer 141 or 142, the plating layer 141 or 142 may be a nickel (Ni) plating layer or a tin (Sn) plating layer for example, and may have the Ni plating layer and the Sn plating layer sequentially formed on the first or second band portion 131b or 132b.

In an exemplary embodiment, the first and second plating layers 141 and 142 may respectively be extended to partially cover the first and second connection portions 131a and 132a. H1≥H2 when H1 indicates an average size of a region in the first direction, measured from the first surface 1 to the internal electrode disposed closest to the first surface 1 among the first and second internal electrodes 121 and 122, and H2 indicates an average size of the first or second plating layer 141 or 142 in the first direction, measured from the extension line of the first surface 1 to an end of the plating layer disposed on the first or second connection portion 131a or 132a. Accordingly, it is possible to suppress the plating solution from penetrating into the internal electrode during the plating process, thereby allowing the multilayer electronic component to have the improved reliability.

H1 and H2 may be values each obtained by averaging values measured in the cross section (i.e., L-T cross section) of the body 110, cut in the first and second directions, at five equally spaced points in the third direction. H1 may indicate an average of values measured at a point where the internal electrode, disposed closest to the first surface 1 in each cross section, is connected to the external electrode, H2 may indicate an average of values measured based on the end of the plating layer in contact with the external electrode, and the extension line E1 of the first surface 1 serving as a reference when measuring H1 and H2 may be the same.

In an exemplary embodiment, the first plating layer 141 may cover the end of the insulating layer 151, disposed on the first external electrode 131, and the second plating layer 142 may cover the end of the insulating layer 151, disposed on the second external electrode 132. Accordingly, it is possible to strengthen a bonding force of the insulating layer 151 and the plating layer 141 or 142, thereby improving the reliability of the multilayer electronic component 1000.

In an exemplary embodiment, the insulating layer 151 may cover an end of the first plating layer 141, disposed on the first external electrode 131, and the insulating layer 151 may cover an end of the second plating layer 142, disposed on the second external electrode 132. Accordingly, it is possible to strengthen the bonding force of the insulating layer 151 and the plating layer 141 or 142, thereby improving the reliability of the multilayer electronic component 1000.

In an exemplary embodiment, $0.2 \leq B1/L \leq 0.4$ and $0.2 \leq B2/L \leq 0.4$ when L indicates an average size of the body 110 in the second direction, B1 indicates an average size of the first band portion in the second direction, measured from the extension line of the third surface to an end of the band portion, and B2 indicates an average size of the second band portion in the second direction, measured from the extension line of the fourth surface to an end of the band portion.

When B1/L and B2/L are less than 0.2, it may be difficult to secure sufficient adhesion force. On the other hand, when B2/L is greater than 0.4, a leakage current may occur between the first band portion 131b and the second band portion 132b under a high-voltage current, and the first band portion 131b and the second band portion 132b may be electrically connected with each other due to plating spread or the like during the plating process.

B1, B2 and L may be values each obtained by averaging values measured in the cross section (i.e., L-T cross section) of the body 110, cut in the first and second directions at five equally spaced points in the third direction.

Referring to FIG. 5 illustrating a mounting board 1100 on which a multilayer electronic component 1000 is mounted, the plating layers 141 and 142 of the multilayer electronic component 1000 may be joined to the board 180 by electrode pads 181 and 182 and solders 191 and 192, disposed on the board 180.

Meanwhile, when the internal electrodes 121 and 122 are stacked on each other in the first direction, the multilayer electronic component 1000 may be horizontally mounted on the board 180 so that the internal electrodes 121 and 122 are parallel to a surface on which the multilayer electronic component is mounted. However, the present disclosure is not limited to the horizontal mounting, and when the internal electrodes 121 and 122 are stacked on each other in the third direction, the multilayer electronic component may be vertically mounted on the board so that the internal electrodes 121 and 122 are perpendicular to the surface on which the multilayer electronic component is mounted.

The multilayer electronic component 1000 may not need to be limited to a particular size.

However, in order for the multilayer electronic component to have the smaller size and simultaneously have the higher capacitance, it is necessary to increase the number of stacks by allowing the dielectric layer and the internal electrode to each have a smaller thickness. The multilayer electronic component 1000 having a size of 1005 (i.e., length×width of 1.0 mm×0.5 mm) or less may thus have more remarkably improved reliability and capacitance per unit volume according to the present disclosure.

Therefore, in consideration of a manufacturing error, a size of the external electrode and the like, when having a length of 1.1 mm or less and a width of 0.55 mm or less, the multilayer electronic component 1000 may have the more remarkably improved reliability according to the present disclosure. Here, the length of the multilayer electronic component 1000 may indicate a maximum size of the multilayer electronic component 1000 in the second direction, and the width of the multilayer electronic component 1000 may indicate a maximum size of the multilayer electronic component 1000 in the third direction.

Figure 6:
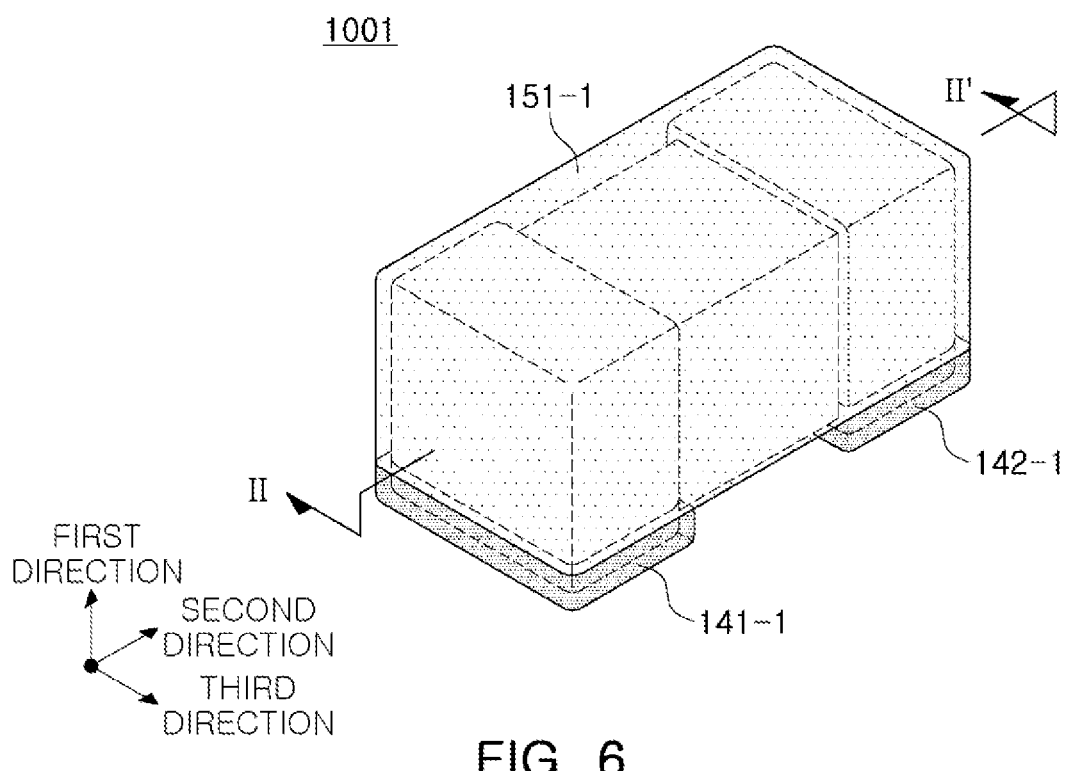
FIG. 6 is a perspective view schematically illustrating a multilayer electronic component according to another exemplary embodiment of the present disclosure.
Figure 7:
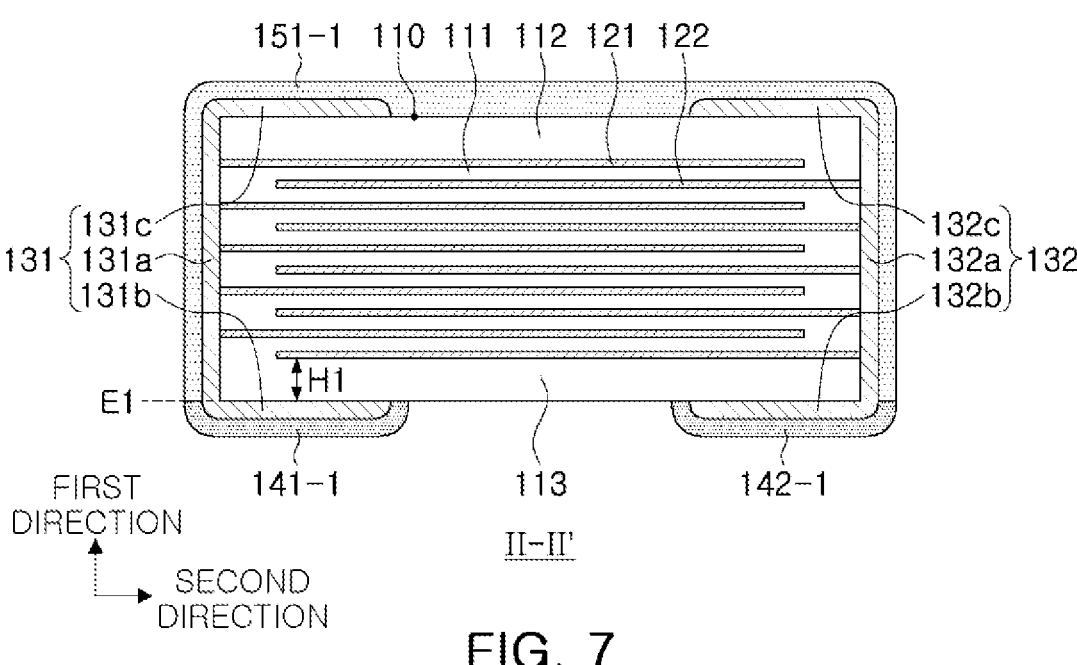
FIG. 7 is a cross-sectional view taken along line II-II' of FIG. 6.

FIG. 6 is a perspective view schematically illustrating a multilayer electronic component 1001 according to another exemplary embodiment of the present disclosure; and FIG. 7 is a cross-sectional view taken along line II-IP of FIG. 6.

Referring to FIGS. 6 and 7, the multilayer electronic component 1001 according to another exemplary embodiment of the present disclosure may have first and second plating layers 141-1 and 142-1 each disposed below the extension line E1 of the first surface 1. Accordingly, it is possible to minimize a height of the solder when the multilayer electronic component is mounted on the board and to minimize a space in which the multilayer electronic component is mounted.

In addition, an insulating layer 151-1 may be extended below the extension line E1 of the first surface to be in contact with the first and second plating layers 141-1 and 142-1.

Figure 8:
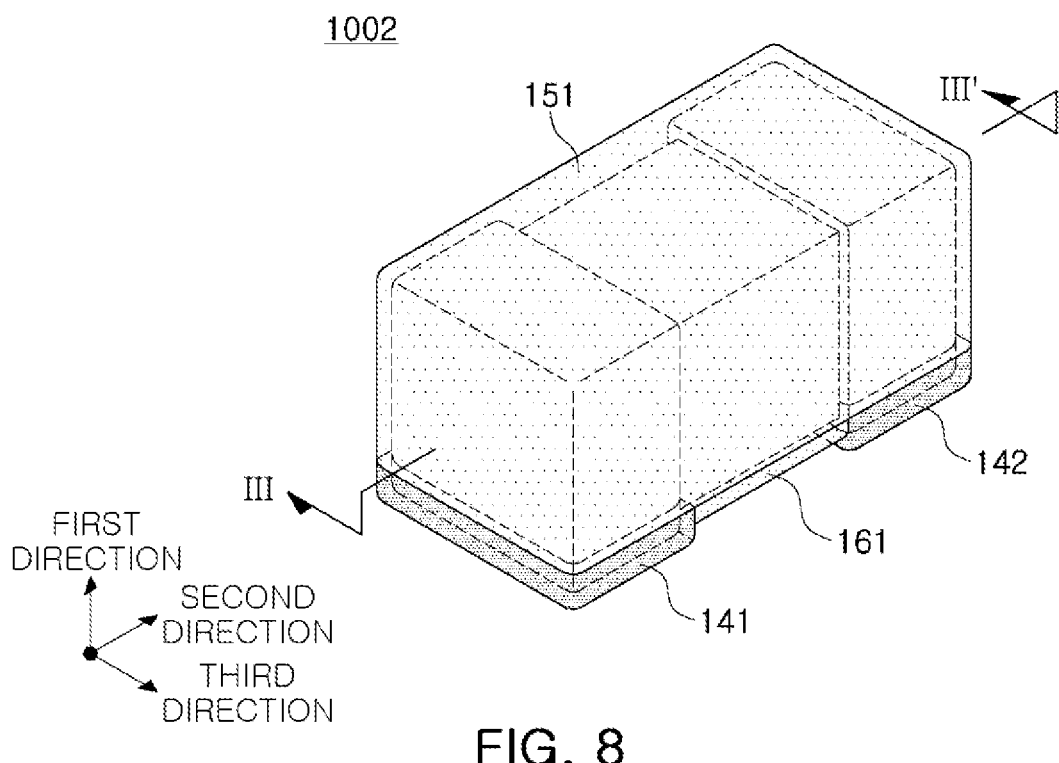
FIG. 8 is a perspective view schematically illustrating a multilayer electronic component according to another exemplary embodiment of the present disclosure.
Figure 9:
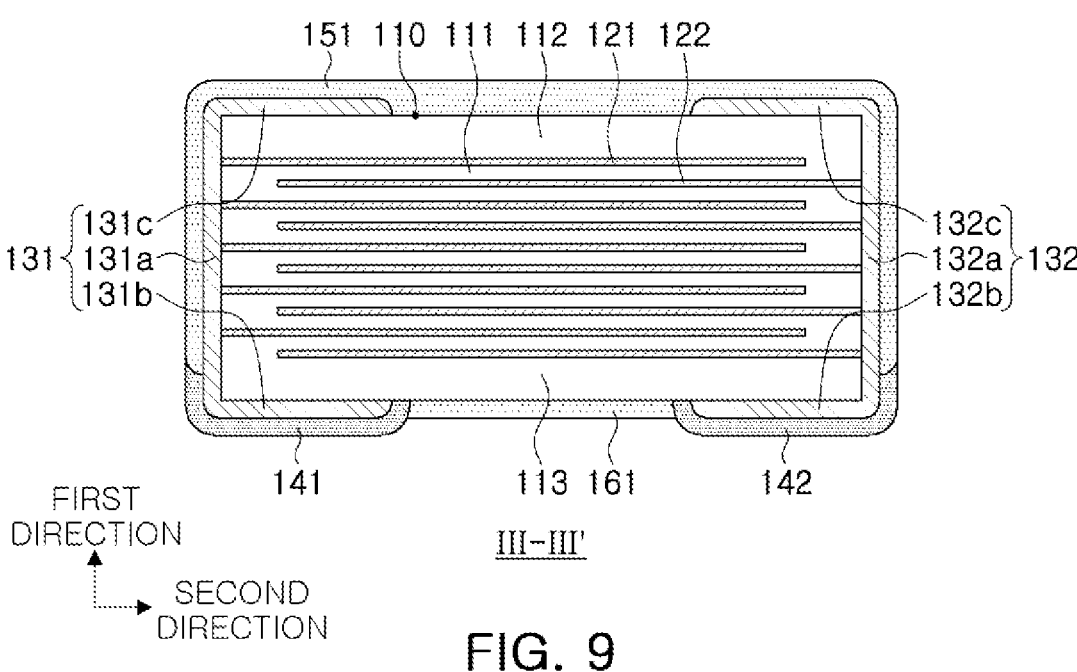
FIG. 9 is a cross-sectional view taken along line of FIG. 8.

FIG. 8 is a perspective view schematically illustrating a multilayer electronic component 1002 according to another exemplary embodiment of the present disclosure; and FIG. 9 is a cross-sectional view taken along line of FIG. 8.

Referring to FIGS. 8 and 9, the multilayer electronic component 1002 according to another exemplary embodiment of the present disclosure may further include an additional insulating layer 161 disposed on the first surface 1 and between the first band portion 131*b* and the second band portion 132*b*. Accordingly, it is possible to prevent the leakage current or the like which may occur between the first band portion 131*b* and the second band portion 132*b* under the high-voltage current.

The additional insulating layer 161 may not need to be limited to a particular type. For example, the additional insulating layer 161 may include the oxide including aluminum (Al) like the insulating layer 151. However, it is not necessary to limit the additional insulating layer 161 and the insulating layer 151 to the same material, and the insulating layers may be made of materials different from each other. For example, the insulating layer 161 may include one or more selected from epoxy resin, acrylic resin, ethyl cellulose or the like, or may include glass.

Figure 10:
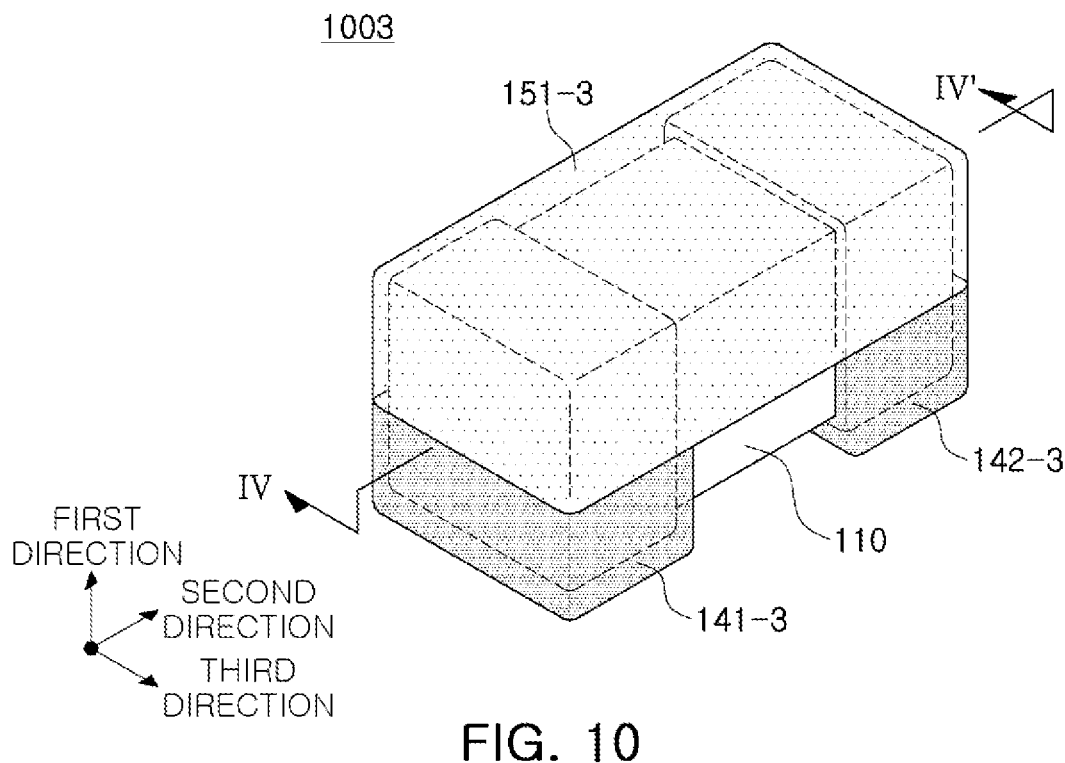
FIG. 10 is a perspective view schematically illustrating a multilayer electronic component according to another exemplary embodiment of the present disclosure.
Figure 11:
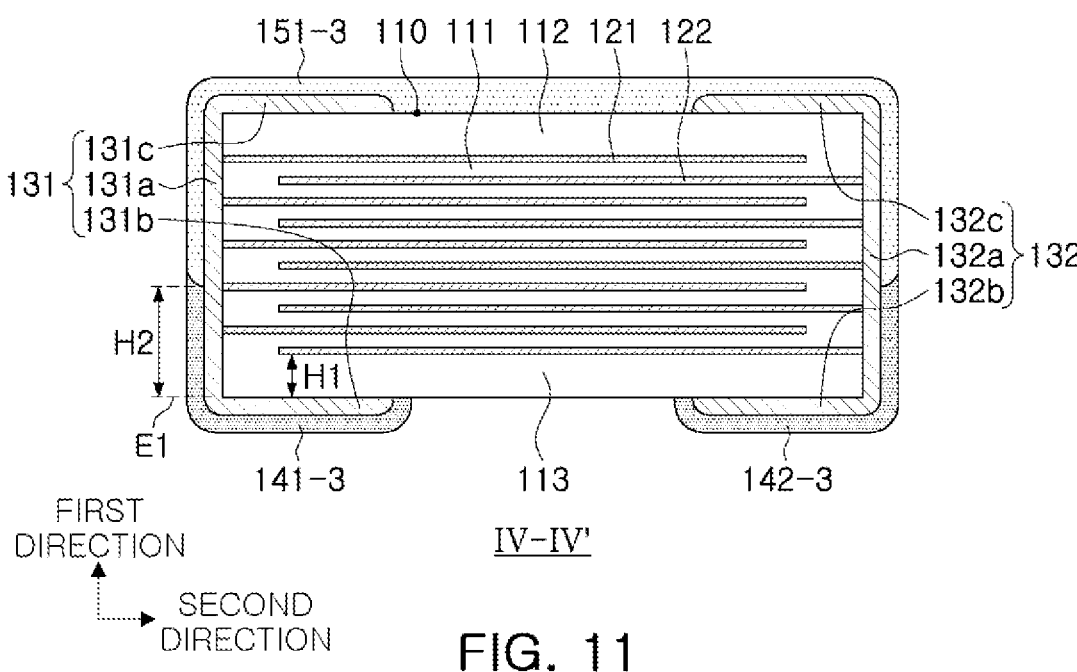
FIG. 11 is a cross-sectional view taken along line IV-IV' of FIG. 10.

FIG. 10 is a perspective view schematically illustrating a multilayer electronic component 1003 according to another exemplary embodiment of the present disclosure; and FIG. 11 is a cross-sectional view taken along line IV-IV' of FIG. 10.

Referring to FIGS. 10 and 11, in the multilayer electronic component 1003 according to another exemplary embodiment, H1<H2 when H1 indicates an average size of a region in the first direction, measured from the first surface 1 to the internal electrode disposed closest to the first surface 1 among the first and second internal electrodes 121 and 122, and H2 indicates an average size of a plating layer 141-3 or 142-3 in the first direction, measured from the extension line of the first surface 1 to an end of the plating layer 141-3 or 142-3 disposed on the first or second connection portion 131*a* or 132*a*. Accordingly, it is possible to improve the adhesion force by increasing an area where the multilayer electronic component is in contact with the solder when the multilayer electronic component is mounted on the board.

H2<T/2 when T indicates the average size of the body 110 in the first direction. That is, H1<H2<T/2. The reason is that moisture resistance reliability improved by the insulating layer may be reduced when H2 is T/2 or more.

H1, H2 and T may be the values each obtained by averaging the values measured in the cross section (i.e., L-T cross section) of the body 110, cut in the first and second directions at five equally spaced points in the third direction. H1 may indicate the average of the values measured at the point where the internal electrode, disposed closest to the first surface 1 in each cross section, is connected to the external electrode, H2 may indicate the average of the values measured based on the end of the plating layer in contact with the external electrode, and the extension line E1 of the first surface serving as the reference when measuring H1 and H2 may be the same. In addition, T may be an average value after measuring a maximum size of the body 110 in the first direction in each cross section.

Figure 12:
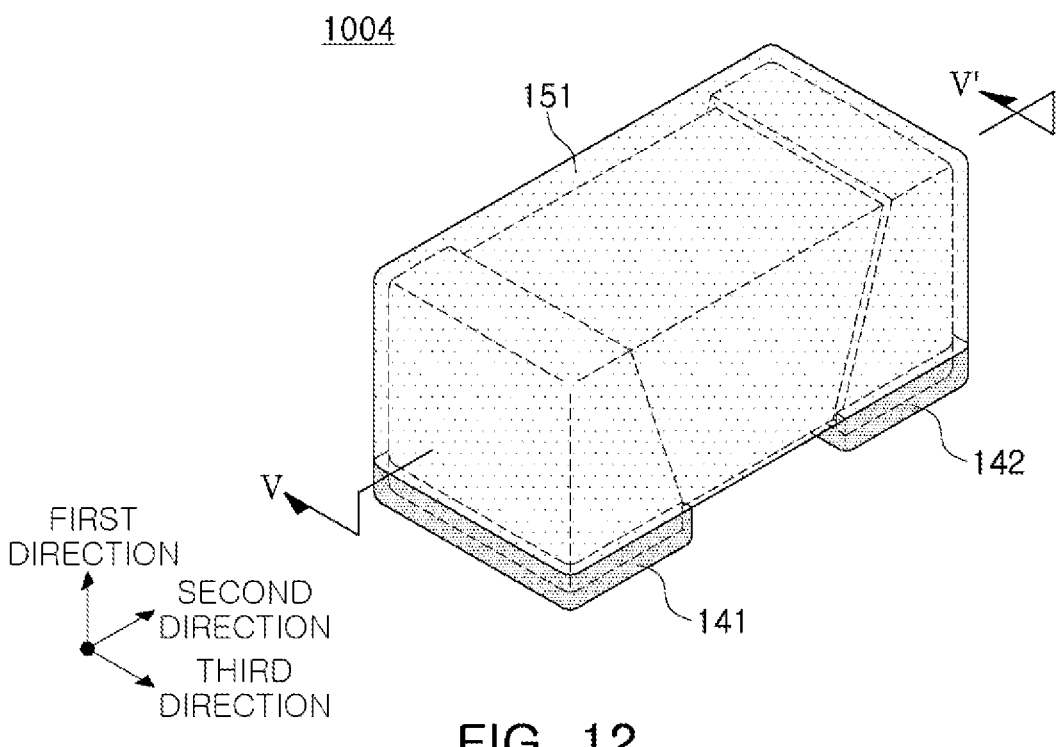
FIG. 12 is a perspective view schematically illustrating a multilayer electronic component according to another exemplary embodiment of the present disclosure.
Figure 13:
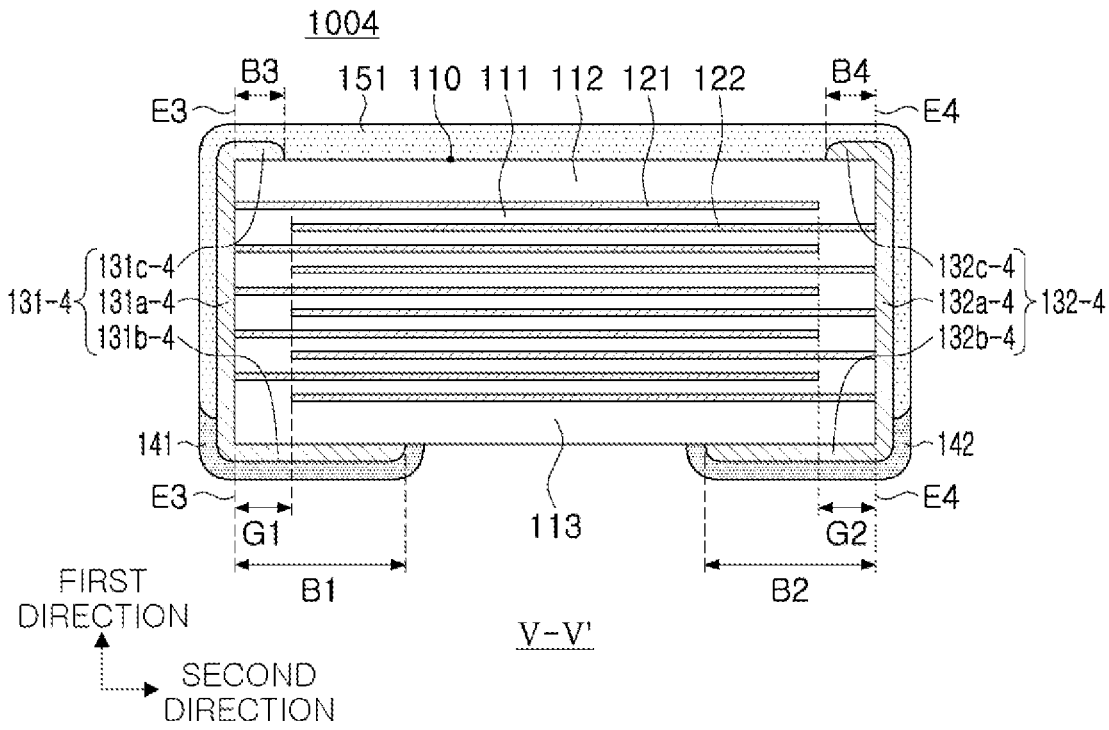
FIG. 13 is a cross-sectional view taken along line V-V' of FIG. 12.

FIG. 12 is a perspective view schematically illustrating a multilayer electronic component 1004 according to another exemplary embodiment of the present disclosure; and FIG. 13 is a cross-sectional view taken along line V-V' of FIG. 12.

Referring to FIGS. 12 and 13, in the multilayer electronic component 1004 according to another exemplary embodiment of the present disclosure, the average length B1 of the first band portion 131*b*-4 may be longer than an average length B3 of the third band portion 131*c*-4, and an average length of the second band portion 132*b*-4 may be longer than an average length B4 of the fourth band portion 132*c*-4. Accordingly, it is possible to improve the adhesion force by increasing the area where the multilayer electronic component is in contact with the solder when the multilayer electronic component is mounted on the board.

In more detail, B3<B1 and B4<B2 when B1 indicates an average size of the first band portion 131*b*-4 in the second direction, measured from the extension line E3 of the third surface 3 to an end of the first band portion 131*b*-4, B2 indicates an average size of the second band portion 132*b*-4 in the second direction, measured from the extension line E4 of the fourth surface 4 to an end of the second band portion 132*b*-4, B3 indicates an average size of the third band portion 131*c*-4 in the second direction, measured from the extension line E3 of the third surface 3 to an end of the third band portion 131*c*-4, and B4 indicates an average size of the fourth band portion 132*c*-4 in the second direction, measured from the extension line E4 of the fourth surface 4 to an end of the fourth band portion 132*c*-4.

Here, $0.2 \leq B1/L \leq 0.4$ and $0.2 \leq B2/L \leq 0.4$ when L indicates the average size of the body 110 in the second direction.

B1, B2, B3, B4 and L may be values each obtained by averaging values measured in the cross section (i.e., L-T cross section) of the body 110, cut in the first and second directions at five equally spaced points in the third direction.

In addition, the first external electrode 131-4 may include a first side band portion extended from the first connection portion 131*a*-4 to portions of the fifth and sixth surfaces 5 and 6, and the second external electrode 132-4 may include a second side band portion extended from the second connection portion 132$a$-4 to portions of the fifth and sixth surfaces 5 and 6. Here, the first or second side band portion may have a size gradually increased in the second direction as being closer to the first surface 1. That is, the first or second side band portion may have a tapered shape or a trapezoidal shape.

Further, B3≤G1 and B4≤G2 when B3 indicates the average size of the third band portion 131$c$-4 in the second direction, measured from the extension line E3 of the third surface 3 to the end of the third band portion 131$c$-4, B4 indicates the average size of the fourth band portion 132$c$-4 in the second direction, measured from the extension line E4 of the fourth surface 4 to the end of the fourth band portion 132$c$-4, G1 indicates an average size of a region in the second direction, where the third surface 3 and the second internal electrode 122 are spaced apart from each other, and G2 indicates an average size of a region in the second direction, where the fourth surface 4 and the first internal electrode 121 are spaced apart from each other. Accordingly, it is possible to minimize a volume of the external electrode, thereby increasing the capacitance of the multilayer electronic component 1004 per unit volume.

In the cross section cut in the first and second directions from a center of the body in the third direction, G1 may indicate a value obtained by averaging sizes of the region in the second direction, measured from any five second internal electrodes positioned in the center of the body in the first direction to the third surface spaced apart from the internal electrodes, and G2 may indicate a value obtained by averaging sizes of the region in the second direction, measured from any five first internal electrodes positioned in the center of the body in the first direction to the fourth surface spaced apart from the internal electrodes.

Further, G1 and G2 may indicate values each obtained from the cross section (i.e., L-T cross section) of the body 110, cut in the first and second directions at five equally spaced points in the third direction, and these values may further be generalized by taking G1 and G2 as their averages.

However, it is not intended to limit the present disclosure to B3≤G1 and B4≤G2, and a case in which B3≥G1 and B4≥G2 may also be included as another exemplary embodiment of the present disclosure. Accordingly, in another exemplary embodiment, B3≥G1 and B4≥G2 when B3 indicates an average size of the third band portion in the second direction, measured from the extension line E3 of the third surface 3 to an end of the third band portion, B4 indicates an average size of the fourth band portion in the second direction, measured from the extension line E4 of the fourth surface 4 to an end of the fourth band portion, G1 indicates an average size of a region in the second direction, where the third surface and the second internal electrode are spaced apart from each other, and G2 indicates an average size of a region in the second direction, where the fourth surface and the first internal electrode are spaced apart from each other.

In another exemplary embodiment, B1≥G1 and B2≥G2 when B1 indicates an average size of the first band portion in the second direction, measured from the extension line E3 of the third surface to the end of the band portion, and B2 indicates an average size of the second band portion in the second direction, measured from the extension line E4 of the fourth surface to an end of the band portion. Accordingly, it is possible to improve the adhesion force of the multilayer electronic component 1004 to the board 180.

Figure 14:
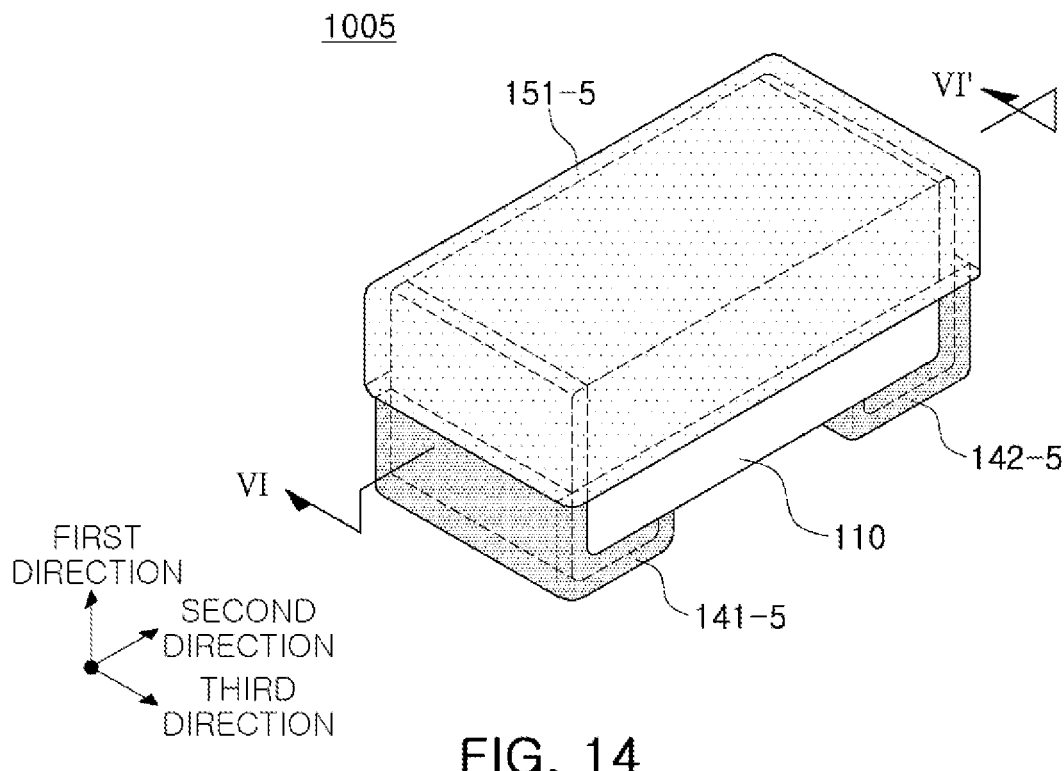
FIG. 14 is a perspective view schematically illustrating a multilayer electronic component according to another exemplary embodiment of the present disclosure.
Figure 15:
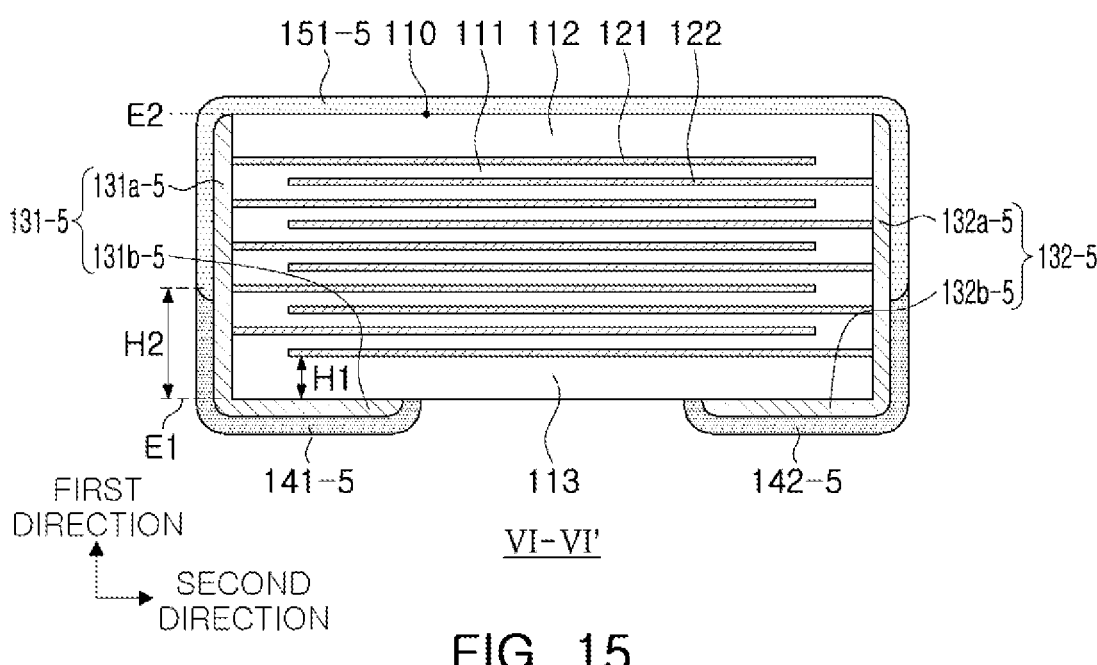
FIG. 15 is a cross-sectional view taken along line VI-VI' of FIG. 14.

FIG. 14 is a perspective view schematically illustrating a multilayer electronic component 1005 according to another exemplary embodiment of the present disclosure; and FIG. 15 is a cross-sectional view taken along line VI-VI' of FIG. 14.

Referring to FIGS. 14 and 15, first and second external electrodes 131-5 and 132-5 of the multilayer electronic component 1005 according to another exemplary embodiment of the present disclosure may not be disposed on the second surface and may be disposed on the third, fourth and first surfaces to each have an L-shape. That is, the first and second external electrodes 131-5 and 132-5 may be disposed below the extension line of the second surface.

The first external electrode 131-5 may include a first connection portion 131$a$-5 disposed on the third surface 3 and a first band portion 131$b$-5 extended from the first connection portion 131$a$-5 to a portion of the first surface 1, and the second external electrode 132-5 may include a second connection portion 132$a$-5 disposed on the fourth surface 4 and a second band portion 132$b$-5 extended from the second connection portion 132$a$-5 to a portion of the first surface 1. The external electrodes 131-5 and 132-5 may not be disposed on the second surface 2, and an insulating layer 151-5 may cover the entire second surface 2. Accordingly, it is possible to minimize volumes of the external electrodes 131-5 and 132-5, thereby further improving the capacitance of the multilayer electronic component 1005 per unit volume. However, the insulating layer 151-5 may not need to be limited to covering the entire second surface 2. The insulating layer may not cover the partial or entire second surface 2, and be separated to respectively cover the first and second connection portions 131$a$-5 and 132$a$-5.

In addition, the insulating layer 151-5 may cover the partial fifth and sixth surfaces, thereby further improving the reliability of the multilayer electronic component. Here, portions of the fifth and sixth surfaces, which are not covered by the insulating layer 151-5, may be externally exposed.

Further, the insulating layer 151-5 may cover the entire fifth and sixth surfaces. In this case, none of the fifth and sixth surfaces may be externally exposed to further improve moisture resistance reliability.

A first plating layer 141-5 may be disposed on the first band portion 131$b$-5, and a second plating layer 142-5 may be disposed on the second band portion 132$b$-5. The first and second plating layers 141-5 and 142-5 may respectively be extended to portions of the first and second connection portions 132$a$-5 and 132$b$-5.

Here, none of the external electrodes 131-5 and 132-5 may also be disposed on the fifth and sixth surfaces 5 and 6. That is, the external electrodes 131-5 and 132-5 may be disposed only on the third, fourth and first surfaces.

H1<H2 when H1 indicates the average size of the region in the first direction, measured from the first surface 1 to the internal electrode disposed closest to the first surface 1 among the first and second internal electrodes 121 and 122, and H2 indicates an average size of the first or second plating layer 141-5 or 142-5 in the first direction, measured from the extension line E1 of the first surface 1 to an end of the plating layer disposed on the first or second connection portion 131$a$-5 or 132$a$-5. Accordingly, it is possible to improve the adhesion force by increasing the area where the multilayer electronic component is in contact with the solder when the multilayer electronic component is mounted on the board, and to increase an area where the external electrode 131-5 or 132-5 and the plating layer 141-5 or 142-5 in contact with each other, thereby suppressing an increase in equivalent series resistance (ESR).

H2<T/2 when T indicates the average size of the body 110 in the first direction. That is, H1<H2<T/2. The reason is that moisture resistance reliability improved by the insulating layer may be reduced when H2 is T/2 or more.

In addition, the first or second plating layer 141-5 or 142-5 may cover a portion of the insulating layer 151-1 on the third or fourth surface. That is, the plating layer 141-5 or 142-5 may cover an end of the insulating layer 151-5 on the third or fourth surface. Accordingly, it is possible to strengthen a bonding force of the insulating layer 151-5 and the plating layer 141-5 or 142-5, thereby improving the reliability of the multilayer electronic component 1005.

In addition, the insulating layer 151-5 may cover a portion of the first or second plating layer 141-5 or 142-5 on the third or fourth surface. That is, the insulating layer 151-5 may cover an end of the plating layer 141-5 or 142-5 on the third or fourth surface. Accordingly, it is possible to strengthen the bonding force of the insulating layer 151-5 and the plating layer 141-5 or 142-5, thereby improving the reliability of the multilayer electronic component 1005.

Figure 16:
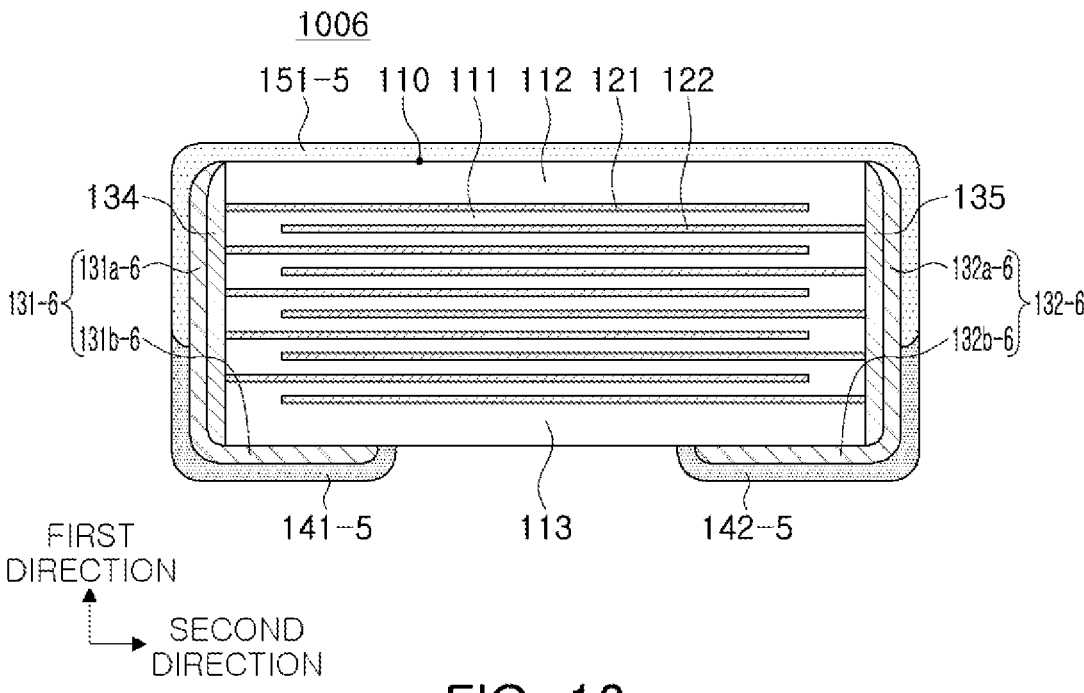
FIG. 16 shows a modified example of FIG. 14.

FIG. 16 shows a modified example of FIG. 14. Referring to FIG. 16, in a modified example 1006 of the multilayer electronic component 1005 according to another exemplary embodiment of the present disclosure, a first additional electrode layer 134 may be disposed between a first connection portion 131*a*-6 and the third surface, and a second additional electrode layer 135 may be disposed between a second connection portion 132*a*-6 and the fourth surface. The first additional electrode layer 134 may be disposed not to deviate from the third surface, and the second additional electrode layer 135 may be disposed not to deviate from the fourth surface. The first and second additional electrode layers 134 and 135 may improve the electrical connectivity between the internal electrodes 121 and 122, and have excellent bonding forces with the external electrodes 131-6 and 132-6, and thus serve to further improve mechanical bonding forces of the external electrodes 131-6 and 132-6.

The first and second external electrodes 131-6 and 132-6 may each have an L-shape in which none of the first and second external electrodes is disposed on the second surface.

The first external electrode 131-6 may include a first connection portion 131*a*-6 disposed on the first additional electrode layer 134 and a first band portion 131*b*-6 extended from the first connection portion 131*a*-6 to a portion of the first surface 1, and the second external electrode 132-6 may include a second connection portion 132*a*-6 disposed on the second additional electrode layer 135 and a second band portion 132*b*-6 extended from the second connection portion 132*a*-6 to a portion of the first surface 1.

Meanwhile, the first and second additional electrode layers 134 and 135 may each be made of any material as long as the material has the electrical conductivity such as the metal, and may use the specific material determined in consideration of the electrical characteristic, the structural stability or the like. In addition, the first and second additional electrode layers 134 and 135 may each be the fired electrode including the conductive metal and glass, or the resin-based electrode including the conductive metal and resin. In addition, the first and second additional electrode layers 134 and 135 may be formed by transferring the sheet including the conductive metal to the body.

The conductive metal included in the first and second additional electrode layers 134 and 135 may use a material having the excellent electrical conductivity, and is not particularly limited. For example, the conductive metal may be at least one of copper (Cu), nickel (Ni), palladium (Pd), silver (Ag), tin (Sn), chromium (Cr) and alloys thereof. The first and second additional electrode layer 134 or 135 may include at least one of nickel (Ni) and an alloy of nickel (Ni), thereby further improving its connectivity with the internal electrode 121 or 122 including nickel (Ni).

Figure 17:
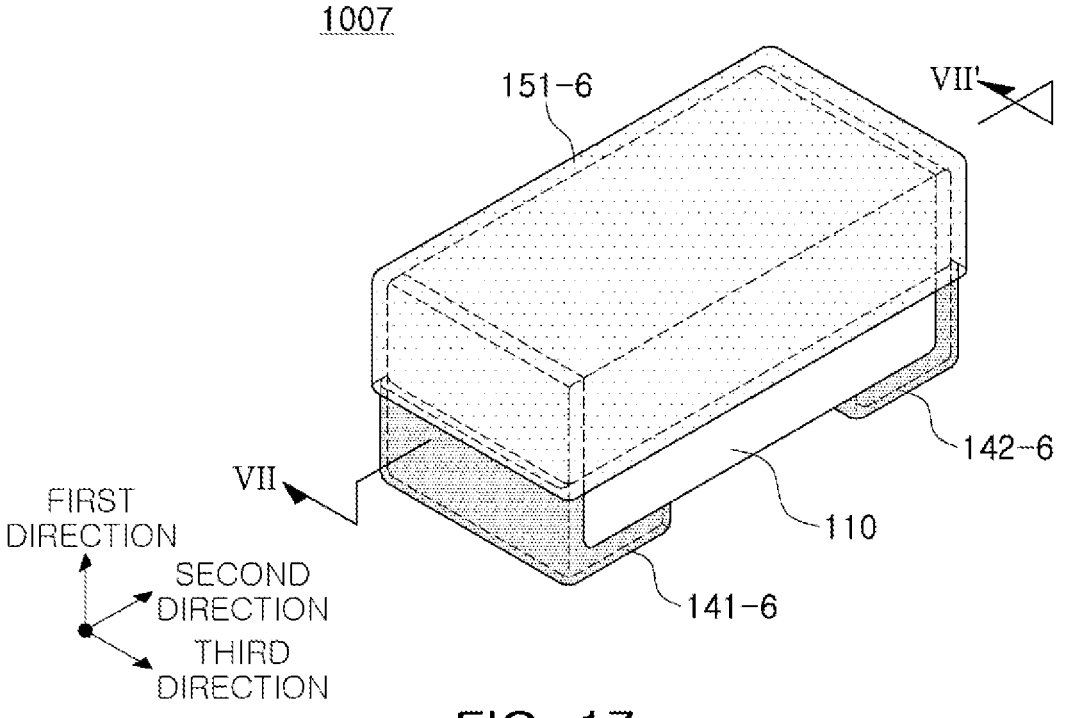
FIG. 17 is a perspective view schematically illustrating a multilayer electronic component according to another exemplary embodiment of the present disclosure.
Figure 18:
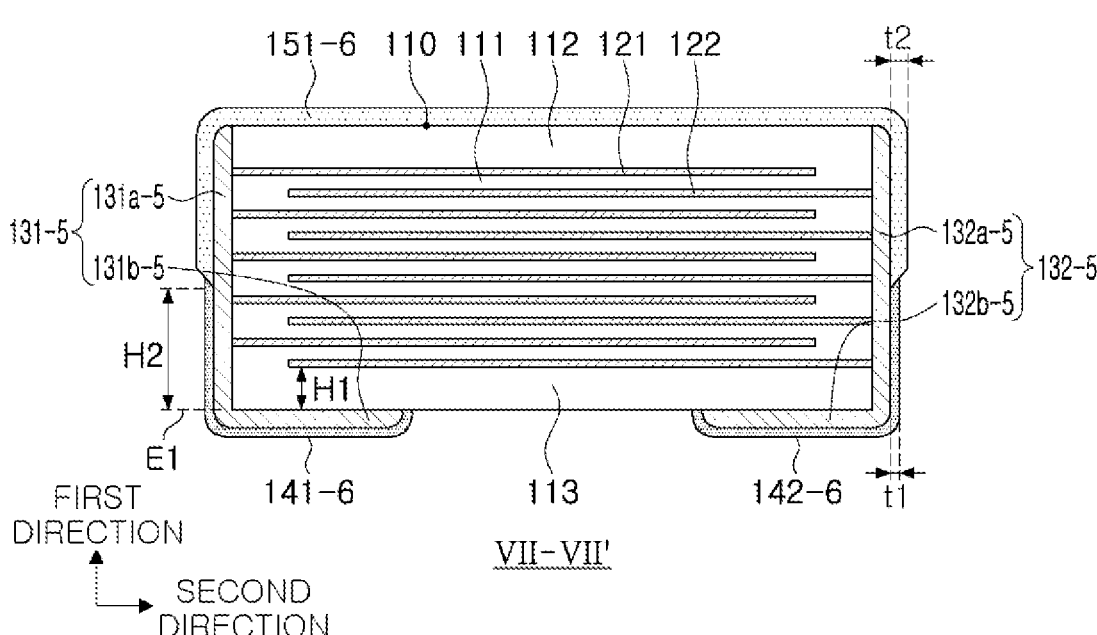
FIG. 18 is a cross-sectional view taken along line VII-VII' of FIG. 17.

FIG. 17 is a perspective view schematically illustrating a multilayer electronic component 1007 according to another exemplary embodiment of the present disclosure; and FIG. 18 is a cross-sectional view taken along line VII-VII' of FIG. 17.

Referring to FIGS. 17 and 18, in the multilayer electronic component 1007 according to another exemplary embodiment of the present disclosure, first or second plating layer 141-6 or 142-6 may have an average thickness t1 smaller than an average thickness t2 of an insulating layer 151-6.

The insulating layer 151-6 may serve to prevent the penetration of the external moisture or plating solution. However, the insulating layer 151-6 may have weak connectivity with the plating layer 141-6 or 142-6, which may cause delamination of the plating layer 141-6 or 142-6. When the plating layer is delaminated, adhesion force of the multilayer electronic component with the board 180 may be reduced. Here, the delamination of the plating layer 141-6 or 142-6 may indicate that the plating layer is partially dropped or physically separated from the external electrode 131-5 or 132-5. The connectivity between the plating layer and the insulating layer may be weak. In this case, it may increase a possibility that a gap between interfaces of the insulating layer and the plating layer is widened or that a foreign material may infiltrate, which may allow the plating layer to be vulnerable to an external impact and then delaminated.

According to another exemplary embodiment of the present disclosure, the plating layer may have the average thickness t1 made smaller than the average thickness t2 of the insulating layer, thereby reducing an area where the plating layer and the insulating layer are in contact with each other. It is thus possible to suppress the occurrence of the delamination, thereby improving the adhesion force of the multilayer electronic component 1000 with the board 180.

The average thickness t1 of the first or second plating layer 141-6 or 142-6 may be a value obtained by averaging its thicknesses measured at five equally spaced points on the first or second connection portion 131*a*-5 or 132*a*-5 or the first and second band portion 131*b*-5 or 132*b*-5, and the average thickness t2 of the insulating layer 151-6 may be a value obtained by averaging its thicknesses measured at five equally spaced points on the first or second connection portion 131*a*-5 or 132*a*-5.

Figure 19:
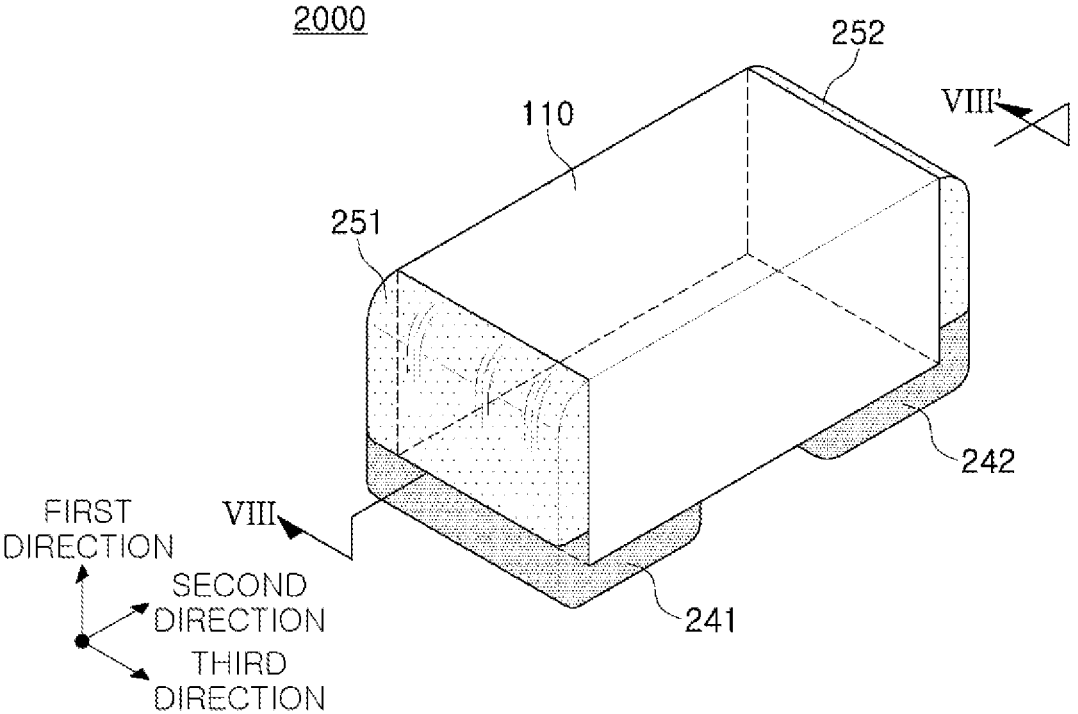
FIG. 19 is a perspective view schematically illustrating a multilayer electronic component according to another exemplary embodiment of the present disclosure.
Figure 20:
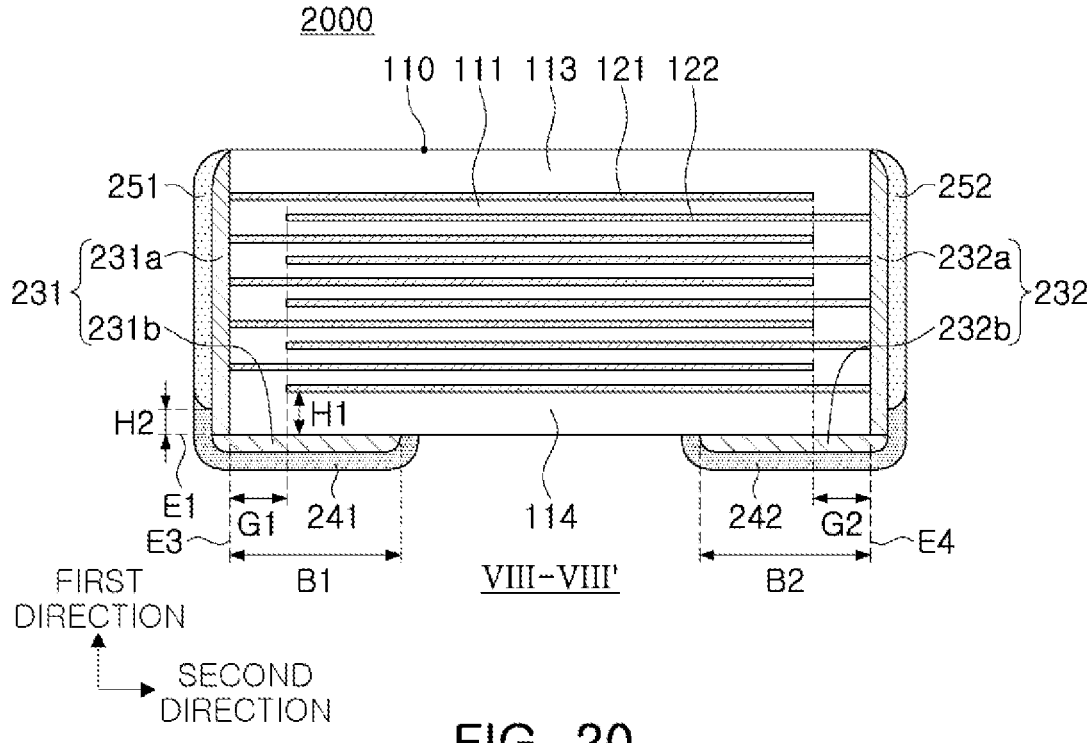
FIG. 20 is a cross-sectional view taken along line VIII-VIII' of FIG. 19.

FIG. 19 is a perspective view schematically illustrating a multilayer electronic component 2000 according to another exemplary embodiment of the present disclosure; and FIG. 20 is a cross-sectional view taken along line VIII-VIII' of FIG. 19.

Hereinafter, a multilayer electronic component 2000 according to another exemplary embodiment of the present disclosure is described in detail with reference to FIGS. 19 and 20. However, contents overlapping those described above are omitted to avoid redundant description.

The multilayer electronic component 2000 according to another exemplary embodiment of the present disclosure may include: a body 110 including a dielectric layer 111 and first and second internal electrodes 121 and 122 alternately disposed while having the dielectric layer 111 interposed therebetween, and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction; a first external electrode 231 including a first connection electrode 231a disposed on the third surface 3, and a first band electrode 231b disposed on the first surface 1 and connected to the first connection electrode 231a; a second external electrode 232 including a second connection electrode 232a disposed on the fourth surface 4, and a second band electrode 232b disposed on the first surface 1 and connected to the second connection electrode 232a; a first insulating layer 251 disposed on the first connection electrode 231a; a second insulating layer 252 disposed on the second connection electrode 232a; a first plating layer 241 disposed on the first band electrode; and a second plating layer 242 disposed on the second band electrode. The first and second insulating layers 251 and 252 each may include an oxide including aluminum (Al).

The first connection electrode 231a may be disposed on the third surface 3 to be connected to the first internal electrode 121, and the second connection electrode 232a may be disposed on the fourth surface 4 to be connected to the second internal electrode 122. In addition, the first insulating layer 251 may be disposed on the first connection electrode 231a, and the second insulating layer 252 may be disposed on the second connection electrode 232a.

Conventionally, the external electrode may be mainly formed using a paste including the conductive metal, i.e., a method in which an exposed surface of the internal electrode of the body is dipped into the paste. However, the external electrode formed by the dipping method may have an excessive thickness in a central portion thereof in the thickness direction. In addition, even excluding this thickness imbalance problem of the external electrode formed by the dipping method, the internal electrode may be exposed to the third or fourth surface of the body. Therefore, the external electrode disposed on the third or fourth surface may have a predetermined thickness or more to suppress the penetration of moisture and the plating solution through the external electrode.

On the other hand, the present disclosure may include the insulating layer 251 or 252 disposed on the connection electrode 231a or 232a, thereby ensuring sufficient reliability even when the connection electrode 231a or 232a on the third or fourth surface to which the internal electrode is exposed has a smaller thickness.

The first and second connection electrodes 231a and 232a may each have a shape corresponding to those of the third and fourth surfaces 3 and 4, and the surfaces of the first and second connection electrode 231a or 232a, facing the body 110, may each have the same area as those of the third and fourth surfaces 3 and 4 of the body 110. The first and second connection electrodes 231a and 232a may each be disposed not to deviate from the third and fourth surfaces 3 and 4. The connection electrode 231a or 232a may not be extended to the first, second, fifth or sixth surface 1, 2, 5 or 6 of the body 110. In detail, the first or second connection electrode 231a or 232a in another exemplary embodiment may be spaced apart from the fifth and sixth surfaces. Accordingly, it is possible to minimize the volume of the external electrode while ensuring sufficient connectivity between the internal electrode 121 or 122 and the external electrode 231 or 232, thereby increasing the capacitance of the multilayer electronic component 2000 per unit volume.

In this regard, the first or second connection electrode 231a or 232a may be spaced apart from the second surface 2. That is, none of the external electrodes 231 and 232 may be disposed on the second surface to further minimize the volumes of the external electrodes 231 and 232, thereby further increasing the capacitance of the multilayer electronic component 2000 per unit volume.

However, the connection electrode 231a or 232a may include a corner portion extended to a corner of the body 110. That is, in another exemplary embodiment, the first connection electrode 231a may include the corner portions (not shown) extended to the 1-3 corner and the 2-3 corner, and the second connection electrode 232a may include the corner portions (not shown) extend to the 1-4 corner and the 2-4 corner.

In addition, the connection electrode 231a or 232a may have a uniform and small thickness compared to the external electrode formed by the conventional dipping method.

A method of forming the connection electrode 231a or 232a may not need to be particularly limited. For example, the connection electrode may be formed by transferring a sheet including the conductive metal or an organic material such as a binder on the third or fourth surface. However, the connection electrode is not limited thereto, and may be formed by plating the conductive metal on the third or fourth surface. That is, the connection electrode 231a or 232a may be a fired layer formed by firing the conductive metal or the plating layer.

The thickness of the connection electrode 231a or 232a is not particularly limited, and may be 2 to 7 µm for example. Here, the thickness of the connection electrode 231a or 232a may indicate a maximum thickness, and indicate a size of the connection electrode 231a or 232a in the second direction.

In another exemplary embodiment, the first and second connection electrode 231a or 232a may include the same metal and glass as those included in the internal electrode 121 or 122. The first and second connection electrode 231a or 232a may include the same metal as the metal included in the internal electrode 121 or 122, thus having improved electrical connectivity with the internal electrodes 121 and 122, and the first and second connection electrode 231a or 232a may include glass, thus having improved bonding force with the body 110 and/or the insulating layer 251 or 252. Here, nickel (Ni) may be the same metal as the metal included in the internal electrode 121 or 122.

The first and second insulating layers 251 and 252 may each be disposed on the first and second connection electrodes 231a and 232a, thus serving to prevent the plating layer from being formed on the first and second connection electrodes 231a and 232a. In addition, the first or second insulating layer 251 or 252 may improve a sealing characteristic, thus serving to minimize the penetration of the external moisture or the plating solution.

The first and second insulating layer 251 or 252 may include the oxide including aluminum (Al).

It is thus possible to further improve moisture resistance reliability, and to suppress cracking caused by the thermal contraction and radial cracking caused by the metal diffusion.

The first or second band electrode 231b or 232b may be disposed on the first surface 1 of the body 110. The first and second band electrodes 231b and 232b may each be in contact with the first and second connection electrodes 231a and 232a, and thus each be electrically connected to the first and second internal electrodes 121 and 122.

The external electrode formed by the conventional dipping method may have a large thickness on the third or fourth surface, also be partially extended to the first, second, fifth and sixth surfaces, and thus have difficulty in securing a high effective volume ratio.

On the other hand, another exemplary embodiment of the present disclosure may have the first and second connection electrode 231a or 232a disposed on the surface to which the internal electrode is exposed, and the first or second band electrode 231b or 232b disposed on the surface on which the multilayer electronic component is mounted on the board, thereby ensuring the high effective volume ratio.

Meanwhile, when the internal electrodes 121 and 122 are stacked on each other in the first direction, the multilayer electronic component 2000 may be horizontally mounted on the board so that the internal electrodes 121 and 122 are parallel to the surface on which the multilayer electronic component is mounted. However, the present disclosure is not limited to the horizontal mounting, and when the internal electrodes 121 and 122 are stacked on each other in the third direction, the multilayer electronic component may be vertically mounted on the board so that the internal electrodes 121 and 122 are perpendicular to the surface on which the multilayer electronic component is mounted.

The first or second band electrode 231b or 232b may be made of any material as long as the material has the electrical conductivity such as the metal, and may use the specific material determined in consideration of the electrical characteristic, the structural stability or the like. For example, the first or second band electrode 231b or 232b may be a fired electrode including the conductive metal and glass, and formed using a method of applying a paste including the conductive metal and glass to the first surface of the body. However, the band electrode is not limited thereto, and may be a plating layer in which the conductive metal is plated on the first surface of the body.

The conductive metal included in the first or second band electrode 231b or 232b may use the material having the excellent electrical conductivity, and is not particularly limited. For example, the conductive metal may be at least one of nickel (Ni), copper (Cu) and alloys thereof, and may include the same metal as the metal included in the internal electrode 121 or 122.

Meanwhile, in another exemplary embodiment, in order to ensure the sealing characteristic and a higher strength, the first external electrode 231 may further include a third band electrode (not shown) disposed on the second surface 2 and connected to the first connection electrode 231a, and the second external electrode 232 may further include a fourth band electrode (not shown) disposed on the second surface 2 and connected to the second connection electrode 232a.

In another exemplary embodiment, B1≥G1, B3≤G1, B2≥G2 and B4≤G2 when B1 indicates a distance from the extension line E3 of the third surface 3 to an end of the first band electrode 231b, B2 indicates a distance from the extension line E4 of the fourth surface 4 to an end of the second band electrode 232b, B3 indicates a distance from the extension line E3 of the third surface 3 to an end of the third band electrode (not shown), B4 indicates a distance from the extension line E4 of the fourth surface 4 to an end of the fourth band electrode (not shown), G1 indicates an average size of a region in the second direction, where the third surface 3 and the second internal electrode 122 are spaced apart from each other, and G2 indicates an average size of a region in the second direction, where the fourth surface 4 and the first internal electrode 121 are spaced apart from each other. Accordingly, it is possible to minimize the volume of the external electrode, thereby increasing the capacitance of the multilayer electronic component 2000 per unit volume and to simultaneously increase the area where the multilayer electronic component is in contact with the solder when the multilayer electronic component is mounted on the board, thereby improving the adhesion force.

However, it is not intended to limit the present disclosure to B1≥G1, B3≤G1, B2≥G2 and B4≤G2, and a case in which B1≥G1, B3≥G1, B2≥G2 and B4≥G2 may also be included as another exemplary embodiment of the present disclosure. Accordingly, in another exemplary embodiment, B1≥G1, B3≥G1, B2≥G2, and B4≥G2 when B1 indicates the distance from the extension line E3 of the third surface 3 to the end of the first band electrode 231b, B2 indicates the distance from the extension line E4 of the fourth surface 4 to the end of the second band electrode 232b, B3 indicates the distance from the extension line E3 of the third surface 3 to the end of the third band electrode (not shown), B4 indicates the distance from the extension line E4 of the fourth surface 4 to the end of the fourth band electrode (not shown), G1 indicates the average size of the region in the second direction, where the third surface 3 and the second internal electrode 122 are spaced apart from each other, and G2 indicates the average size of the region in the second direction, where the fourth surface 4 and the first internal electrode 121 are spaced apart from each other.

The first or second plating layer 241 or 242 may be disposed on the first or second band electrode 231b or 232b. The first or second plating layer 241 or 242 may allow the multilayer electronic component to be more easily mounted on the board. The plating layer 241 or 242 is not limited to a particular type, may include at least one of nickel (Ni), tin (Sn), palladium (Pd) and alloys thereof, or may include a plurality of layers.

As a more specific example of the plating layer 241 or 242, the plating layer 241 or 242 may be a nickel (Ni) plating layer or a tin (Sn) plating layer for example, and may have the Ni plating layer and the Sn plating layer sequentially formed on the first or second band electrode 231b or 232b.

In another exemplary embodiment, the first and second plating layers 241 and 242 may respectively be extended to partially cover the first and second connection electrodes 231a and 232a.

H1≥H2 when H1 indicates the average size of the region in the first direction, measured from the first surface 1 to the internal electrode disposed closest to the first surface 1 among the first and second internal electrodes 121 and 122, and H2 indicates an average size of the first or second plating layer 241 or 242 in the first direction, measured from the extension line E1 of the first surface 1 to an end of the plating layer disposed on the first or second connection electrode 231a or 232a. Accordingly, it is possible to suppress the plating solution from penetrating into the internal electrode during the plating process, thereby allowing the multilayer electronic component to have the improved reliability.

In another exemplary embodiment, the first and second insulating layers 251 and 252 may respectively be in direct contact with the first and second connection electrodes 231a and 232a, and the first or second connection electrode 231a or 232a may include the conductive metal and glass. Accordingly, none of the plating layers 241 and 242 may be disposed in a region where the insulating layer 251 or 252 is disposed on the outer surface of the first or second connection electrode 231a or 232a, thereby effectively suppressing the erosion of the external electrode by the plating solution.

In another exemplary embodiment, the first and second insulating layers 251 and 252 may respectively be in direct contact with the first and second connection electrodes 231a and 232*a*, and the first or second connection electrode 231*a* or 232*a* may include the conductive metal and resin. Accordingly, none of the plating layers 241 and 242 may be disposed in the region where the insulating layer 251 or 252 is disposed on the outer surface of the first or second connection electrode 231*a* or 232*a*, thereby effectively suppressing the erosion of the external electrode by the plating solution.

In another exemplary embodiment, the first plating layer 241 may cover the end of the first insulating layer 251, disposed on the first external electrode 231, and the second plating layer 242 may cover the end of the second insulating layer 252, disposed on the second external electrode 232. Accordingly, it is possible to strengthen a bonding force of the insulating layer 251 or 252 and the plating layer 241 or 242, thereby improving the reliability of the multilayer electronic component 2000. In addition, it is possible to first form the first or second insulating layer 251 or 252 before forming the plating layer 241 or 242 on the external electrode 231 or 232, thereby more reliably suppressing the penetration of the plating solution in the process of forming the plating layer. As the insulating layer is formed before the plating layer, the plating layer 241 or 242 may cover the end of the insulating layer 251 or 252.

In another exemplary embodiment, the first insulating layer 251 may cover an end of the first plating layer 241, disposed on the first external electrode 231, and the second insulating layer 252 may cover an end of the second plating layer 242, disposed on the second external electrode 232. Accordingly, it is possible to strengthen the bonding force of the insulating layer 251 or 252 and the plating layer 241 or 242, thereby improving the reliability of the multilayer electronic component 2000.

Figure 21:
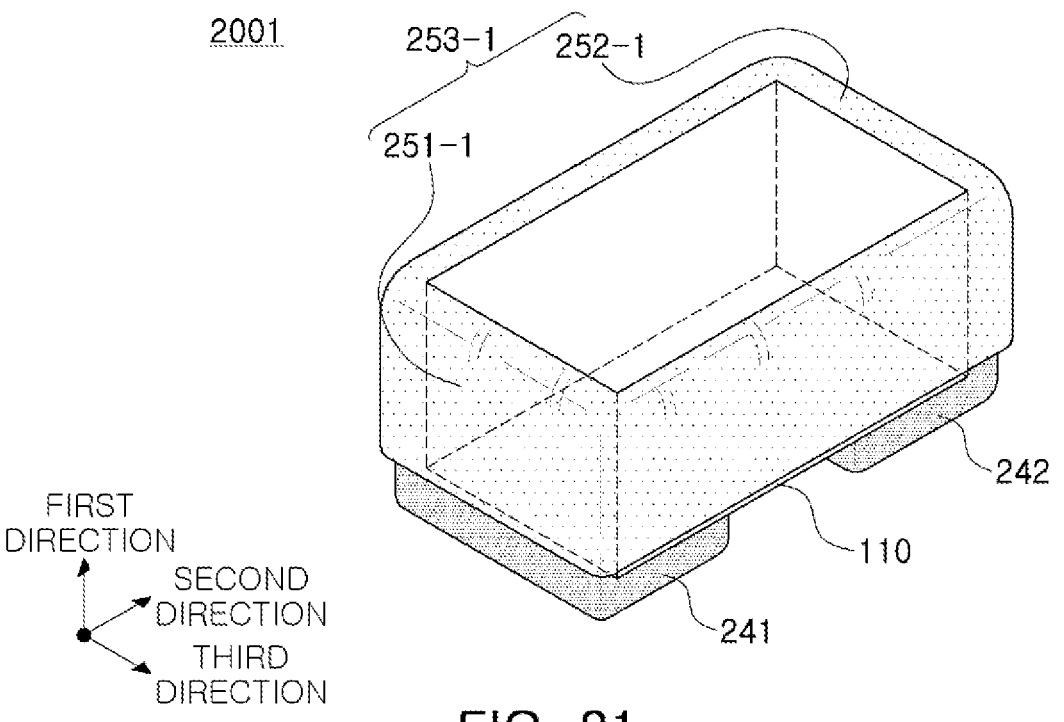
FIG. 21 shows a modified example of FIG. 19.

FIG. 21 shows a modified example of FIG. 19. Referring to FIG. 21, in a modified example 2001 of the multilayer electronic component 2000 according to another exemplary embodiment of the present disclosure, first and second insulating layers 251-1 and 252-1 may be extended to the fifth and sixth surfaces 5 and 6 and connected to each other to be one insulating layer 253-1. Here, the insulating layer 253-1 formed by connecting the first and second insulating layers to each other may cover the partial fifth and sixth surfaces.

Figure 22:
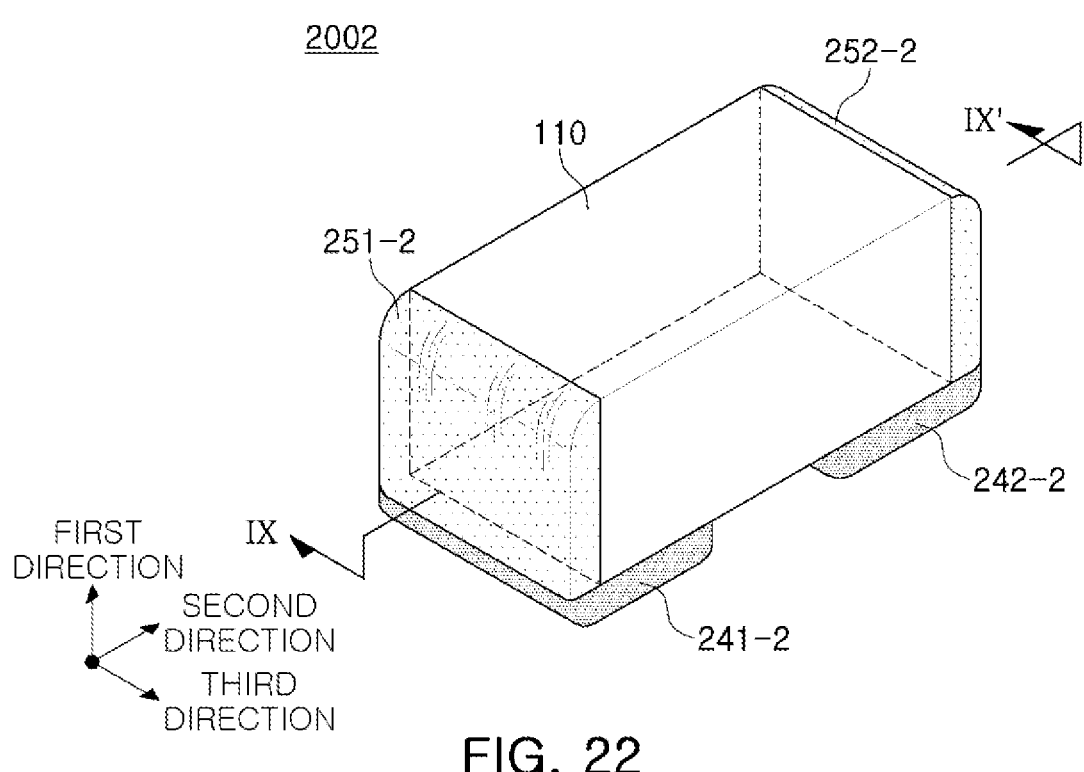
FIG. 22 is a perspective view schematically illustrating a multilayer electronic component according to another exemplary embodiment of the present disclosure.
Figure 23:
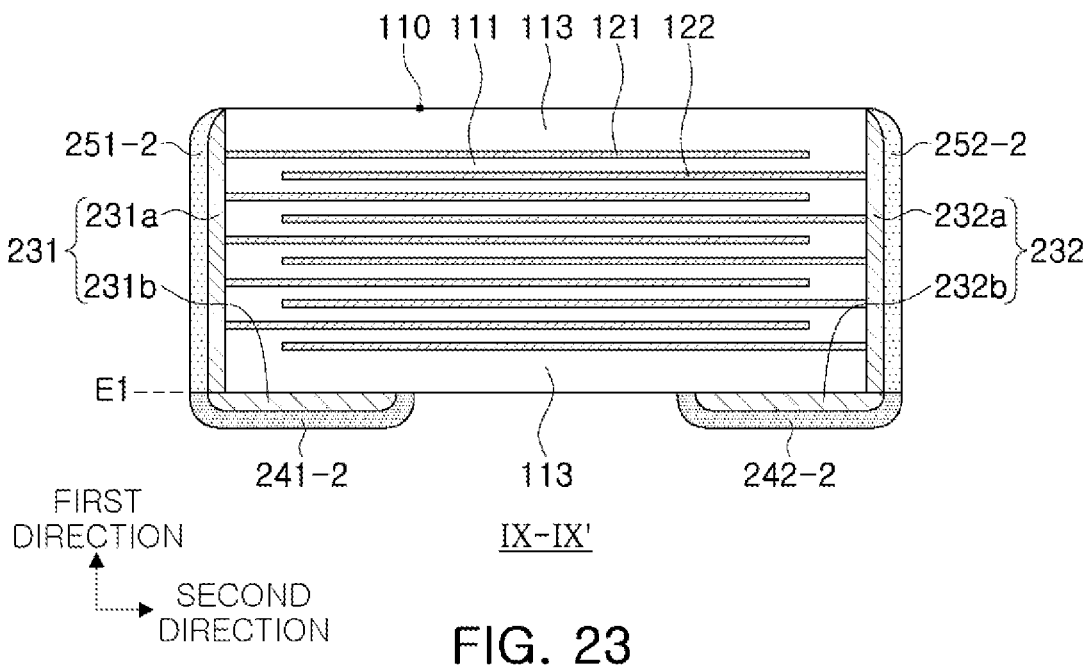
FIG. 23 is a cross-sectional view taken along line IX-IX' of FIG. 22.

FIG. 22 is a perspective view schematically illustrating a multilayer electronic component 2002 according to another exemplary embodiment of the present disclosure; and FIG. 23 is a cross-sectional view taken along line IX-IX' of FIG. 22.

Referring to FIGS. 22 and 23, the multilayer electronic component 2002 according to another exemplary embodiment of the present disclosure may have first and second plating layers 241-2 and 242-2 each disposed below the extension line E1 of the first surface. Accordingly, it is possible to minimize the height of the solder when the multilayer electronic component is mounted on the board and to minimize the space in which the multilayer electronic component is mounted.

In addition, first and second insulating layers 251-2 and 252-2 may each be extended to below the extension line E1 of the first surface to be in contact with the first and second plating layers 241-2 and 242-2.

Figure 24:
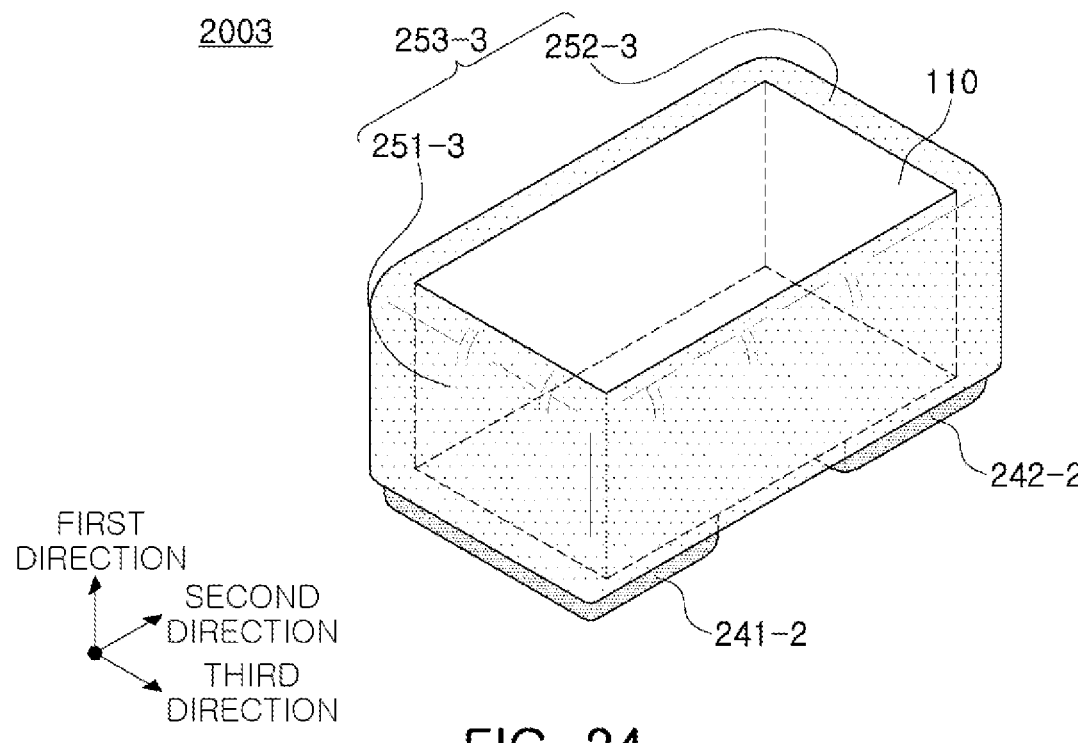
FIG. 24 shows a modified example of FIG. 22.

FIG. 24 shows a modified example of FIG. 22. Referring to FIG. 24, in a modified example 2003 of the multilayer electronic component 2002 according to another exemplary embodiment of the present disclosure, first and second insulating layers 251-3 and 252-3 may be extended to the fifth and sixth surfaces 5 and 6 and connected to each other to be one insulating layer 253-3. Here, the insulating layer 253-3 formed by connecting the first and second insulating layers to each other may cover the entire fifth and sixth surfaces.

Figure 25:
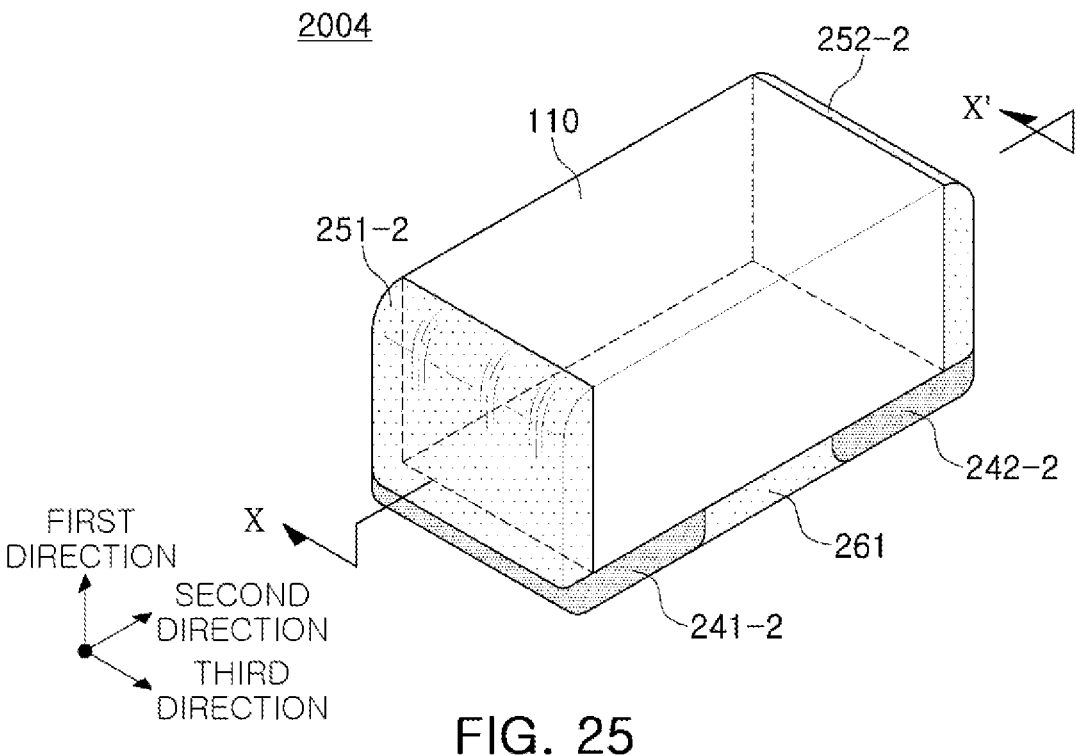
FIG. 25 is a perspective view schematically illustrating a multilayer electronic component according to another exemplary embodiment of the present disclosure.
Figure 26:
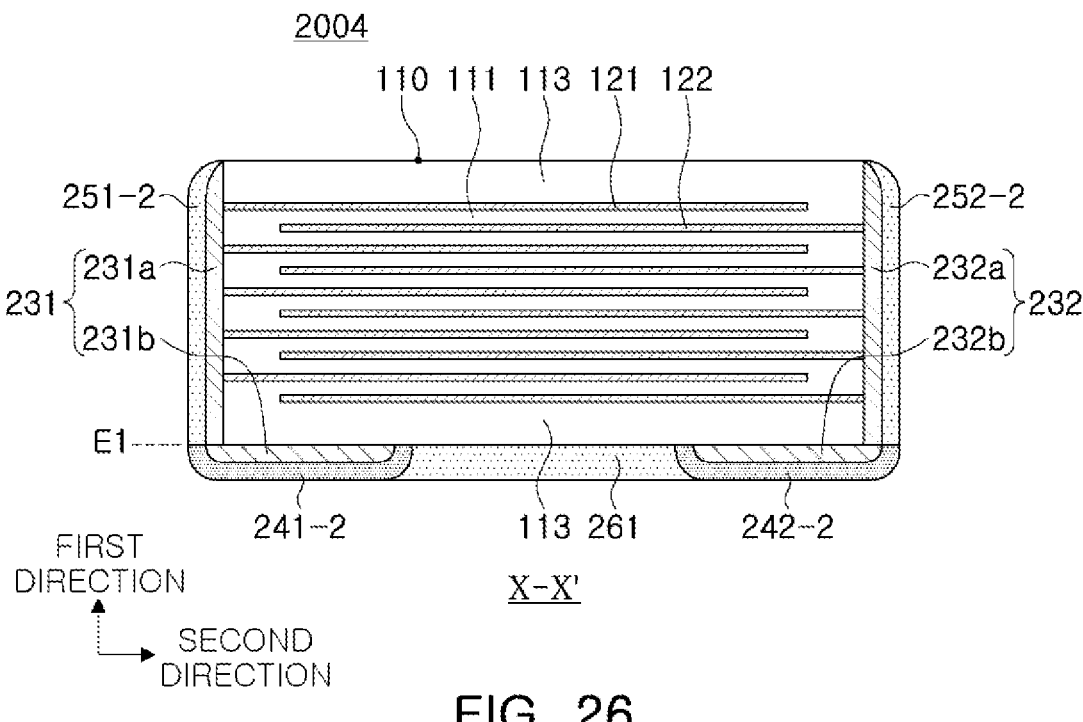
FIG. 26 is a cross-sectional view taken along the line X-X' of FIG. 25.

FIG. 25 is a perspective view schematically illustrating a multilayer electronic component 2004 according to another exemplary embodiment of the present disclosure; and FIG. 26 is a cross-sectional view taken along the line X-X' of FIG. 25.

Referring to FIGS. 25 and 26, the multilayer electronic component 2004 according to another exemplary embodiment of the present disclosure may further include an additional insulating layer 261 disposed on the first surface 1 and between the first band electrode 231*b* and the second band electrode 232*b*. Accordingly, it is possible to prevent the leakage current or the like which may occur between the first band electrode 231*b* and the second band electrode 232*b* under the high-voltage current.

The additional insulating layer 261 may not need to be limited to a particular type. For example, the additional insulating layer 261 may include the oxide including aluminum (Al) like the first or second insulating layer 251-2 or 252-2. However, it is not necessary to limit the additional insulating layer 261 and the first or second insulating layer 251-2 or 252-2 to the same material, and the insulating layers may be made of materials different from each other. For example, the insulating layer 261 may include one or more selected from epoxy resin, acrylic resin, ethyl cellulose or the like, or may include glass.

Figure 27:
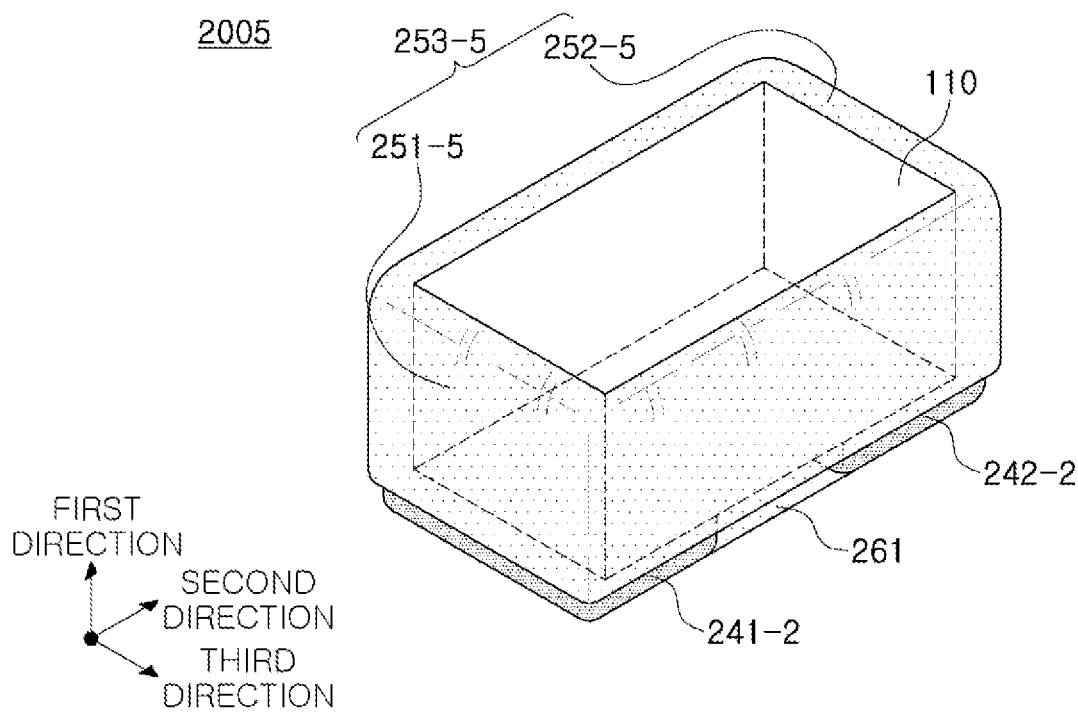
FIG. 27 shows a modified example of FIG. 25.

FIG. 27 shows a modified example of FIG. 25. Referring to FIG. 27, in a modified example 2005 of the multilayer electronic component 2004 according to another exemplary embodiment of the present disclosure, first and second insulating layers 251-5 and 252-5 may be extended to the fifth and sixth surfaces 5 and 6 and connected to each other to be one insulating layer 253-5.

Figure 28:
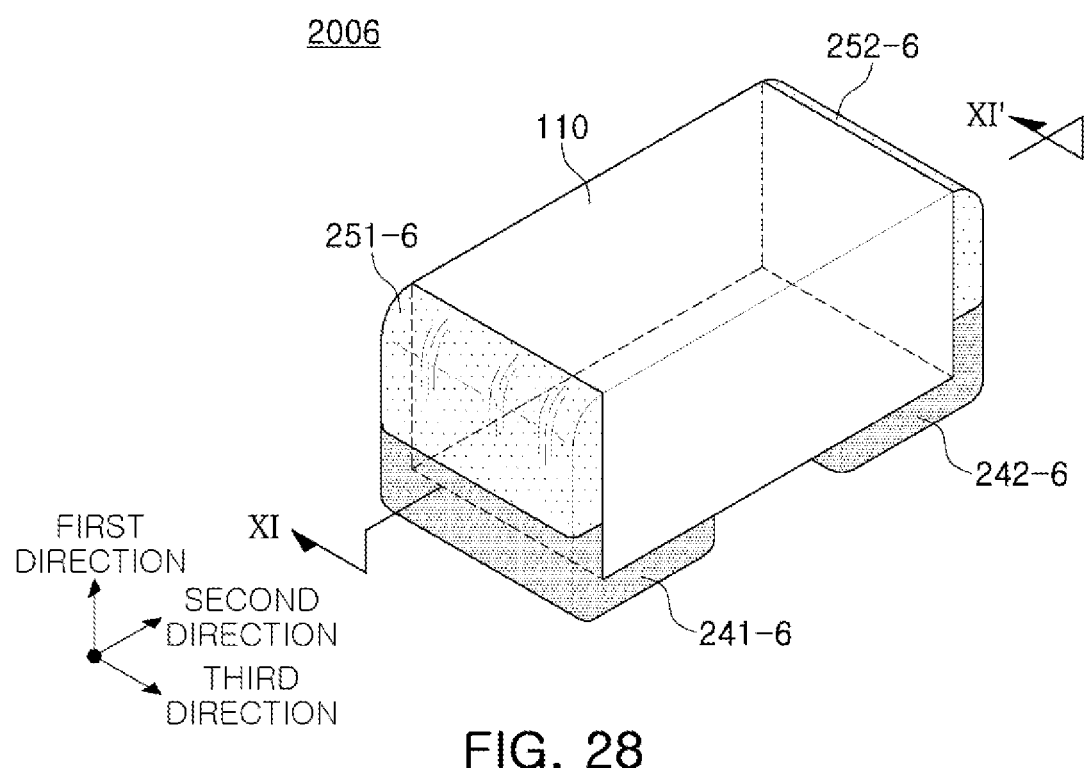
FIG. 28 is a perspective view schematically illustrating a multilayer electronic component according to another exemplary embodiment of the present disclosure.
Figure 29:
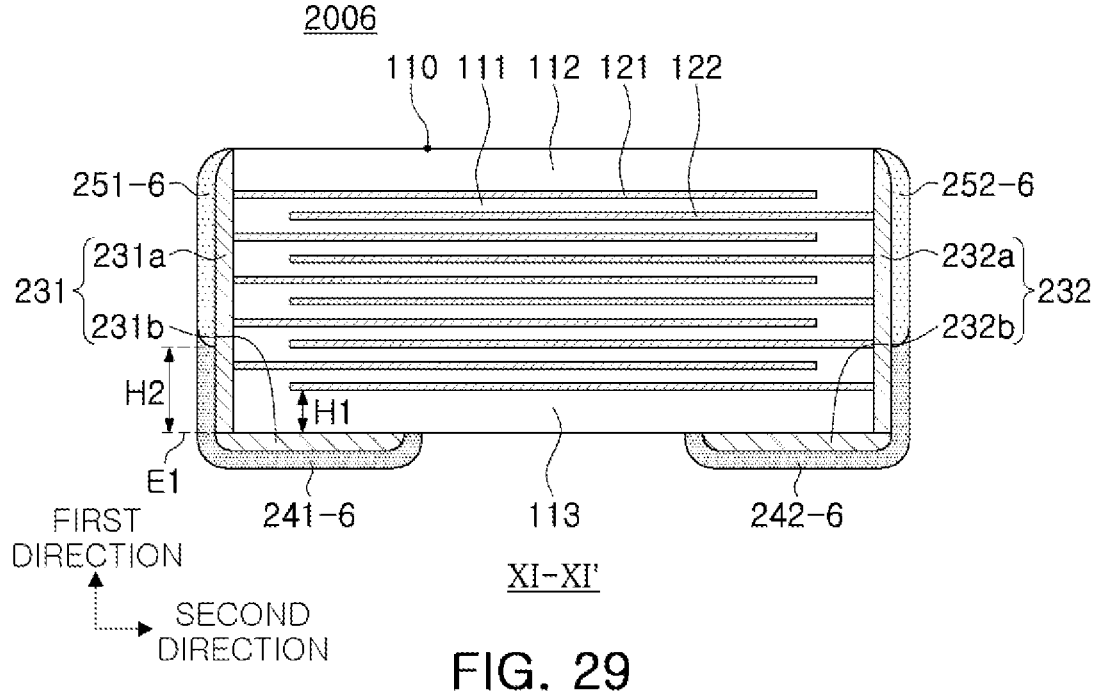
FIG. 29 is a cross-sectional view taken along line XI-XI' of FIG. 28.

FIG. 28 is a perspective view schematically illustrating a multilayer electronic component 2006 according to another exemplary embodiment of the present disclosure; and FIG. 29 is a cross-sectional view taken along line XI-XI' of FIG. 28.

Referring to FIGS. 28 and 29, the multilayer electronic component 2006 according to another exemplary embodiment may include a first insulating layer 251-6 disposed on the first connection electrode 231*a* and a second insulating layer 252-6 disposed on the second connection electrode 232*a*, wherein H1<H2 when H1 indicates the average size of the region in the first direction, measured from the first surface 1 to the internal electrode disposed closest to the first surface 1 among the first and second internal electrodes 121 and 122, and H2 indicates an average size of the first or second plating layer 241-6 or 242-6 in the first direction, measured from the extension line E1 of the first surface 1 to an end of the plating layer disposed on the first or second connection electrode 231*a* or 232*a*. Accordingly, it is possible to improve the adhesion force by increasing the area where the multilayer electronic component is in contact with the solder when the multilayer electronic component is mounted on the board.

H2<T/2 when T indicates the average size of the body 110 in the first direction. That is, H1<H2<T/2. The reason is that moisture resistance reliability improved by the insulating layer may be reduced when H2 is T/2 or more.

Figure 30:
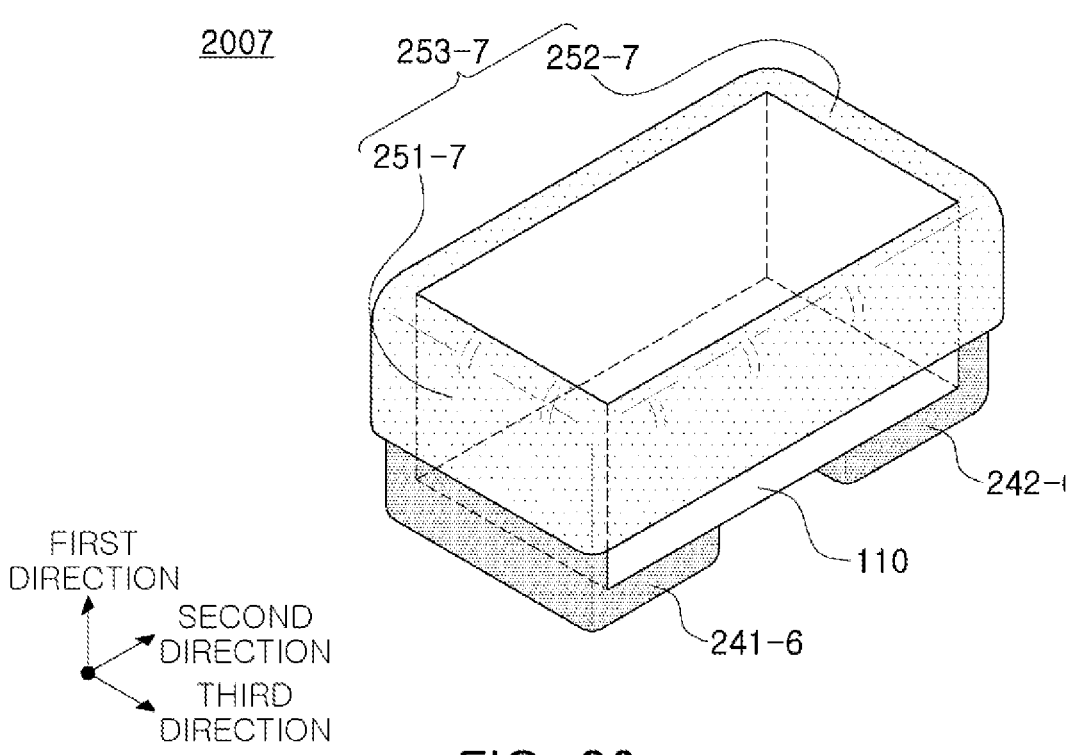
FIG. 30 shows a modified example of FIG. 28.

FIG. 30 shows a modified example of FIG. 28. Referring to FIG. 30, in a modified example 2007 of the multilayer electronic component 2006 according to another exemplary embodiment of the present disclosure, first and second insulating layers 251-7 and 252-7 may be extended to the fifth and sixth surfaces 5 and 6 and connected to each other to be one insulating layer 253-7.

Figure 31:
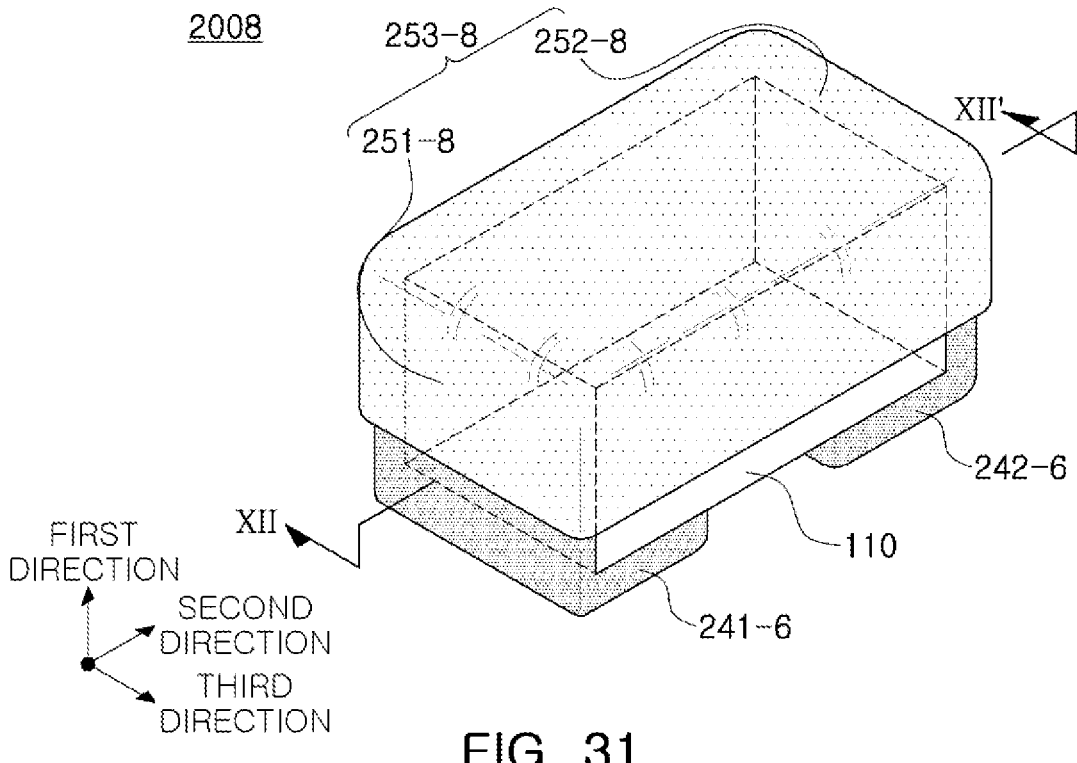
FIG. 31 is a perspective view schematically illustrating a multilayer electronic component according to another exemplary embodiment of the present disclosure.
Figure 32:
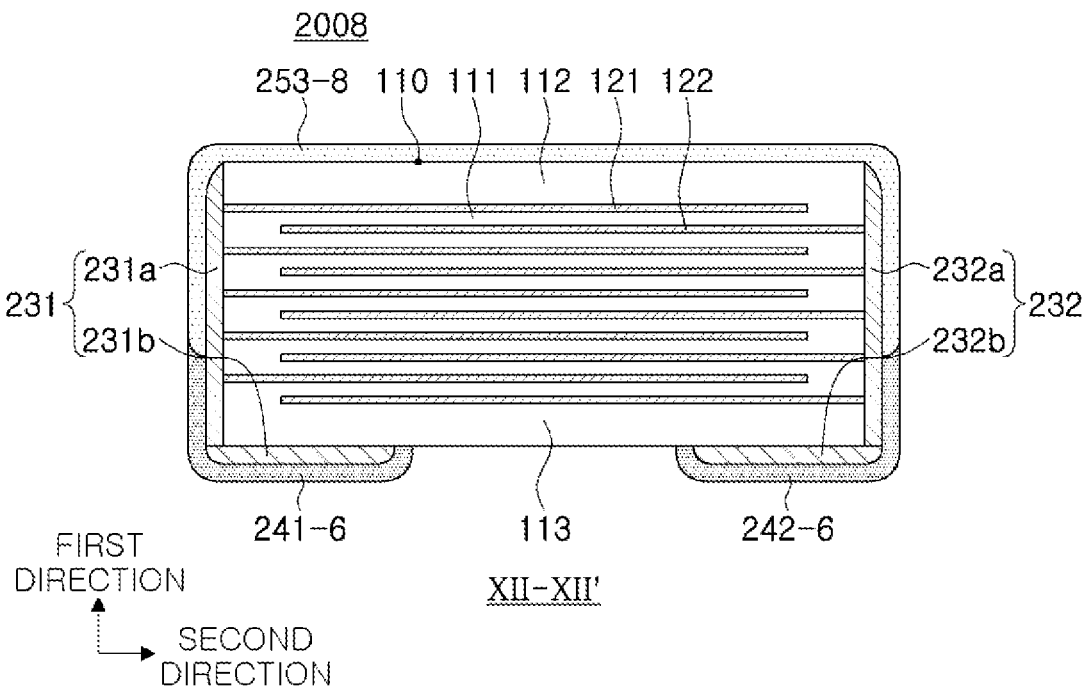
FIG. 32 is a cross-sectional view taken along line XII-XII' of FIG. 31.

FIG. 31 is a perspective view schematically illustrating a multilayer electronic component 2008 according to another exemplary embodiment of the present disclosure; and FIG. 32 is a cross-sectional view taken along line XII-XII' of FIG. 31.

Figure 33:
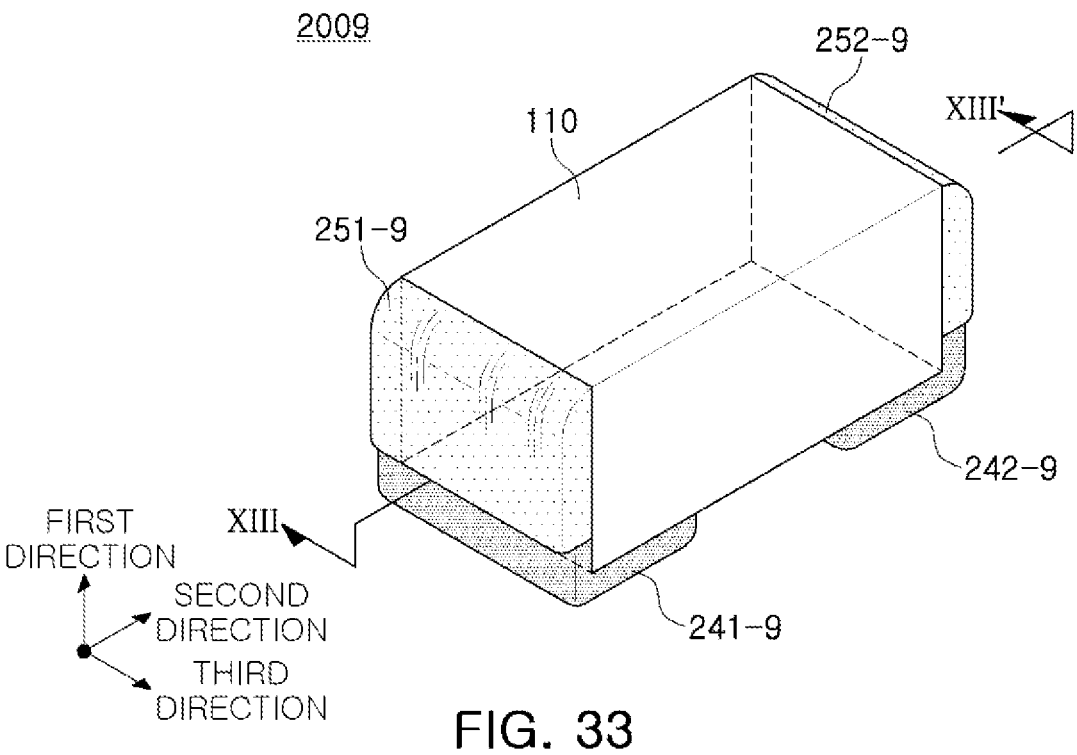
FIG. 33 is a perspective view schematically illustrating a multilayer electronic component according to another exemplary embodiment of the present disclosure.

Referring to FIGS. 31 and 32, in the multilayer electronic component 2008 according to another exemplary embodiment of the present disclosure, first and second insulating layers 251-8 and 252-8 may be extended to the second, fifth and sixth surfaces 2, 5 and 6 and connected to each other to be one insulating layer 253-8. As illustrated in FIG. 33, the insulating layer 253-8 may cover the entire second surface and the partial fifth and sixth surfaces.

Figure 34:
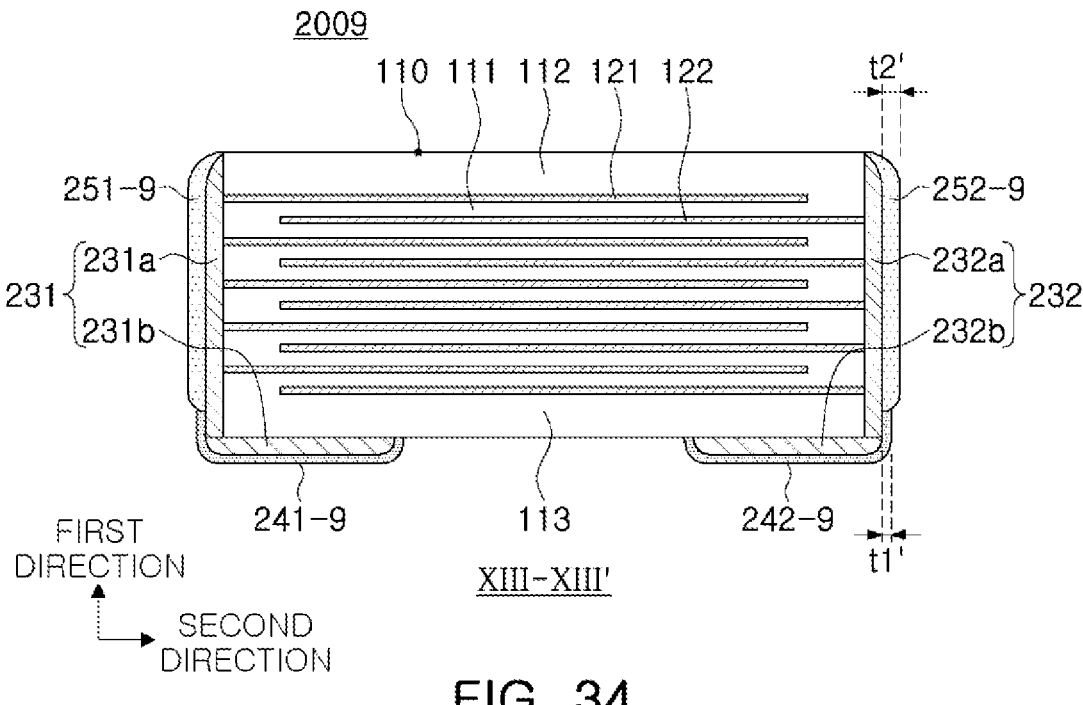
FIG. 34 is a cross-sectional view taken along line XIII-XIII' of FIG. 33.

FIG. 33 is a perspective view schematically illustrating a multilayer electronic component 2009 according to another exemplary embodiment of the present disclosure; and FIG. 34 is a cross-sectional view taken along line XIII-XIII' of FIG. 33.

Referring to FIGS. 33 and 34, in the multilayer electronic component 2009 according to another exemplary embodiment of the present disclosure, a first or second plating layer 241-9 or 242-9 may have an average thickness t1' smaller than an average thickness t2' of a first or second insulating layer 251-9 or 252-9.

According to another exemplary embodiment of the present disclosure, the first or second plating layer 241-9 or 242-9 may have the average thickness t1' made smaller than the average thickness t2' of the first or second insulating layer 251-9 or 252-9, thereby reducing the area where the plating layer and the insulating layer are in contact with each other. It is thus possible to suppress the occurrence of the delamination, thereby improving the adhesion force of the multilayer electronic component 2009 with the board 180.

The average thickness t1' of the first or second plating layer 241-9 or 242-9 may be a value obtained by averaging its thicknesses measured at five equally spaced points on the first or second connection electrode 231a or 232a, or the first or second band electrode 231b or 232b, and the average thickness t2' of the insulating layer 251-9 or 252-9 may be a value obtained by averaging its thicknesses measured at five equally spaced points on the first or second connection electrode 231a or 232a.

Figure 35:
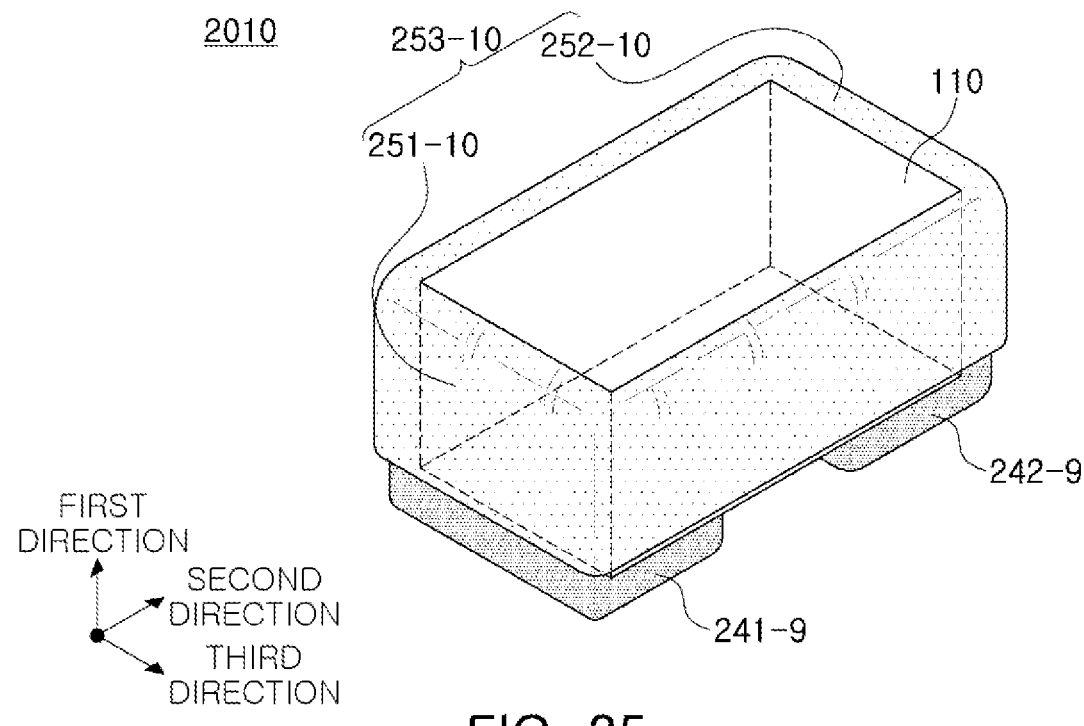
FIG. 35 shows a modified example of FIG. 33.

FIG. 35 shows a modified example of FIG. 33. Referring to FIG. 35, in a modified example 2010 of the multilayer electronic component 2009 according to another exemplary embodiment of the present disclosure, first and second insulating layers 251-10 and 252-10 may be extended to the fifth and sixth surfaces 5 and 6 and connected to each other to be one insulating layer 253-10.

Figure 36:
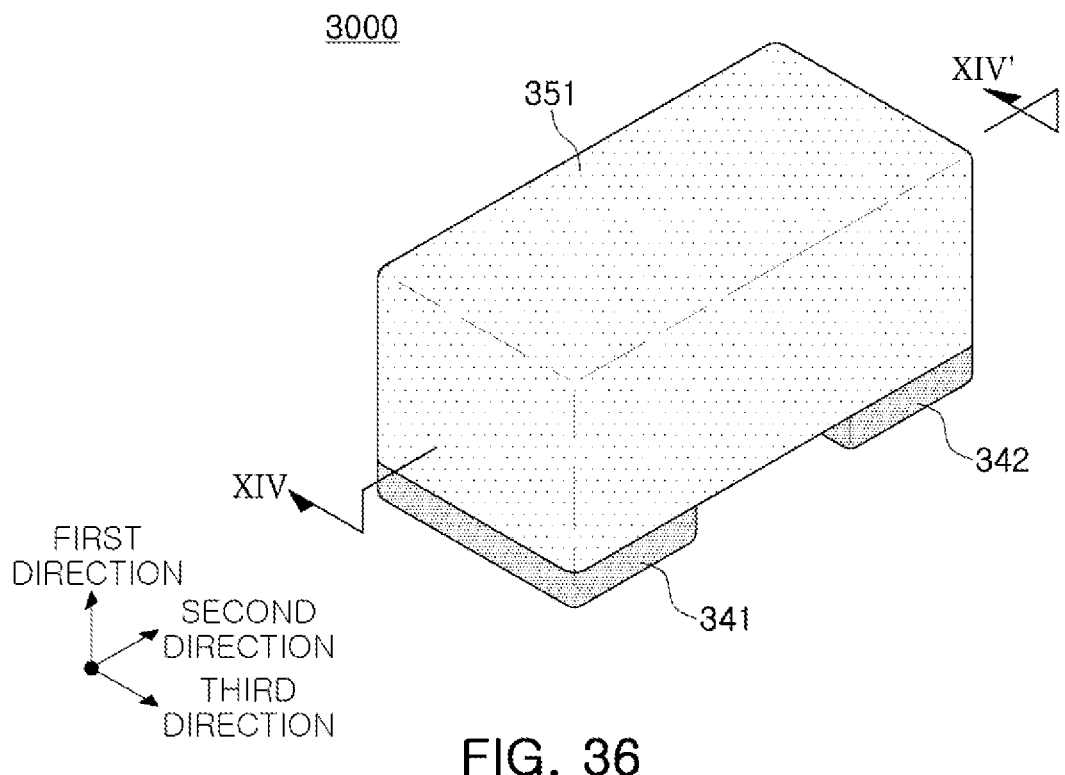
FIG. 36 is a perspective view schematically illustrating a multilayer electronic component according to another exemplary embodiment of the present disclosure.
Figure 37:
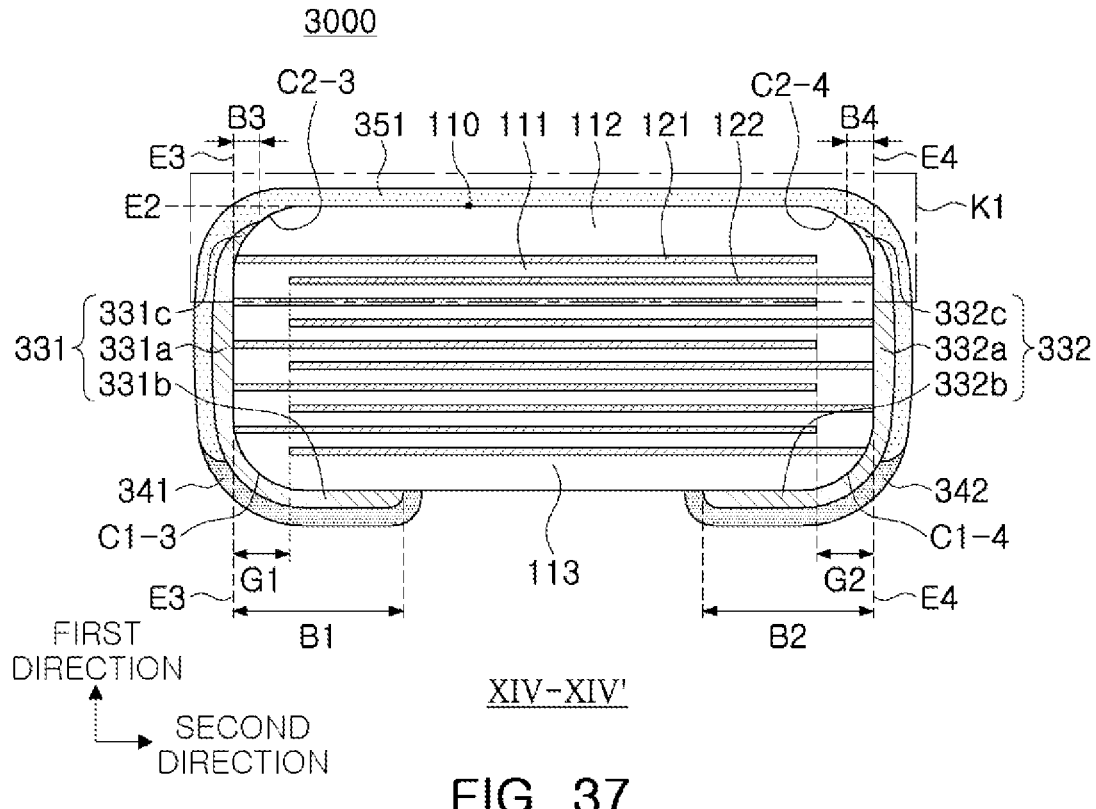
FIG. 37 is a cross-sectional view taken along line XIV-XIV' of FIG. 36.

FIG. 36 is a perspective view schematically illustrating a multilayer electronic component 3000 according to another exemplary embodiment of the present disclosure; FIG. 37 is a cross-sectional view taken along line XIV-XIV' of FIG. 36; and FIG. 38 is an enlarged view of a region K1 of FIG. 36.

Figure 38:
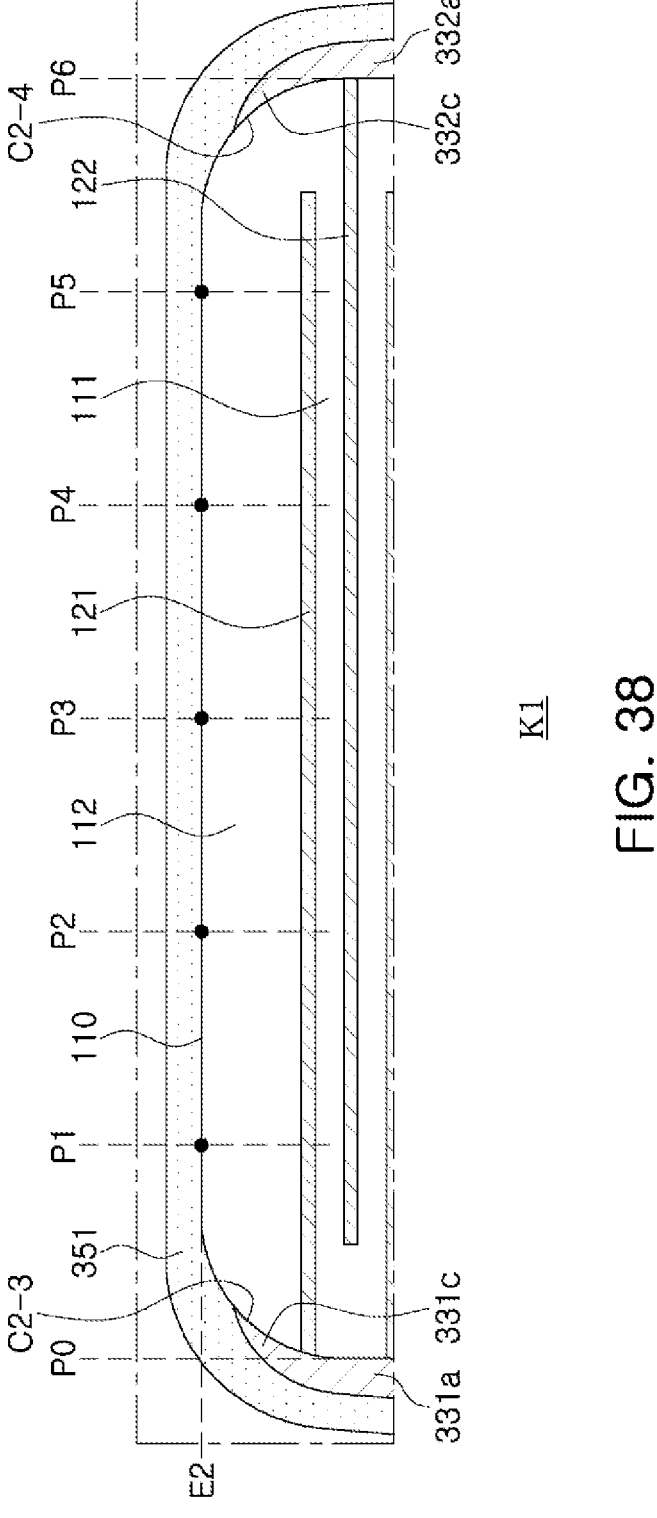
FIG. 38 is an enlarged view of a region K1 of FIG. 36.

Referring to FIGS. 36 through 38, the multilayer electronic component 3000 according to another exemplary embodiment of the present disclosure may include: a body 110 including a dielectric layer 111 and first and second internal electrodes 121 and 122 alternately disposed while having the dielectric layer 111 interposed therebetween, and including first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1 to 4 and opposing each other in the third direction; a first external electrode 331 including a first connection portion 331a disposed on the third surface, a first band portion 331b extending from the first connection portion 331a onto a portion of the first surface 1, and a first corner portion 331c extending from the first connection portion 331a onto a corner connecting the second and third surfaces 2 and 3 of the body to each other; a second external electrode 332 including a second connection portion 332a disposed on the fourth surface 4, a second band portion 332b extending from the second connection portion 332a onto a portion of the first surface 1, and a second corner portion 332c extending from the second connection portion 332a onto a corner connecting the second and fourth surfaces 2 and 4 of the body to each other; an insulating layer 351 disposed on the first and second connection portions 331a and 332a, and covering the second surface 2 and the first and second corner portions 331c and 332c; a first plating layer 341 disposed on the first band portion 331b; and a second plating layer 342 disposed on the second band portion 332b. The insulating layer 351 may include an oxide including aluminum (Al).

In another exemplary embodiment, B3≤G1 and B4≤G2 when B3 indicates an average size of the first corner portion 331c in the second direction, measured from the extension line E3 of the third surface 3 to an end of the first corner portion 331c, B4 indicates an average size of the second corner portion 332c in the second direction, measured from the extension line E4 of the fourth surface 4 to an end of the second corner portion 332c, G1 indicates the average size of the region in the second direction, where the third surface 3 and the second internal electrode 122 are spaced apart from each other, and G2 indicates the average size of the region in the second direction, where the fourth surface 4 and the first internal electrode 121 are spaced apart from each other. Accordingly, it is possible to minimize volumes of the external electrodes 331 and 332, thereby increasing the capacitance of the multilayer electronic component 3000 per unit volume.

Here, B1≥G1 and B2≥G2 when B1 indicates an average size of the first band portion 331b in the second direction, measured from the extension line E3 of the third surface to an end of the first band portion 331b, and B2 indicates an average size of the second band portion 332b in the second direction, measured from the extension line E4 of the fourth surface to an end of the second band portion 332b. Accordingly, it is possible to improve the adhesion force by increasing the area where the multilayer electronic component is in contact with the solder when the multilayer electronic component is mounted on the board.

The multilayer electronic component 3000 according to another exemplary embodiment may include the body 110 including the dielectric layer 111 and the first and second internal electrodes 121 and 122 alternately disposed while having the dielectric layer 111 interposed therebetween, and including the first and second surfaces 1 and 2 opposing each other in the first direction, the third and fourth surfaces 3 and 4 connected to the first and second surfaces 1 and 2 and opposing each other in the second direction, the fifth and sixth surfaces 5 and 6 connected to the first to fourth surfaces 1 to 4 and opposing each other in the third direction. The body 110 of the multilayer electronic component 3000 may have the same configuration as the body 110 of the multilayer electronic component 1000, except that an end of the first or second surface 1 or 2 of the body is contracted, as described below.

The external electrodes 331 and 332 may respectively be disposed on the third surface 3 and fourth surface 4 of the body 110. The external electrodes 331 and 332 may be the first and second external electrodes 331 and 332 respectively disposed on the third and fourth surfaces 3 and 4 of the body 110, and respectively connected to the first and second internal electrodes 121 and 122.

The external electrodes 331 and 332 may be the first external electrode 331 including the first connection portion 331a disposed on the third surface 3, the first band portion 331b extending from the first connection portion 331a onto a portion of the first surface 1, and the first corner portion 331c extending from the first connection portion 331a onto the corner connecting the second and third surfaces 2 and 3 to each other; and the second external electrode 332 including the second connection portion 332a disposed on the fourth surface, the second band portion 332b extending from the second connection portion 332a onto a portion of the first surface 1, and the second corner portion 332c extending from the second connection portion 332a onto the corner connecting the second and fourth surfaces 2 and 4 to each other. The first connection portion 331a may be connected to the first internal electrode 121 on the third surface 3, and the second connection portion 332a may be connected to the second internal electrode 122 on the fourth surface 4.

In another exemplary embodiment, the first or second connection portion 331a or 332a may be spaced apart from the fifth and sixth surfaces 5 and 6. Accordingly, the multilayer electronic component 3000 may have a further smaller size by minimizing proportions of the external electrodes 331 and 332.

The margin regions in which none of the internal electrodes 121 and 122 is disposed may overlap each other on the dielectric layer 111, and the step difference may thus occur due to the thicknesses of the internal electrodes 121 and 122. Accordingly, the corners connecting the first surface and the third to sixth surfaces and/or the corners connecting the second surface and the third to the fifth surface may be contracted toward the center of the body 110 in the first direction, based on the first surface or the second surface. Alternatively, due to the contraction phenomenon in the sintering process of the body, the corners connecting the first surface 1 and the third to sixth surfaces 3, 4, 5 and 6 to each other and/or the corners connecting the second surface 2 and the third to the sixth surfaces 3, 4, 5 and 6 to each other may be contracted toward the center of the body 110 in the first direction, based on the first surface or the second surface. Alternatively, the separate process may be performed to round the corners connecting respective surfaces of the body 110 to each other in order to prevent the chipping defect or the like, and the corners connecting the first and third to sixth surfaces to each other and/or the corners connecting the second surface and the third to sixth surfaces to each other may thus each have the round shape.

The corners may include the 1-3 corner C1-3 connecting the first surface and the third surface to each other, the 1-4 corner C1-4 connecting the first surface and the fourth surface to each other, the 2-3 corner C2-3 connecting the second surface and the third surface to each other, and the 2-4 corner C2-4 connecting the second surface and the fourth surface to each other. In addition, the corners may include the 1-5 corner connecting the first surface and the fifth surface to each other, the 1-6 corner connecting the first surface and the sixth surface to each other, the 2-5 corner connecting the second surface and the fifth surface to each other, and the 2-6 corner connecting the second surface and the sixth surface to each other. However, in order to suppress the step difference caused by the internal electrodes 121 and 122, the internal electrodes may be stacked on each other and then cut to be exposed to the fifth and sixth surfaces 5 and 6 of the body, and one dielectric layer or two or more dielectric layers may be stacked on both the sides of the capacitance formation portion Ac in the third direction (i.e., the width direction) to form the margin portions 114 and 115. In this case, the corner connecting the first surface and the fifth or sixth surface to each other and the corner connecting the second surface and the fifth or sixth surface to each other may not be contracted.

Meanwhile, the first to sixth surfaces of the body 110 may generally be the flat surfaces, and the non-flat regions may be the corners. In addition, the region of the external electrode 131 or 132, disposed on the corner of the body 110 may be the corner portion.

In this regard, the first or second corner portion 331c or 332c may be disposed below the extension line E2 of the second surface, and the first or second corner portion 331c or 332c may be spaced apart from the second surface 2. That is, none of the external electrodes 331 and 332 may be disposed on the second surface to further minimize the volumes of the external electrodes 331 and 332, thereby further increasing the capacitance of the multilayer electronic component 3000 per unit volume. In addition, the first corner portion 331c may be disposed on a portion of the 2-3 corner C2-3 connecting the third surface and the second surface to each other, and the second corner portion 332c may be disposed on a portion of the 2-4 corner C2-4 connecting the fourth surface and the second surface to each other.

The extension line E2 of the second surface may be defined as follows.

The extension line E2 of the second surface may indicate a straight line passing through a point where P2 and the second surface meet each other and a point where P4 and the second surface meet each other when drawing seven straight lines P0, P1, P2, P3, P4, P5, P6 and P7 in the thickness direction to have equal intervals from the third surface to the fourth surface in the length direction in the length-thickness cross section (i.e., L-T cross section) cut in a center of the multilayer electronic component 3000 in the width direction.

Meanwhile, the external electrode 331 or 332 may be made of any material having the electrical conductivity such as the metal, may use the specific material determined in consideration of the electrical characteristic, the structural stability or the like, and may have the multilayer structure.

The external electrode 331 or 332 may be the fired electrode including the conductive metal and glass, or the resin-based electrode including the conductive metal and resin.

In addition, the external electrode 331 or 332 may be made by sequentially forming the fired electrode and the resin-based electrode on the body. In addition, the external electrode 331 or 332 may be formed by transferring a sheet including the conductive metal to the body or by transferring the sheet including the conductive metal to the fired electrode.

The conductive metal included in the external electrode 331 or 332 may use the material having the excellent electrical conductivity, and is not particularly limited. For example, the conductive metal may be at least one of copper (Cu), nickel (Ni), palladium (Pd), silver (Ag), tin (Sn), chromium (Cr) and alloys thereof. The external electrode 331 or 332 may include at least one of nickel (Ni) and an alloy of nickel (Ni), thereby further improving its connectivity with the internal electrode 121 or 122 including nickel (Ni).

The insulating layer 351 may be disposed on the first and second connection portions 331a and 332a.

The first or second connection portion 331a or 332a may be a portion connected to the internal electrode 121 or 122, and thus be a pathway for the penetration of the plating solution in the plating process or the penetration of the moisture when the multilayer electronic component is actually used. In the present disclosure, the insulating layer 351 may be disposed on the connection portions 331a and 332a, thereby preventing the penetration of the external moisture or the penetration of the plating solution.

The insulating layer 351 may be in contact with the first and second plating layers 341 and 342. Here, the insulating layer 351 may be in contact with the first and second plating layers 341 and 342 to partially cover the ends thereof, or the first and second plating layers 341 and 342 may be in contact with the insulating layer 351 to partially cover the end thereof.

The insulating layer 353 may be disposed on the first and second connection portions 331a and 332a, and may cover the second surface and the first and second corner portions 331c and 332c. In addition, the insulating layer 353 may cover a region where an end of the first or second corner portion 331c or 332c and the body 110 are in contact with each other to prevent the pathway for the penetration of the moisture, thereby further improving the moisture resistance reliability of the multilayer electronic component.

The insulating layer 351 may be disposed on the second surface and extended to the first and second connection portions 331a and 332a. In addition, the insulating layer may cover the entire second surface when none of the external electrodes 331 and 332 is disposed on the second surface. Meanwhile, the insulating layer 351 may not be necessarily disposed on the second surface, the insulating layer may not be disposed on the partial or entire second surface, and the insulating layer may be separated into two layers and disposed on each of the first and second connection portions 331a and 332a. However, even in this case, the insulating layer may cover the entire first and second corner portions 331c and 332c. The insulating layer may be disposed below the extension line of the second surface when not disposed on the entire second surface. In addition, even when not disposed on the second surface, the insulating layer may be disposed on the first and second connection portions 331a and 332a and extended to the fifth and sixth surfaces to be one insulating layer.

In another exemplary embodiment, the insulating layer 351 may cover the partial fifth and sixth surfaces to improve the reliability of the multilayer electronic component. Here, portions of the fifth and sixth surfaces, which are not covered by the insulating layer, may be externally exposed.

Further, the insulating layer 351 may cover the entire fifth and sixth surfaces. In this case, none of the fifth and sixth surfaces may be externally exposed to further improve moisture resistance reliability.

The insulating layer 351 may serve to prevent the plating layers 341 and 342 from being formed on the external electrodes 331 and 332 on which the insulating layer 351 is disposed, and improve the sealing characteristic to minimize the penetration of the external moisture, plating solution or the like. The component, composition, average thickness and resultant effect of the insulating layer 351 may be the same as those the insulating layer 151, 251, 252 or 253 included in the multilayer electronic component 1000 or 2000 and various embodiments thereof, and descriptions thereof are thus omitted.

The first and second plating layers 341 and 342 may respectively be disposed on the first and second band portions 331b and 332b. The plating layers 341 and 342 may allow the multilayer electronic component to be more easily mounted on the board, be disposed on the band portions 331b and 332b to minimize the space in which the multilayer electronic component is mounted, and minimize the penetration of the plating solution to the internal electrode, thereby improving the reliability of the multilayer electronic component. One end of the first and second plating layer 341 or 342 may be in contact with the first surface, and the other end thereof may be in contact with the insulating layer 351.

The plating layer 341 or 342 is not limited to a particular type, may include at least one of copper (Cu), nickel (Ni), tin (Sn), silver (Ag), gold (Au), palladium (Pd) and alloys thereof, or may include a plurality of layers.

As a more specific example of the plating layer 341 or 342, the plating layer 341 or 342 may be a nickel (Ni) plating layer or a tin (Sn) plating layer, and may have the Ni plating layer and the Sn plating layer sequentially formed on the first and second band portion 331b or 332b.

In another exemplary embodiment, the insulating layer 351 may be in direct contact with the first and second external electrodes 331 and 332, and the first and second external electrodes 331 and 332 may each include the conductive metal and glass. Accordingly, none of the plating layers 341 and 342 may be disposed in a region where the insulating layer 351 is disposed on an outer surface of the first or second external electrode 331 or 332, thereby effectively suppressing the erosion of the external electrode by the plating solution.

In another exemplary embodiment, the insulating layer 351 may be in direct contact with the first and second external electrodes 331 and 332, and the first and second external electrodes 331 and 332 may each include the conductive metal and resin. Accordingly, none of the plating layers 341 and 342 may be disposed in a region where the insulating layer 351 is disposed on the outer surface of the first or second external electrode 331 or 332, thereby effectively suppressing the erosion of the external electrode by the plating solution.

In another exemplary embodiment, the first plating layer 341 may cover an end of the insulating layer 351, disposed on the first external electrode 331, and the second plating layer 342 may cover an end of the insulating layer 351, disposed on the second external electrode 332. Accordingly, it is possible to strengthen a bonding force of the insulating layer 351 and the plating layer 341 or 342, thereby improving the reliability of the multilayer electronic component 3000. In addition, it is possible to first form the insulating layer 351 before forming the plating layer 341 or 342 on the external electrode 331 or 332, thereby more reliably suppressing the penetration of the plating solution in the process of forming the plating layer. As the insulating layer is formed before the plating layer, the plating layer 341 or 342 may cover the end of the insulating layer 351.

In another exemplary embodiment, the insulating layer 351 may cover an end of the first plating layer 341, disposed on the first external electrode 331, and the insulating layer 351 may cover an end of the second plating layer 342, disposed on the second external electrode 332. Accordingly, it is possible to strengthen the bonding force of the insulating layer 351 and the plating layer 341 or 342, thereby improving the reliability of the multilayer electronic component 3000.

In another exemplary embodiment, the first and second plating layers 341 and 342 may respectively be extended to partially cover the first and second connection portions 331*a* and 332*a*. H1≥H2 when H1 indicates the average size of the internal electrode in the first direction, disposed closest to the first surface 1 among the first and second internal electrodes 121 and 122, and H2 indicates the average size of the first or second plating layer 341 or 342 in the first direction, measured from the extension line E1 of the first surface 1 to an end of the plating layer disposed on the first or second connection portion 331*a* or 332*a*. Accordingly, it is possible to suppress the plating solution from penetrating into the internal electrode during the plating process, thereby allowing the multilayer electronic component to have the improved reliability.

In another exemplary embodiment, H1<H2 when H1 indicates the average size of the region in the first direction, measured from the first surface 1 to the internal electrode disposed closest to the first surface among the first and second internal electrodes 121 and 122, and H2 indicates the average size of the plating layer 341 or 342 in the first direction, measured from the extension line E1 of the first surface 1 to the end of the plating layer 341 or 342 disposed on the first or second connection portion 331*a* or 332*a*. Accordingly, it is possible to improve the adhesion force by increasing the area where the multilayer electronic component is in contact with the solder when the multilayer electronic component is mounted on the board. H2<T/2 when T indicates the average size of the body 110 in the first direction. That is, H1<H2<T/2. The reason is that moisture resistance reliability improved by the insulating layer may be reduced when H2 is T/2 or more.

In another exemplary embodiment, the first and second plating layers 341 and 342 may be disposed on a level same as or below the extension line of the first surface. Accordingly, it is possible to minimize the height of the solder when the multilayer electronic component is mounted on the board and to minimize the space in which the multilayer electronic component is mounted. In addition, the insulating layer 3M may be extended below the extension line of the first surface to be in contact with the first and second plating layers 341 and 342.

In another exemplary embodiment, 0.2≤B1/L≤0.4 and 0.2≤B2/L≤0.4 when L indicates the average size of the body in the second direction, B1 indicates an average size of the first band portion 331*b* in the second direction, measured from the extension line E3 of the third surface 3 to an end of the first band portion 331*b*, and B2 indicates an average size of the second band portion 332*b* in the second direction, measured from the extension line E4 of the fourth surface 4 to an end of the second band portion 332*b*.

When B1/L and B2/L are less than 0.2, it may be difficult to secure the sufficient adhesion force. On the other hand, when B2/L is greater than 0.4, the leakage current may occur between the first band portion 331*b* and the second band portion 332*b* under the high-voltage current, and the first band portion 331*b* and the second band portion 332*b* may be electrically connected with each other due to the plating spread or the like during the plating process.

In another exemplary embodiment, the multilayer electronic component may further include an additional insulating layer disposed on the first surface and between the first band portion 331*b* and the second band portion 332*b*. Accordingly, it is possible to prevent the leakage current or the like which may occur between the first band electrode 331*b* and the second band electrode 332*b* under the high-voltage current.

The additional insulating layer may not need to be limited to a particular type. For example, the additional insulating layer may include the oxide including aluminum (Al) like the insulating layer 351. However, it is not necessary to limit the additional insulating layer and the insulating layer 351 to the same material, and the two insulating layers may be made of materials different from each other. For example, the additional insulating layer may include one or more selected from epoxy resin, acrylic resin, ethyl cellulose or the like, or may include glass.

In another exemplary embodiment, B3<B1 and B4<B2 when B1 indicates an average size of the first band portion 331*b* in the second direction, measured from the extension line E3 of the third surface 3 to an end of the first band portion 331*b*, and B2 indicates an average size of the second band portion 332*b* in the second direction, measured from the extension line of the fourth surface 4 to an end of the second band portion 332*b*. The average length B1 of the first band portion 331*b* may be longer than the average length B3 of the first corner portion 331*c*, and the average length B2 of the second band portion 332*b* may be longer than the average length B4 of the second corner portion 332*c*. Accordingly, it is possible to improve the adhesion force by increasing the area where the multilayer electronic component is in contact with the solder when the multilayer electronic component is mounted on the board.

In more detail, B3<B1 and B4<B2 when B1 indicates the average size of the first band portion 331*b* in the second direction, measured from the extension line E3 of the third surface 3 to the end of the first band portion 331*b*, B2 indicates the average size of the second band portion 332*b* in the second direction, measured from the extension line E4 of the fourth surface 4 to the end of the second band portion 332*b*, B3 indicates the average size of the first corner portion 331*c* in the second direction, measured from the extension line E3 of the third surface 3 to an end of the first corner portion 331*c*, and B4 indicates the average size of the second corner portion 332*c* in the second direction, measured from the extension line E4 of the fourth surface 4 to an end of the second corner portion 332*c*.

In another exemplary embodiment, an average thickness of the first or second plating layer 341 or 342 may be smaller than the average thickness of the insulating layer 351.

The insulating layer 351 may serve to prevent the penetration of the external moisture or plating solution. However, the insulating layer 351 may have weak connectivity with the plating layer 341 or 342, which may cause delamination of the plating layer. When the plating layer is delaminated, the adhesion force of the multilayer electronic component with the board may be reduced. Here, the delamination of the plating layer may indicate that the plating layer is partially peeled-off or physically separated from the external electrode 331 or 332. The connectivity between the plating layer and the insulating layer may be weak. In this case, it may increase the possibility that a gap between interfaces of the insulating layer and the plating layer is widened or that a foreign material may infiltrate, which may allow the plating layer to be vulnerable to an external impact and then delaminated.

According to another exemplary embodiment of the present disclosure, the plating layer may have the average thickness made smaller than the average thickness of the insulating layer, thereby reducing the area where the plating layer and the insulating layer are in contact with each other.

It is thus possible to suppress the occurrence of the delamination, thereby improving the adhesion force of the multilayer electronic component 3000 with the board.

The multilayer electronic component 3000 may not need to be limited to a particular size.

However, in order for the multilayer electronic component to have the smaller size and simultaneously have the higher capacitance, it is necessary to increase the number of stacks by allowing the dielectric layer and the internal electrode to each have the smaller thickness. The multilayer electronic component 3000 having a size of 1005 (i.e., length×width of 1.0 mm×0.5 mm) or less may thus have the more remarkably improved reliability and the capacitance per unit volume according to the present disclosure.

Therefore, in consideration of the manufacturing error, the size of the external electrode and the like, when having the length of 1.1 mm or less and the width of 0.55 mm or less, the multilayer electronic component 3000 may have the more remarkably improved reliability according to the present disclosure. Here, the length of the multilayer electronic component 3000 may indicate the maximum size of the multilayer electronic component 3000 in the second direction, and the width of the multilayer electronic component 3000 may indicate the maximum size of the multilayer electronic component 3000 in the third direction.

As set forth above, the present disclosure may provide the multilayer electronic component having the higher reliability and the improved capacitance per unit volume by including the insulating layer disposed on the connection portion of the external electrode and the plating layer disposed on the band portion of the external electrode.

The present disclosure may also provide the multilayer electronic component which may be mounted in the minimal space.

The present disclosure may also provide the multilayer electronic component including the insulating layer including the oxide including aluminum (Al), thereby having the improved moisture resistance reliability and acid resistance to the plating solution, and further suppressing cracking from occurring and being propagated.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and first and second internal electrodes alternately disposed while having the dielectric layer interposed therebetween, and including first and second surfaces opposing each other in a first direction, third and fourth surfaces connected to the first and second surfaces and opposing each other in a second direction, and fifth and sixth surfaces connected to the first to fourth surfaces and opposing each other in a third direction;
a first external electrode including a first connection portion disposed on the third surface, and a first band portion extending from the first connection portion onto a portion of the first surface;
a second external electrode including a second connection portion disposed on the fourth surface, and a second band portion extending from the second connection portion onto a portion of the first surface;
a first insulating layer disposed on the first connection portion;

a second insulating layer disposed on the second connection portion;
a first plating layer disposed on the first band portion; and
a second plating layer disposed on the second band portion;
wherein the first and second insulating layers include an oxide including aluminum (Al),
wherein H1≥H2 in which H1 indicates an average size of a region in the first direction, measured from the first surface to an internal electrode disposed closest to the first surface among the first and second internal electrodes, and H2 indicates an average size of the plating layer in the first direction, measured from an extension line of the first surface to an end of the plating layer disposed on the first or second connection portion,
wherein the first insulating layer directly contacts the first plating layer and the second insulating layer directly contacts the second plating layer, and
wherein the first and second insulating layers have an average thickness of 50 nm or more and 1000 nm or less.

2. The multilayer electronic component of claim 1, wherein the first plating layer overlaps a flat portion of the third surface in the second direction or the second plating layer overlaps a flat portion of the fourth surface in the second direction.

3. The multilayer electronic component of claim 1, wherein the first and second insulating layers have an average thickness of 600 nm or more.

4. The multilayer electronic component of claim 1, wherein the first and second insulating layers have an average thickness of 800 nm or more.

5. The multilayer electronic component of claim 1, wherein the oxide including aluminum (Al) includes aluminum oxide ($Al_2O_3$).

6. The multilayer electronic component of claim 1, wherein the number of moles of an aluminum (Al) element relative to a total number of moles of elements other than oxygen among elements included in the first and second insulating layers is 0.95 or more.

7. The multilayer electronic component of claim 1, wherein the first and second insulating layers further include an oxide including magnesium (Mg).

8. The multilayer electronic component of claim 1, wherein H2<T/2 in which T indicates an average size of the body in the first direction.

9. The multilayer electronic component of claim 1, wherein the first or second plating layer is disposed below an extension line of the first surface.

10. The multilayer electronic component of claim 1, wherein 0.2≤B1/L≤0.4 and 0.2≤B2/L≤0.4 in which L indicates an average size of the body in the second direction, B1 indicates an average size of the first band portion in the second direction, measured from an extension line of the third surface to an end of the first band portion, and B2 indicates an average size of the second band portion in the second direction, measured from an extension line of the fourth surface to an end of the second band portion.

11. The multilayer electronic component of claim 1, further comprising an additional insulating layer disposed on the first surface and between the first band portion and the second band portion.

12. The multilayer electronic component of claim 1, wherein the dielectric layer has an average thickness of 0.35 µm or less.

13. The multilayer electronic component of claim 1, wherein the first or second internal electrode has an average thickness of 0.35 μm or less.

14. The multilayer electronic component of claim 1, wherein the body further includes:

a capacitance formation portion including the first and second internal electrodes alternately disposed while having the dielectric layer interposed therebetween, and a cover portion disposed on each of two surfaces of the capacitance formation portion in the first direction, wherein the cover portion has an average size of 15 μm or less in the first direction.

15. The multilayer electronic component of claim 1, wherein the first and second plating layer has an average thickness smaller than an average thickness of the first and second insulating layer.

16. The multilayer electronic component of claim 1, wherein the first plating layer covers an end close to the first surface of the first insulating layer, and the second plating layer covers another end close to the first surface of the second insulating layer.

17. The multilayer electronic component of claim 1, wherein the first insulating layer covers an end of the first plating layer disposed on the first external electrode, and the second insulating layer covers an end of the second plating layer disposed on the second external electrode.

18. The multilayer electronic component of claim 1, wherein the first external electrode includes a first side band portion extending from the first connection portion onto portions of the fifth and sixth surfaces, the second external electrode includes a second side band portion extending from the second connection portion onto portions of the fifth and sixth surfaces, and the first or second side band portion has a size increased in the second direction as being closer to the first surface.

19. The multilayer electronic component of claim 1, wherein the first external electrode is spaced apart from the fifth surface and the second external electrode is spaced apart from the sixth surface.

20. The multilayer electronic component of claim 1, wherein the first and second external electrodes are space apart from the second surface.

21. The multilayer electronic component of claim 1, wherein the first and second insulating layers extending onto the second surface and connecting each other.

22. The multilayer electronic component of claim 1, wherein the first and second insulating layers extending onto the fifth and sixth surfaces and connecting each other.

23. The multilayer electronic component of claim 1, wherein the first and second insulating layers are not disposed on the second, fifth and sixth surfaces.

24. The multilayer electronic component of claim 1, wherein the first external electrode further includes a third band portion extending from the first connection portion onto a portion of the second surface, and the second external electrode further includes a fourth band portion extending from the second connection portion onto a portion of the second surface.

25. The multilayer electronic component of claim 1, wherein the body has a 1-3 corner connecting the first and third surfaces to each other, a 1-4 corner connecting the first and fourth surfaces to each other, a 2-3 corner connecting the second and third surfaces to each other, and a 2-4 corner connecting the second surface and the fourth surface to each other, the 1-3 corner and the 2-3 corner are contracted toward a center of the body in the first direction as being closer to the third surface, and the 1-4 corner and the 2-4 corner are contracted toward the center of the body in the first direction as being closer to the fourth surface, and the first external electrode includes corner portions disposed on the 1-3 corner and the 2-3corner, and the second external electrode includes corner portions disposed on the 1-4 corner and the 2-4 corner.

26. The multilayer electronic component of claim 25, wherein B3≥G1 and B4≥G2 in which B3 indicates an average size of the third band portion in the second direction, measured from an extension line of the third surface to an end of the third band portion, B4 indicates an average size of the fourth band portion in the second direction, measured from an extension line of the fourth surface to an end of the fourth band portion, G1 indicates an average size of a region in the second direction, where the third surface and the second internal electrode are spaced apart from each other, and G2 indicates an average size of a region in the second direction, where the fourth surface and the first internal electrode are spaced apart from each other.

27. The multilayer electronic component of claim 1, wherein the first external electrode includes a first connection electrode disposed on the third surface and a first band electrode disposed on the first surface and connected to the first connection electrode, and wherein the second external electrode includes a second connection electrode disposed on the fourth surface and a second band electrode disposed on the first surface and connected to the second connection electrode.

28. The multilayer electronic component of claim 27, wherein the first and second connection electrodes are spaced apart from the fifth and sixth surfaces.

29. The multilayer electronic component of claim 27, wherein the first and second connection electrodes are spaced apart from the second surfaces.

30. The multilayer electronic component of claim 27, wherein the first external electrode further includes a third band electrode disposed on the second surface and in connection with the first connection electrode, and the second external electrode further includes a fourth band electrode dispose on the second surface and in connection with the second connection electrode.

31. The multilayer electronic component of claim 27, wherein the first connection electrode and the second connection electrode include the same metal as a metal included in the first and second internal electrodes.

32. The multilayer electronic component of claim 27, wherein the first connection electrode and the second connection electrode include fired electrodes including a conductive metal and glass.

33. The multilayer electronic component of claim 27, wherein the first band electrode and the second band electrode are fired electrodes including a conductive metal and glass.

34. The multilayer electronic component of claim 27, wherein the first connection electrode and the second connection electrode include plating layers.

35. The multilayer electronic component of claim 27, wherein the first band electrode and the second band electrode include plating layers.

* * * * *